United States Patent
Inoue et al.

[11] Patent Number: 5,754,967
[45] Date of Patent: May 19, 1998

[54] TORQUE DETECTION APPARATUS FOR CONTROLLING A VEHICLE

[75] Inventors: Noriyuki Inoue; Yukiyasu Akemi; Minoru Nishida; Yasuo Naito; Hideki Doi; Chiaki Fujimoto, all of Hyogo-ken, Japan

[73] Assignee: Mitsubishi Denki Kabushiki Kaisha, Tokyo, Japan

[21] Appl. No.: 534,851

[22] Filed: Sep. 27, 1995

[30] Foreign Application Priority Data

Dec. 16, 1994 [JP] Japan ................ 6-313814

[51] Int. Cl.⁶ ........................... B60T 8/52
[52] U.S. Cl. ................ 701/54; 701/69; 701/84; 701/87; 180/197; 180/249; 303/112
[58] Field of Search ........ 364/424.098, 424.083, 364/426.029, 426.033, 426.034, 426.036; 180/197, 249, 248; 477/35, 36; 475/221, 86; 303/112

[56] References Cited

U.S. PATENT DOCUMENTS

| | | | |
|---|---|---|---|
| 4,513,628 | 4/1985 | Kohama et al. | 73/868.328 |
| 4,713,763 | 12/1987 | Hofmann | 364/431.051 |
| 4,866,625 | 9/1989 | Kawamoto | 364/426.035 |
| 4,872,373 | 10/1989 | Ouchi et al. | 475/86 |
| 4,967,869 | 11/1990 | Nagaoka et al. | 180/244 |
| 4,989,686 | 2/1991 | Miller et al. | 180/197 |
| 5,010,974 | 4/1991 | Matsuda | 180/233 |
| 5,033,329 | 7/1991 | Tezuka | 364/424.098 |
| 5,125,490 | 6/1992 | Suzumura et al. | 477/35 |
| 5,301,768 | 4/1994 | Ishikawa et al. | 180/249 |
| 5,332,059 | 7/1994 | Shirakawa et al. | 364/426.03 |
| 5,333,943 | 8/1994 | Kashiwabara et al. | 303/112 |
| 5,443,307 | 8/1995 | Maier | 364/426.028 |
| 5,456,641 | 10/1995 | Sawase | 475/86 |
| 5,471,390 | 11/1995 | Sasaki | 364/426.023 |
| 5,508,923 | 4/1996 | Ibamoto et al. | 364/426.01 |
| 5,544,058 | 8/1996 | Demizu et al. | 364/424.034 |

FOREIGN PATENT DOCUMENTS

| | | |
|---|---|---|
| 42 29 560 A1 | 3/1995 | Germany. |
| 43 44 634 A1 | 7/1995 | Germany. |
| 4293655 | 10/1992 | Japan. |
| 5-99014 | 4/1993 | Japan. |

*Primary Examiner*—Tan Q. Nguyen
*Attorney, Agent, or Firm*—Sughrue, Mion, Zinn, Macpeak & Seas, PLLC

[57] ABSTRACT

A low-cost torque detection apparatus is obtained using wheel revolution sensors which are generally provided in a conventional ABS and an engine revolution sensor which is generally provided in a conventional engine fuel jet controller. The apparatus can be used, for example, in a vehicle having a drive source, such as an engine or a motor, for driving wheels which is coupled to the right and left wheels by respective shafts having torsional stiffness for transmitting a drive torque through a differential gear. The apparatus includes a drive source revolution angle detection device for the drive source and wheel revolution angle detection means for the right and left wheels, and calculates torques of shafts such as drive shafts for coupling the differential gear to the wheels using a torque calculator.

16 Claims, 26 Drawing Sheets

FIG. 6

| GEAR | CHANGE GEAR RATIO |
|---|---|
| 1 | 3.307 |
| 2 | 1.833 |
| 3 | 1.310 |
| 4 | 0.970 |
| 5 | 0.755 |

CHANGE GEAR RATIO OF DIFFERENTIAL GEAR 4.105

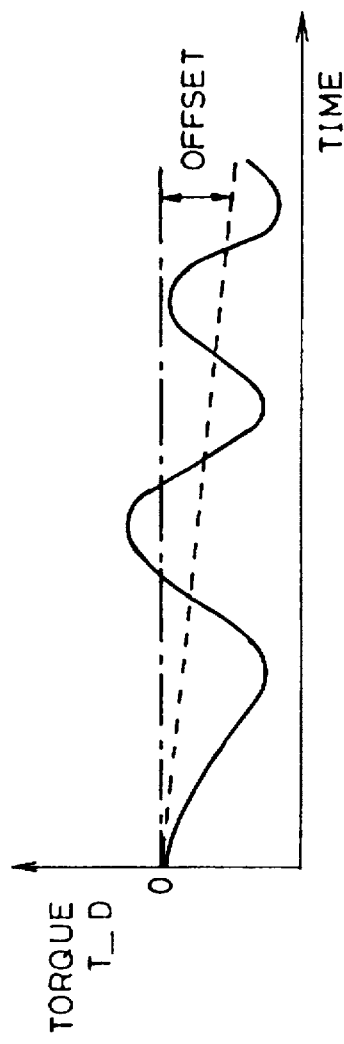
FIG.8
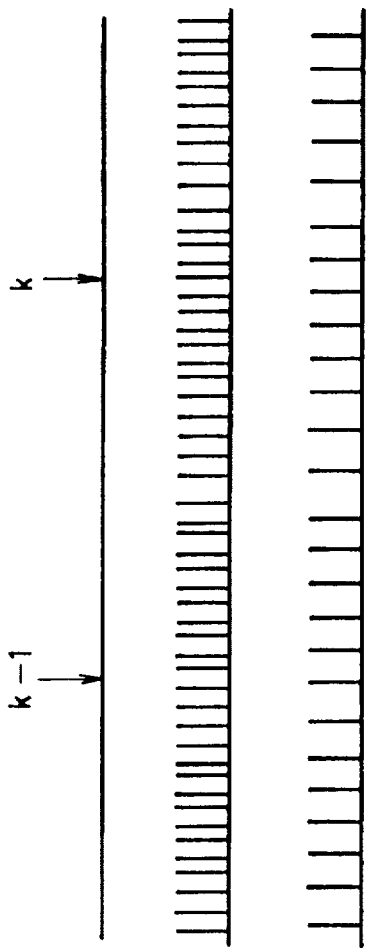
FIG.9A TORQUE CALCULATION TIMING
FIG.9B ENGINE REVOLUTION PULSE
FIG.9C WHEEL REVOLUTION PULSE

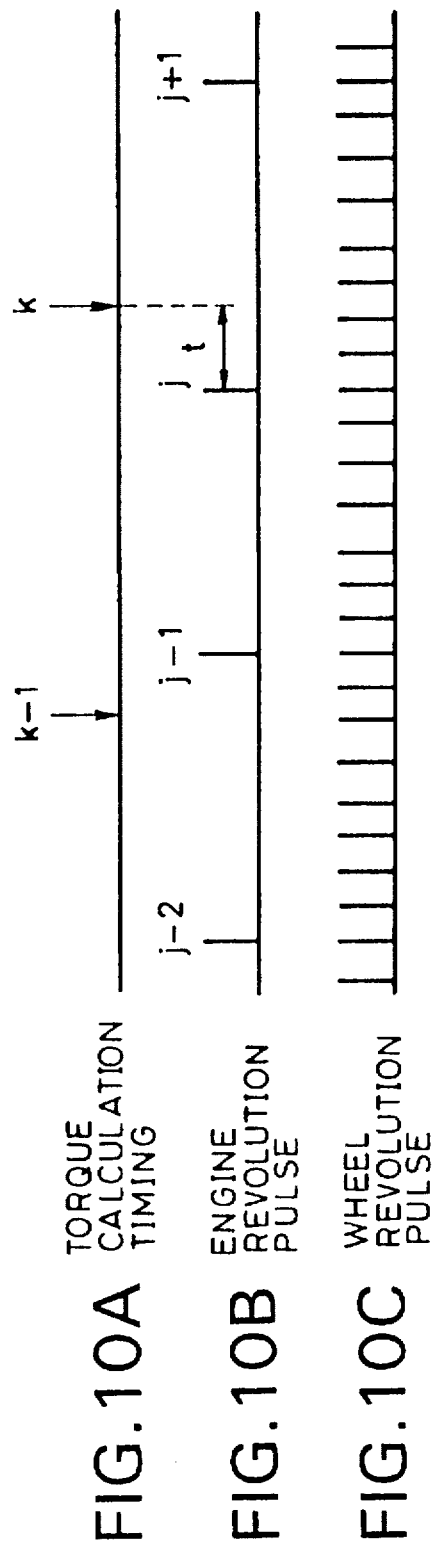

5,754,967

1

TORQUE DETECTION APPARATUS FOR CONTROLLING A VEHICLE

BACKGROUND OF THE INVENTION

1. Field of the Invention

This invention relates to a torque detection apparatus for controlling an anti-lock braking system, a traction controller and the like in a vehicle.

2. Description of the Prior Art

Generally speaking, a vehicle is provided with an anti-lock braking system (abbreviated as ABS hereinafter) and a controller such as a traction controller to improve auto body directional stability and steering performance. This controller is controlled in accordance with the size of a torque of a wheel, thereby allowing for high-accuracy control.

The above ABS which suppresses wheel slip at the time of braking the vehicle to improve braking performance is intended to maintain auto body directional stability and steering performance and minimize the braking distance by obtaining a wheel slip ratio $S(=(V\_B-V\_W)/V\_B)$ from comparison between a wheel speed $V\_W$ with a vehicle speed $V\_B$ (a false vehicle speed signal is obtained from a wheel speed and a wheel acceleration/deceleration) at the time of braking and by controlling braking force applied to wheels so that the slip ratio falls within a predetermined range (about 0.15 to 0.30). The traction controller (abbreviated as TRC) which suppresses wheel slip at the time of driving the vehicle to improve driving performance is intended to maintain auto body directional stability, steering performance and the optimum driving force of the vehicle by detecting wheel slip and by controlling a throttle valve to reduce an engine torque and increase the torque gradually thereafter upon detection of slip like the ABS.

JP-A-99014/1993 (the term "JP-A" as used herein means an "unexamined published Japanese patent application), for example, is well known as what discloses that a torque of a drive shaft or the like is obtained to improve performance and used for controlling ABS and TRC. In this invention, a torque and a wheel angle acceleration are detected, a road surface friction coefficient is calculated and detected from the following expression, and the detected road surface friction coefficient is used for traction control so as to improve control performance.

[expression 19]

$$mu=(T\_WP+I\ alpha)/(m\_WgR)$$

wherein mu is a road surface friction coefficient, $T\_WP$ is the maximum torque value of a drive shaft obtained immediately before slip over the road surface, I is an inertia moment from the detection site of the torque to the contact point between the wheel and the ground, alpha is a revolution angle acceleration of a wheel, $m\_Wg$ is a car weight applied to a drive wheel, and R is a wheel radius.

In JP-A-293655/1992, a torque is detected and the detected torque is used for ABS control so as to improve control performance. This invention is described in more detail hereinunder. As shown in FIG. 24, this invention comprises brake operation detection means for detecting the operation of each wheel brake, torque detection means for detecting a torque of each wheel, and braking force control means for controlling braking force of each wheel brake in accordance with conditions including the torque detected by the torque detection means during the operation of wheel brakes. The torque detection site of the torque detection means is a drive shaft between a wheel and a wheel brake or between a wheel brake and a differential gear.

2

FIG. 25 is a diagram showing the configuration of a conventional ABS used in the above invention. In the figure, reference numeral 1 represents a rear wheel, 2 a wheel brake, 3 a torque sensor, 4 an ABS controller, 5 a brake switch, 6 a wheel revolution sensor, 7 a brake actuator, 8 a master cylinder, 9 a front wheel, 10 an engine, 11 a transmission, 12 a propeller shaft, 13 a differential gear, and 14 a drive shaft. FIG. 26 is a vertical sectional view of the conventional toque detection apparatus used in the above invention.

A description is subsequently given of the operation of the apparatus. The torque sensor 3 is provided in the brake 2 for a rear wheel as the torque detection means to detect a torque of each rear wheel 1 which is the drive wheel of a rear drive vehicle. The torque signal of the rear wheel 1 detected by the torque sensor 3 is input into the ABS controller 4.

The configurations of the torque sensor 3 and a torque detection signal receiving circuit are shown in FIG. 27. Two distortion gauges 122 and 123 constituting a bridge circuit 121 are distorted in accordance with the detected torque, a terminal voltage of the bridge circuit which varies thereby is frequency converted by a frequency converter circuit 124, and the converted frequency is amplified by an amplifier 125 to generate a signal. This signal is received by the ABS controller 4, discriminated by a detected frequency discriminator 126 according to frequency range, amplified by an amplifier 127, shaped by a waveform shaping circuit 128, and frequency converted by a timer processing circuit 129 so that a torque is detected from the thus frequency converted signal based on a pre-investigated cycle and a torque map.

The ABS controller 4 receives a signal from the brake switch 5 as the brake operation detection means which is turned on by brake operation and vehicle speed signals from front wheel revolution sensors 6A and 6B provided to detect a revolution speed of each front wheel 9 and a rear wheel revolution sensor 6c provided on the propeller shaft 12 to detect a revolution speed of each rear wheel 1, in addition to the torque, sets the braking force of the wheel brake 2 based on these signals, and provides a braking force control signal to the actuator 7. The actuator 7 supplies to each of the wheel brakes 2 of the front wheels 9 and the rear wheels 1 ABS control hydraulic pressure which is prepared by reducing and adjusting master hydraulic pressure from the master cylinder 8 in accordance with the braking force control signal so as to control the braking force (pad pressing force) of each of the wheel brakes 2. The driving force of the engine 10 is transmitted to each of the rear wheels 1 through the transmission 11, the propeller shaft 12, the differential gear 13 and the drive shafts 14. A description is subsequently given of the control operation of braking force by the ABS controller when the drive shaft 14 is selected as a detection site for the torque of a drive shaft. When the drive shaft 14 is selected as a detection site for the torque of the drive shaft, the torque of the drive shaft decreases while the braking force of the wheel brake 2 is not reduced by wheel slip in the case of wheel lock. A torque value immediately before this is the maximum which is obtained by multiplying the maximum friction force generated between the wheel and the road surface by the radius of the wheel, and the maximum friction force is obtained from the product between the weight of the wheel and a friction coefficient of the road surface. Therefore, if the maximum torque is identified, a friction coefficient of the road surface can be obtained by back calculation.

Then, if the braking force control means controls the braking force of the wheel brake 2 in accordance with characteristics obtained based on a friction coefficient of the road surface estimated based on the assumption that a torque of the wheel detected by the torque detection means immediately before reduction as described above is the maximum, more accurate control is possible.

As described above, more accurate control is made possible by detecting a wheel torque and by controlling ABS or TRC in accordance with conditions including the detected wheel torque.

As described above, since a conventional ABS and TRC which detect a torque for controlling a vehicle use a distortion gauge to detect a torque, a distortion gauge must be attached to a shaft such as a drive shaft. Further, a radio wave or expensive slip ring is used to transmit a torque detection signal detected by the distortion gauge attached to the rotary shaft to an ABS controller fixed to an auto body. As the result, a conventional apparatus has the problem of boosted costs.

SUMMARY OF THE INVENTION

This invention has been made to solve the above problem, and it is therefore an object of the invention to provide a low-cost torque detection apparatus which uses wheel revolution sensors which are generally provided in an ABS and an engine revolution sensor which is generally provided in an engine fuel jet controller.

It is another object of the invention to detect highly accurate torques by resetting calculations and detections.

It is still another object of the invention to detect highly accurate torques by detecting a change gear ratio irrespective of the state of the transmission.

It is still another object of the invention to detect highly accurate torques by calculating a change gear ratio irrespective of the state of the transmission.

It is still another object of the invention to detect highly accurate torques by reducing the effect of an offset of detected values.

It is still another object of the invention to detect accurate torques even when the pulse resolution of a revolution sensor is low.

It is still another object of the invention to detect accurate torques by detecting a revolution angle of any one of shafts disposed between input of the differential gear and the transmission irrespective of the state of the transmission.

It is still another object of the invention to detect accurate torques by detecting a differential limiting torque, a drive source revolution angle and wheel revolution angles even in a vehicle having a differential limiting mechanism.

It is still another object of the invention to detect accurate torques by detecting a drive source revolution angle acceleration, a differential limiting torque and wheel revolution angles even in a vehicle having a differential limiting mechanism.

It is still another object of the invention to detect accurate torques without detecting a differential limiting torque in a vehicle having a differential limiting mechanism.

It is still another object of the invention to detect accurate torques by detecting a drive source revolution angle and wheel revolution angles even in a direct-coupled 4WD vehicle.

It is still another object of the invention to detect accurate torques by detecting a drive source revolution angle acceleration and wheel revolution angles even in a direct-coupled 4 vehicle.

It is still another object of the invention to detect accurate torques by detecting a drive source revolution angle, a differential limiting torque and wheel revolution angles even in a 4WD vehicle having a center differential gear with a differential limiting mechanism.

It is still another object of the invention to detect accurate torques by detecting a drive source revolution angle acceleration and a differential limiting torque even in a 4WD vehicle having a center differential gear with a differential limiting mechanism.

It is still another object of the invention to detect accurate torques without detecting a differential limiting torque in a 4WD vehicle having a center differential gear with a differential gear limiting mechanism.

It is still another object of the invention to detect accurate torques by detecting a revolution angle of the differential gear on the propeller shaft side and a drive source revolution angle.

A torque detection apparatus for vehicle control according to the present invention claimed in claim 1, in a vehicle having a drive source 10 such as an engine or a motor for driving wheels which is coupled to right and left wheels by respective shafts having torsional stiffness for transmitting a drive torque through a differential gear 13, comprises any one or a plurality of combinations of drive source revolution angle detection means (engine revolution sensor 15) for detecting a revolution angle of the drive source 10, drive source revolution angle acceleration detection means (engine revolution sensor 15) for detecting a revolution angle acceleration of the drive source, and wheel revolution angle detection means (wheel revolution sensors 6) for detecting revolution angles of the wheels, and calculates torques of shafts such as drive shafts 14 by means of torque calculation means (torque calculation unit 41) for detecting torques of shafts such as the drive shafts 14 for connecting the differential gear 13 to the wheels.

A torque detection apparatus for vehicle control according to the present invention claimed in claim 2, in a vehicle having a drive source 10 such as an engine or a motor for driving wheels which is coupled to a transmission 11 and the right and left wheels by respective shafts having torsional stiffness for transmitting a drive torque through a differential gear 13, comprises drive source revolution angle detection means (engine revolution sensor 15) for detecting a revolution angle of the drive source 10 and wheel revolution angle detection means (wheel revolution sensors 6) for detecting revolution angles of the wheels, and calculates torques of shafts such as drive shafts 14 by means of torque calculation means (torque calculation unit 41) for detecting torques, T_D, of shafts such as the drive shafts 14 for connecting the differential gear 13 to the wheels using the following expression.

[expression 1]

$$T\_Dr = T\_Dl = k\_Dr \, k\_Dl/(k\_Dr + k\_Dl) \, (theta\_Wr + theta\_Wl - 2\, theta\_E/i\_D\, i\_T))$$

wherein k_D is a torsional stiffness of shafts such as the drive shafts 14 for coupling the differential gear to the wheels, theta_W is a revolution angle of each wheel, theta_E is a revolution angle of the drive source 10 such as an engine, i_D is a reduction ratio of the differential gear 13, i_T is a change gear ratio of the transmission 11, and r and l are right and left wheels, respectively.

A torque detection apparatus for vehicle control according to the present invention claimed in claim 3 comprises torque calculation means (torque calculation unit 41) for resetting wheel revolution angles and a revolution angle of a drive source such as an engine to "0" when it determines from the state of a vehicle that torques of shafts such as the drive shafts 14 are "0".

A torque detection apparatus for vehicle control according to the present invention claimed in claim 4 comprises change gear ratio detection means (shift position switch 17) and torque calculation means (torque calculation unit 41) for calculating torques of shafts such as the drive shafts 14 connected to the wheels using the detected change gear ratio i_T.

A torque detection apparatus for vehicle control according to the present invention claimed in claim 5 comprises torque calculation means (torque calculation unit 41) for calculating twisting torques of shafts connected to the wheels using an estimated change gear ratio i_T* calculated using the following expression.

[expression 2]

$$i\_T^* = 2\theta\_E / i\_D / (\theta\_{Wr} + \theta\_{Wl})$$

A torque detection apparatus for vehicle control according to the present invention claimed in claim 6 comprises torque calculation means (torque calculation unit 41) for subjecting calculated twisting torque values of shafts connected to the wheels to high-pass filtering processing.

A torque detection apparatus for vehicle control according to the present invention claimed in claim 7 calculates torque of shafts such as drive shafts 14 in synchronism with the revolution of a drive source 10 such as an engine or a motor and a drive system such as wheels.

A torque detection apparatus for vehicle control according to the present invention claimed in claim 8 comprises shaft revolution angle detection means (transmission revolution sensor 18) for detecting a revolution angle of any one of shafts disposed between input of a differential gear 13 and a transmission 11 and torque calculation means (torque calculation unit 41) for calculating twisting torque values of shafts such as drive shafts 14 connected to the wheels using the revolution angle of any one of shafts disposed between input of the differential gear 13 and the transmission 11 in place of a revolution angle of a drive source 10 such as an engine or a motor.

A torque detection apparatus for vehicle control according to the present invention claimed in claim 9, in a vehicle having a differential limiting mechanism 30 for a differential gear 13, comprises differential limiting torque detection means 35 for detecting a differential limiting torque, drive source revolution angle detection means (engine revolution sensor 15) for detecting a revolution angle of a drive source 10, and wheel revolution angle detection means (wheel revolution sensors 6) for detecting revolution angles of the right and left wheels, and calculates torques of shafts such as drive shafts 14 by means of torque calculation means (torque calculation unit 41) for detecting torques, T_D, of shafts such as the drive shafts 14 for connecting the differential gear 13 to the wheels using the following expressions.

[expression 3]

$$T\_{Dr} = 2k\_Dr \, k\_Dl \, \{(\theta\_{Wr} + \theta\_{Wl})/2 - \theta\_E/(i\_T \, i\_D) - T\_V\}/(k\_Dr + k\_Dl)$$

[expression 4]

$$T\_{Dl} = 2k\_Dr \, k\_Dl \, \{(\theta\_{Wr} + \theta\_{Wl})/2 - \theta\_E/(i\_T \, i\_D) + T\_V\}/(k\_Dr + k\_Dl)$$

wherein T_V is a differential limiting torque.

A torque detection apparatus for vehicle control according to the present invention claimed in claim 10, in a vehicle having a differential limiting mechanism 30 for a differential gear 13, comprises revolution angle acceleration detection means (engine revolution sensor 15) for detecting a revolution angle acceleration of the drive source 10, differential limiting torque detection means 35 for detecting a differential limiting torque, and wheel revolution angle detection means (wheel revolution sensors 6) for detecting revolution angles of the right and left wheels, and calculates torques of shafts such as drive shafts 14 by means of torque calculation means (torque calculation unit 41) for detecting torques, T_D, of shafts such as the drive shafts 14 for connecting the differential gear 13 to the wheels using the following expressions.

[expression 5]

$$T\_{Dr} = k\_Dr(i\_D \, i\_T(I\_E \, \alpha\_E) - 2T\_V)/2$$

[expression 6]

$$T\_{Dl} = k\_Dl(i\_D \, i\_T(I\_E \, \alpha\_E) + 2T\_V)/2$$

wherein I_E is an inertia moment of the drive source 10 such as an engine, and alpha_E is a revolution angle acceleration of the drive source 10 such as an engine.

A torque detection apparatus for vehicle control according to the present invention claimed in claim 11, in a vehicle having a differential limiting mechanism 30 for a differential gear 13, comprises revolution angle detection means and revolution angle acceleration detection means (engine revolution sensor 15) for the drive source 10, and wheel revolution angle detection means (wheel revolution sensors 6) for detecting revolution angles of the right and left wheels, and calculates torques of shafts such as the drive shafts 14 by means of torque calculation means (torque calculation unit 41) for detecting torques, T_D, of shafts such as the drive shafts 14 for connecting the differential gear 13 to the wheels using the following expressions.

[expression 7]

$$T\_{Dr} = k\_Dr \, \{-i\_D \, i\_T \, (I\_E \, \alpha\_E) + 2k\_Dl((\theta\_{Wr} + \theta\_{Wl})/2 - \theta\_E/(i\_D \, i\_T)) \}/(k\_Dl - k\_Dr)$$

[expression 8]

$$T\_{Dl} = k\_Dl \{i\_D \, i\_T \, (I\_E \, \alpha\_E) - 2 \, k\_Dr \, ((\theta\_{Wr} + \theta\_{Wl})/2 - \theta\_E \, (i\_D \, i\_T)) \}/(k\_Dl - k\_Dr)$$

A torque detection apparatus for vehicle control according to the present invention claimed in claim 12, in a direct-coupled 4WD vehicle, comprises revolution angle detection means (engine revolution sensor 15) for detecting a revolution angle of a drive source 10 and wheel revolution angle detection means (wheel revolution sensors 6) for the four wheels, and calculates torques of shafts such as drive shafts 14 and 20 by means of torque calculation means (torque calculation unit 41) for detecting torques, T_D, of shafts such as the drive shafts 14 and 20 for connecting the front and rear differential gears 19 and 13 to the wheels using the following expressions.

[expression 9]

$$T\_{DFr} = T\_{DFl} = k\_{DFr} \, k\_{DFl} \, ((\theta\_{WFr} + \theta\_{WFl}) - 2\theta\_E/i\_{DF} \, i\_T)/(k\_{DFl} + k\_{DFr})$$

[expression 10]

$$T\_{DRr} = T\_{DRl} = k\_{DRr} \, k\_{DRl} \, ((\theta\_{WRr} + \theta\_{WRl}) - 2\theta\_E/i\_{DR} \, i\_T)/(k\_{DRl} + k\_{DRr})$$

A torque detection apparatus for vehicle control according to the present invention claimed in claim 13, in a direct-coupled 4WD vehicle, comprises revolution angle acceleration detection means (engine revolution sensor 15) for detecting a revolution angle acceleration of a drive source 10 and wheel revolution angle detection means (wheel revolution sensors 6) for detecting revolution angles of the four wheels, and calculates torques of shafts such as drive shafts 14 and 20 by means of torque calculation means (torque calculation unit 41) for detecting torques, T_D, of shafts such as the drive shafts 14 and 20 for connecting the front and rear differential gears 19 and 13 to the wheels using the following expressions.

[expression 11]
T_DFr = T_DFl = NUMF11 / DEN11 (I_E alpha_E) + NUMF12 / DEN11 {i_DF (theta_WFl + theta_WFr) − i_DR (theta_WRl + theta_WRr )}

[expression 12]
T_DRr = T_DRl = NUMR11 / DEN11 ( I_E alpha_E) + NUM12 / DEN11 (i_DF (theta_WFl + theta_WFr) − i_DR (theta_WRl + theta_WRr )} wherein

NUMF11=i_DF i_DR^2i_T k_DFl k_DFr (k_DRl+k_DRr),

NUMF12=2i_DF k_DFl k_DFr k_DRl k_DRr,

DEN11=2{i_DR^2k_DFl k_DFr (k_DRl+k_DRr)+i_DF^2k_DRl k_DRr(k_DFl+k_DFr)},

NUMR11=i_DR i_DF^2i_T k_DRl k_DRr (k+DFl+ k_DFr), and

NUMR12=−2 i_DR K_DFl k_DFr k_DRl k_DRr.

A torque detection apparatus for vehicle control according to the present invention claimed in claim 14, in a 4WD vehicle having a drive source 10 which is coupled to the wheels by respective shafts having torsional stiffness for transmitting a drive torque in such a manner that power is distributed to the front and rear wheels from the drive source 10 through a transmission 11 and a center differential gear 31 having a differential limiting mechanism and further to the right and left wheels by front and rear differential gears 19 and 13, comprises revolution angle detection means (engine revolution sensor 15) for detecting a revolution angle of the drive source 10, wheel revolution angle detection means (wheel revolution sensors 6) for the four wheels, and differential limiting torque detection means 35 for detecting a differential limiting torque of the center differential gear 31, and calculates torques of drive shafts 14 and 20 by means of torque calculation means (torque calculation unit 41) for detecting torques, T_D, of shafts such as the drive shafts 14 and 20 for connecting the front and rear differential gears 19 and 13 to the wheels using the revolution angle of the drive source 10, the revolution angles of the four wheels, and the differential limiting torque detected by the above detection means.

A torque detection apparatus for vehicle control according to the present invention claimed in claim 15, in a 4WD vehicle having a drive source 10 which is coupled to the wheels by respective shafts having torsional s tiffness for transmitting a drive torque in such a manner that power is distributed to the front and rear wheels from the drive source 10 through a center d iff erential gear 31 having a differential limiting mechanism and further to the right and left wheels by front and rear differential gears 19 and 13, comprises revolution angle acceleration detection means (engine revolution sensor 15) for detecting a revolution angle acceleration of the drive source 10, and differential limiting torque detection means 35 for detecting a differential limiting torque of the center differential gear 31, and calculates torques of shafts such as drive shafts 14 and 20 by means of torque calculation means (torque calculation unit 41.) for detecting torques, T_D, of shafts such as the drive shafts 14 and 20 for connecting the front and rear differential gears 19 and 13 to the wheels using the revolution angle acceleration of the drive source 10 and the differential limiting torque detected by the above detection means.

A torque detection apparatus for vehicle control according to the present invention claimed in claim 16, in a 4WD vehicle having a drive source 10 which is coupled to the wheels by respective shafts having torsional stiffness for transmitting a drive torque in such a manner that power is distributed to the front and rear wheels from the drive source 10 through a center differential gear 31 having a differential limiting mechanism and further to the right and left wheels by front and rear differential gears 19 and 13, comprises revolution angle detection means (engine revolution sensor 15) for detecting a revolution angle of the drive source 10, revolution angle acceleration detection means (engine revolution sensor 15) for detecting a revolution angle acceleration of the drive source, and wheel revolution angle detection means (wheel revolution sensors 6) for detecting revolution angles of the four wheels, and calculates torques of shafts such as drive shafts 14 and 20 by means of torque calculation means (torque calculation unit 41) for detecting torques, T_D, of shafts such as the drive shafts 14 and 20 for connecting the front and rear differential gears 19 and 13 to the wheels using the revolution angle of the drive source 10, the revolution angle acceleration of the drive source 10 and the revolution angles of the four wheels detected by the above detection means.

A torque detection apparatus for vehicle control according to the present invention claimed in claim 17 comprises revolution angle detection means (engine revolution sensor 15) for detecting a revolution angle of a drive source 10 and revolution angle detection means for detecting a revolution angle of a differential gear 13 on the propeller shaft side (propeller shaft revolution sensor 33), and calculates torques of shafts such as drive shafts 14 by means of torque calculation means (torque calculation unit 41) for detecting torques, T_D, of shafts such as the drive shafts 14 for connecting the differential gear 13 to the wheels using the revolution angle of the drive source and the revolution angle of the differential gear 13 on the propeller shaft side detected by the above detection means.

In the present invention claimed in claim 1, a revolution angle of a drive source 10, a revolution angle acceleration of the drive source 10, and revolution angles of the wheels are detected, and any one or a plurality of combinations of these detected values are used to calculate and detect torques of shafts such as drive shafts 14 for connecting the differential gear 13 to the wheels.

In the present invention claimed in claim 2, a revolution angle of the drive source 10 and revolution angles of the wheels are detected, and torques, T_D, of shafts such as the drive shafts 14 for connecting the differential 13 to the wheels are calculated and detected from the following expression.

[expression 1]

T_Dr=T_Dl=k_Dr k_Dl/(k_Dr+k_Dl) (theta_Wr+theta_Wl −2 theta_E/(i_D i_T))

wherein k_D is a torsional stiffness of shafts such as the drive shafts 14 for connecting the differential gear to the wheels, theta_W is a revolution angle of each wheel, theta_E is a revolution angle of the drive source 10 such as an engine, i_D is a reduction ratio of the differential gear, i_T is a change gear ratio of the transmission 11, and r and l are right and left wheels.

In the present invention claimed in claim 3, when it is determined from the state of a vehicle that torques of shafts such as the drive shafts 14 are "0", revolution angles of the wheels and a revolution angle of the drive source such as an engine are reset to "0".

In the present invention claimed in claim 4, torques of shafts such as the drive shafts 14 connected to the wheels are calculated using a detected change gear ratio, i_T.

In the present invention claimed in claim 5, twisting torques of shafts connected to the wheels are calculated using an estimated change gear ratio, i_T*, which is calculated using the following expression.

[expression 2]

$$i\_T* = 2theta\_E/i\_D/(theta\_Wr+theta\_Wl)$$

In the present invention claimed in claim 6, calculated twisting torque values of shafts connected to the wheels are subjected to high-pass filtering processing.

In the present invention claimed in claim 7, calculation of torques of shafts such as the drive shafts 14 is performed in synchronism with the revolution of the drive source 10 such as an engine or a motor and a drive system such as wheels.

In the present invention claimed in claim 8, a revolution angle of any one of shafts disposed between the input of the differential gear 13 and the transmission 11 is detected and twisting torques of shafts such as the drive shafts 14 connected to the wheels are calculated using a revolution angle of any one of shafts disposed between input of the differential gear 13 and the transmission 11 in place of a revolution angle of the drive source 10 such as an engine or a motor.

In the present invention claimed in claim 9, a differential limiting torque, a revolution angle of the drive source 10 and revolution angles of the right and left wheels are detected to calculate and detect torques, T_D, of shafts such as the drive shafts 14 for connecting the differential gear 13 to the wheels using the following expressions.

[expression 3]

$$T\_Dr=2k\_Dr\ k\_Dl\ \{(theta\_Wr+theta\_Wl)/2-theta\_E/(i\_T\ i\_D)-T\_V\ \}/(k\_Dr+k\_Dl)$$

[expression 4]

$$T\_Dl=2k\_Dr\ k\_Dl\ \{(theta\_Wr+theta\_Wl)/2-theta\_E/(i\_T\ i\_D)+T\_V\ \}/(k\_Dr+k\_Dl)$$

wherein T_V is a differential limiting torque.

In the present invention claimed in claim 10, a revolution angle acceleration of the drive source 10 and a differential limiting torque are detected to calculate and detect torques, T_D, of shafts such as the drive shafts 14 for connecting the differential gear 13 to the wheels using the following expressions.

[expression 5]

$$T\_Dr=k\_Dr\ (i\_D\ i\_T\ (I\_E\ alpha\_E)-2T\_V)/2$$

[expression 6]

$$T\_Dl\_Dl\ (i\_D\ i\_T\ (I\_E\ alpha\_E)+2T\_V)/2$$

wherein I_E is an inertia moment of the drive source 10 such as an engine, and alpha_E is a revolution angle acceleration of the drive source 10 such as an engine.

In the present invention claimed in claim 11, a revolution angle and a revolution angle acceleration of the drive source 10 and revolution angles of the right and left wheels are detected to calculate and detect torques, T_D, of shafts such as the drive shafts 14 for connecting the differential gear 13 to the wheels using the following expressions.

[expression 7]

$$T\_Dr=k\_Dr\ \{-i\_D\ i\_T\ (I\_E\ alpha\_E)+2k\_Dl\ ((theta\_Wr+theta\_Wl)/2-theta\_E/(i\_D\ i\_T))\}/(k\_Dl-k\_Dr)$$

[expression 8]

$$T\_Dl=k\_Dl\ \{+i\_D\ i\_T\ (I\_E\ alpha\_E)-2k\_Dl\ ((theta\_Wr+theta\_Wl)/2-theta\_E/(i\_D\ i\_T))\}/(k\_Dl-k\_Dr)$$

In the present invention claimed in claim 12, in a direct-coupled 4WD vehicle, a revolution angle of the drive source 10 and revolution angles of the four wheels are detected to calculate and detect torques, T_D, of shafts such as drive shafts 14 and 20 for connecting the front and rear differential gears 19 and 13 to the wheels using the following expressions.

[expression 9]

$$T\_DFr=T\_DFl=k\_DFr\ K\_DFl\ ((theta\_WFr+theta\_WFl)-2theta\_E/i\_DF\ i\_T)/(k\_DFl+k\_DFr)$$

[expression 10]

$$T\_DRr=T\_DRl=k\_DRr\ k\_DRl\ ((theta\_WRr+theta\_WRl)-2theta\_E/i\_DR\ i\_T)/(k\_DRl+k\_DRr)$$

In the present invention claimed in claim 13, in a direct-coupled 4WD vehicle, a revolution angle acceleration of the drive source 10 and revolution angles of the four wheels are detected to calculate and detect torques, T_D, of shafts such as drive shafts 14 and 20 for connecting the front and rear differential gears 19 and 13 to the wheels using the following expressions.

[expression 11]

$$T\_DFr = T\_DFl = NUMF11 / DEN11\ (I\_E\ alpha\_E) + NUMF12 / DEN11\ \{i\_DF\ (theta\_WFl + theta\_WFr) - i\_DR\ (theta\_WRl + theta\_WRr)\ \}$$

[expression 12]

$$T\_DRr = T\_DRl = NUMR11 / DEN11\ (I\_E\ alpha\_E) + NUM12 / DEN11\ (i\_DF\ (theta\_WFl + theta\_WFr) - i\_DR\ (theta\_WRl + theta\_WRr)\ \}$$

wherein

NUMF11=i_DF i_DR^2i_T k_DFl k_DFr (k_DRl+ k_DRr),

NUMF12=2i_DF k_DFl k_DFr k_DRl k_DRr,

DEN11=2{i_DR^2k_DFl k_DFr (k_DRl+k_DRr)+i_ DF^2k_DRl k_DRr (k_DFl+k_DFr)},

NUMR11=i_DR i_DF^2i_T k_DRl k_DRr (k_DFl+ k_DFr), and

NUMR12=−2i_DR k_DFl k_DFr k_DRl k_DRr.

In the present invention claimed in claim 14, in a 4WD vehicle wherein power is distributed to the front and rear wheels through the center differential gear 31 with a differential limiting mechanism, torques, T_D, of shafts such as drive shafts 14 and 20 for connecting the front and rear differential gears 19 and 13 to the wheels are calculated and detected using a revolution angle of the drive source 10, revolution angles of the four wheels and a differential limiting torque detected by the respective detection means.

In the present invention claimed in claim 15, in a 4WD vehicle wherein power is distributed to the front and rear wheels through the center differential gear 31 with a differential limiting mechanism, torques, T_D, of shafts such as drive shafts 14 and 20 for connecting the front and rear differential gears 19 and 13 to the wheels are calculated and detected using a revolution angle acceleration of the drive source 10 and a differential limiting torque detected by the respective detection means.

In the present invention claimed in claim 16, in a 4WD vehicle wherein power is distributed to the front and rear wheels through the center differential gear 31 with a differential limiting mechanism, torques, T_D, of shafts such as drive shafts 14 and 20 for connecting the front and rear differential gears 19 and 13 to the wheels are calculated and detected using a revolution angle and a revolution angle acceleration of the drive source 10 and revolution angles of the four wheels detected by the respective detection means.

In the present invention claimed in claim 17, torques, T_D, of shafts such as drive shafts 14 for connecting the differential gear 13 to the wheels are calculated and detected using a revolution angle of the drive source and a revolution angle of the differential gear 13 on the propeller shaft side detected by the respective detection means.

The above and other objects, features and advantages of the invention will become more apparent from the following description when taken in conjunction with the accompanying drawings.

BRIEF DESCRIPION OF THE DRAWINGS

FIG. 6 is a diagram showing a change gear ratio map for obtaining a change gear ratio from a shift position switch in Embodiment 1;

FIG. 8 is a waveform diagram showing time changes in torque value calculated and detected in Embodiment 3;

FIG. 9B and 9C are diagrams showing torque calculation timing, engine revolution pulses and wheel revolution pulses in Embodiment 4;

FIG. 10A, 10B and 10C are diagrams showing torque calculation timing, engine revolution pulses and wheel revolution pulses in Embodiment 4;

DESCRIPTION OF THE PREFERRED EMBODIMENT

Embodiment 1

Embodiment 1 of the present invention is described hereinunder with reference to FIGs.1 to 5.

Figure 1:
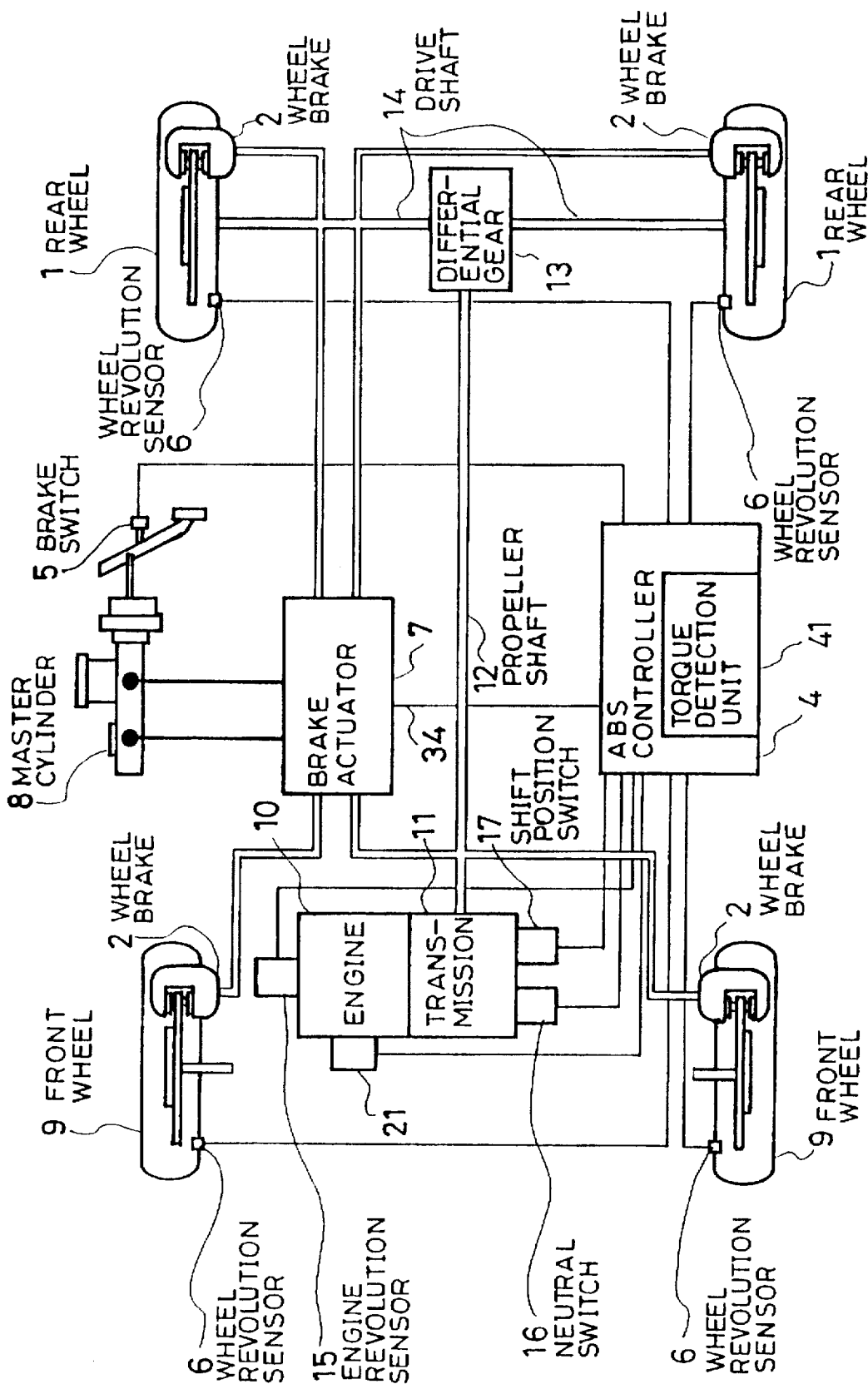
FIG. 1 is a diagram showing the entire configuration of a torque detection apparatus according to Embodiment 1 of the present invention.

A description is first given of the configuration of the present invention shown in this embodiment. FIG. 1 is a diagram showing the entire configuration of Embodiment 1 according to the present invention wherein the same elements as those of the prior art are given the same reference numerals.

In FIG. 1, reference numeral 1 represents rear wheels (right and left rear wheels), 2 wheel brakes, 4 an ABS controller, 41 a torque calculation unit as torque calculation means, 5 a brake switch, 6 wheel revolution sensors as wheel revolution angle detection means (magnetic pick-up), 7 a brake actuator, 8 a master cylinder, 9 front wheels (right and left front wheels), 10 a drive source such as an engine, motor or the like (to be referred to as "engine" hereinafter), 11 a transmission, 12 a propeller shaft, 13 a differential gear, 14 drive shafts having torsional stiffness for transmitting a drive torque to the right and left wheels from the differential gear 13, 15 an engine revolution sensor (optical encoder) as detection means for detecting a revolution angle and a revolution angle speed of the drive source, 16 a neutral switch, and 17 a shift position switch as change gear ratio detection means.

The engine 10 and the transmission 11 are coupled to the right and left rear wheels 1 by the respective shafts (such as the propeller shaft 12 and the drive shafts 14) having torsional stiffness for transmitting a drive torque through the differential gear 13.

The torque calculation unit 41 (for the drive shafts) is incorporated in the ABS controller 4 which comprises a microcomputer and an input/output unit, receives revolution angles of the right and left front and rear wheels detected by the wheel revolution sensors 6 for the right and left front and rear wheels and an engine revolution angle detected by the engine revolution sensor 15 so as to calculate a torque of each of the drive shafts 14, and outputs the calculated torque to the ABS controller 4.

Figure 2:
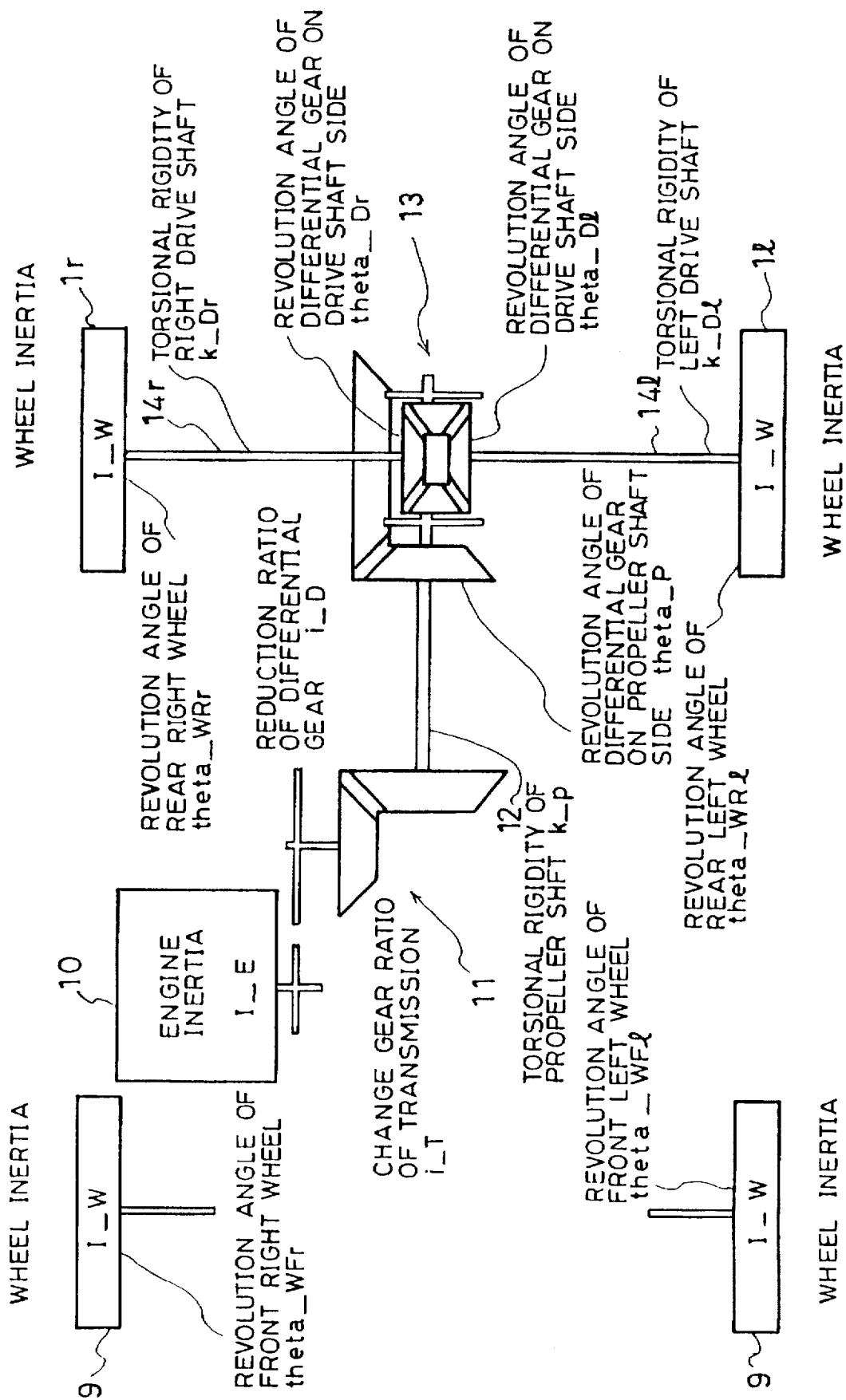
FIG. 2 is a diagram showing a power transmission system model for a 2WD vehicle in Embodiment 1.

A description is subsequently given of detection principle. FIG. 2 shows a drive braking system model of a rear-wheel drive car. In FIG. 2, 1r represents a right rear wheel, 11 a left rear wheel, 14r is a right drive shaft, 14l a left drive shaft, 13 a differential gear, 12 a propeller shaft, and 10 an engine. The same elements as those in FIG. 1 are given the same reference numerals. As shown in FIG. 2, when revolution inertias of the right and left rear wheels 1r and 11 and the engine 10, a change gear ratio of the transmission 11, a reduction ratio of the differential gear 13, and torsional rigidities of the propeller shaft 12 and the drive shafts 14r and 14l are taken into account, equations of motion for this revolution system can be expressed by the following expressions.

Firstly, since the torques of the right and left drive shafts, 14r and 14l, a road surface counterforce and a brake torque are applied to the right and left rear wheels, 1r and 1l, equations of motion are expressed as follows.

[expression 20]

$$T\_W\ alpha\_Wr = -k\_Dr\ (theta\_Wr - theta\_Dr) + mu\_r\ W_{-rR} - r\_Br$$

[expression 21]

$$I\_W\ alpha\_Wl = -k\_Dl\ (theta\_Wl - theta\_Dl) + mu\_l\ W\_lR - T\_Bl$$

since a propeller torque and an engine torque are applied to the engine 10, an equation of motion is expressed as follows.

[expression 22]

$$I\_E\ alpha\_E = -k\_P/i\_T_{(theta\_}P - theta\_E/i\_T) + T\_E$$

Input/output revolution angles of the differential gear 13 have the following relationship.

[expression 23]

$$theta\_P = i\_D/2(theta\_Dr + theta\_Dl)$$

Since right and left output torques of the differential gear 13 are obtained by multiplying half of an input torque by a reduction ratio of the differential gear, the following expressions can be established.

[expression 24]

$$k\_Dr\ (theta\_Wr - theta\_Dr) = \tfrac{1}{2}\ k\_P\ i\_D\ (theta\_P - theta\_E/i\_T)$$

[expression 25]

$$k\_Dl\ (theta\_Wl - theta\_Dl) = \tfrac{1}{2}\ k\_P\ i\_D\ (theta\_P - theta\_E /i\_T)$$

wherein I_W is a wheel revolution inertia, I_E an engine revolution inertia, R a wheel radius, theta-W a wheel revolution angle, theta_D a revolution angle of the differential gear on the drive shaft side, theta_P a revolution angle of the differential gear on the propeller shaft side, theta_E an engine revolution angle, alpha_W a wheel revolution angle acceleration, alpha_E an engine revolution angle acceleration, k_D a torsional stiffness of the drive shaft, k_p a torsional stiffness of the propeller shaft, i_D a reduction ratio of the differential gear, i_T a change gear ratio of the transmission, mu a road surface friction coefficient, W a wheel load, T_B a brake torque, T_E an engine torque, and r and l right and left wheels.

The following expression for obtaining torques of the drive shafts 14r and 14l can be obtained from the above expressions 24 and 25.

[expression 26]

$$T\_Dr = T\_Dl = \tfrac{1}{2}\ k\_P\ i\_D\ (theta\_P - theta\_E/i\_T)$$

When the revolution angle of the differential gear 13 on the propeller shaft side is removed from the expressions 23, 24 and 25, the following expression can be obtained.

[expression 27]

$$\begin{aligned}T\_Dr &= T\_Dl \\ &= k\_Dr\ (theta\_Wr - theta\_Dr) \\ &= k\_Dl\ (theta\_Wl - theta\_Dl) \\ &= 2\ k\_P\ k\_Dr\ k\_Dl\ ((theta\_Wr + theta\_Wl)\ /\ 2 - theta\_E\ / \\ &\quad (i\_T\ i\_D))\ /\ (k\_P\ (k\_Dr + k\_Dl) + 4\ (k\_Dr + k\_Dl)\ /\ i\_D^{\wedge}2)\end{aligned}$$

The expression 27 shows that torques of the right and left drive shafts (equal to each other) can be obtained by detecting revolution angles of the right and left wheels and a revolution angle of the engine. It is necessary to identify torsional rigidities of the drive shafts 14r and 14l and the propeller shaft 12 and reduction ratios of the differential gear 13 and the transmission 11.

Further, if a torsional stiffness of the propeller shaft 12 can be ignored, the following expression can be obtained based on the assumption that a torsional stiffness of the propeller shaft 12 in the expression 27 is infinite.

[expression 1]

$$T\_Dr = T\_Dl = k\_Dr\ k\_Dl/(k\_Dr + k\_Dl)\ (theta\_Wr + theta\_Wl - 2theta\_E/(i\_D\ i\_T))$$

This embodiment provides an apparatus for detecting a torque of each of the drive shafts using a relational expression (torsional stiffness of drive shaft)×(twist angle of drive shaft) shown in the expression 1.

A description is subsequently given of the operation of this embodiment.

Figure 3:
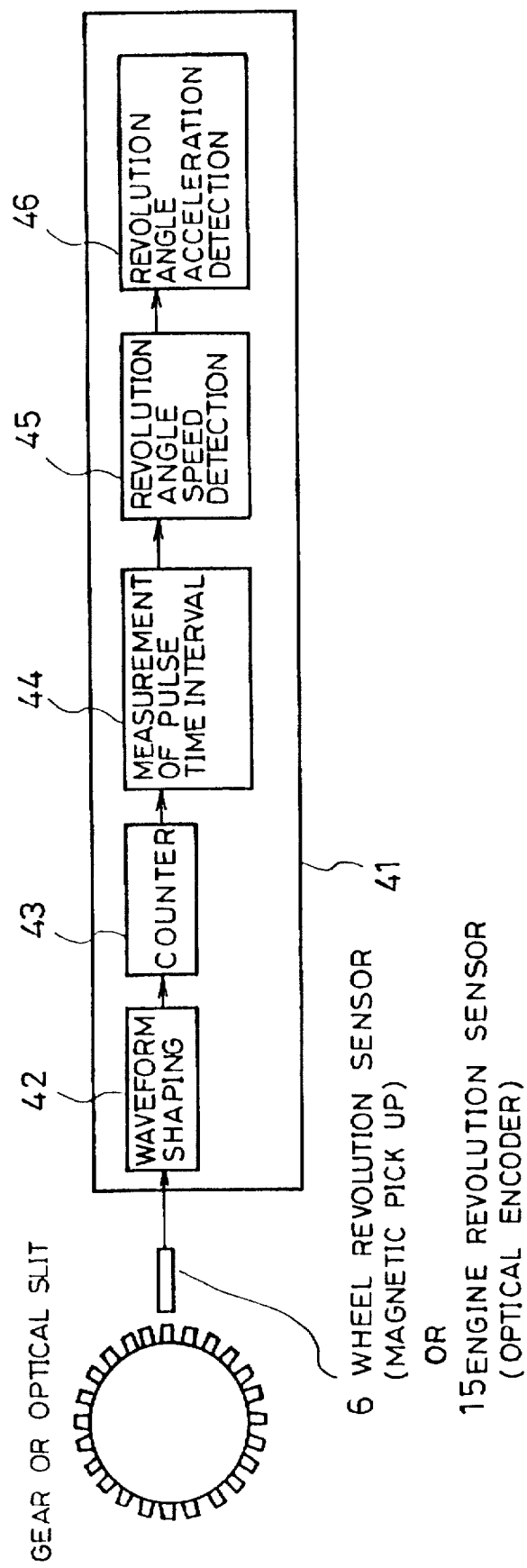
FIG. 3 is a diagram showing how to detect a revolution angle, revolution angle speed and revolution angle acceleration in Embodiment 1.
Figure 4:
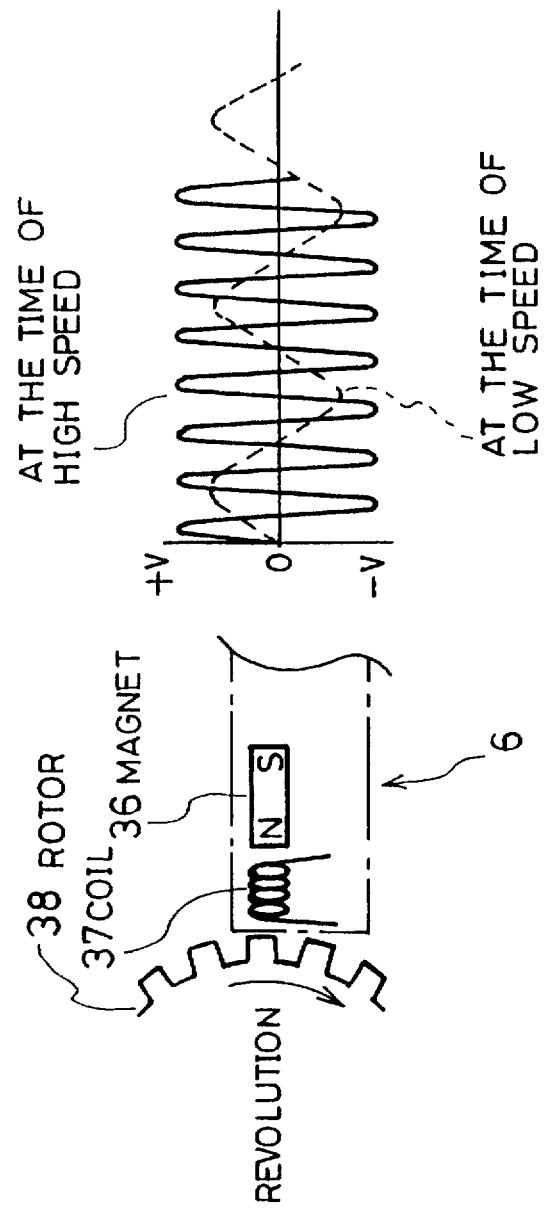
FIG. 4 is a diagram showing how to detect a revolution angle, revolution angle speed and revolution angle acceleration in Embodiment 1.

A method for detecting a wheel revolution angle by means of the wheel revolution sensor 6 (magnetic pick-up) shown in FIG. 1 and a method for detecting an engine revolution angle by means of the engine revolution sensor 15 (optical encoder) are first described with reference to FIG. 3. Each of the right and left wheel revolution sensors 6 generates a sine wave signal which is synchronous with rotation of a gear fixed to the wheel when the wheel 1 turns. For instance, as shown in FIG. 4, this sensor 6 comprises a magnet 36 and a coil 37 and is generally attached to a wheel support such as a steering knuckle. For example, a rotor 38 attached to a front axle shaft has 48 serrations and the yoke (tip) of the wheel revolution sensor 6 is adjacent to the serrations. When the rotor 38 having the serrations turns, a magnetic flux generated from the magnet 36 of the wheel revolution sensor 6 is changed and an AC voltage is generated in the coil 37. The frequency of this AC voltage varies in relation to the number of revolutions of the front axle shaft, whereby a wheel revolution angle is detected. The engine revolution sensor 15 generates a slightly round and rectangular wave signal which is synchronous with rotation of an optical disk fixed to the crank shaft of the engine 10 when the engine 10 turns. These signals are input into the torque calculation unit 41 (for the drive shaft) as shown in FIG. 3, and pass through a waveform shaper 42 constituting the torque calculation unit 41 to become rectangular wave signals. These rectangular wave signals are then input into a counter 43 to be counted as pulses. A revolution angle of each of the wheels 1 and 9 or the engine 10 can be detected by multiplying a count number by a dividing angle (obtained by dividing 360° by a number of gears or a number of slits of the optical disk).

Further, a revolution angle speed and a revolution angle acceleration to be used in other embodiments to be described later can be obtained as follows. As shown in FIG. 3, a time interval between the input revolution pulses is measured by a pulse time interval measuring instrument 44. A revolution angle speed can be obtained by calculating (a revolution angle per pulse)/(a time interval between pulses) by means of the revolution angle detection unit 45. Further, a revolution angle acceleration can be obtained by calculating (a revolution angle speed–a revolution angle speed calculated previously) / (a time interval between revolution pulses) obtained by the revolution angle acceleration detection unit 46.

A description is subsequently given of a method for detecting a torque of each of the drive shafts by means of the torque calculation unit 41 (for the drive shafts) with reference to a flow chart of FIG. 5. This flow chart shows a torque calculation sub-routine which is executed every control cycle. In step S1, a signal from the neutral switch 16 shown in FIG. 1 for detecting whether or not the clutch pedal is stepped on is input to determine whether the transmission 11 is at neutral, and if it is at neutral, the sub-routine advances to step S10 because a torque of the drive shaft 14 is considered to be "0". Revolution angles of the right and left wheels, theta_Wr and theta-Wl, and a revolution angle of the engine, theta_E, are reset to "0" and a torque of the drive shaft 14, T_D, is set to "0" (step s11).

If the transmission 11 is not at neutral, the subroutine goes to step S2 in which change of the brake switch 5 from OFF to ON is detected. If the brake switch 5 changes from OFF to ON, the sub-routine goes to step S10, and then revolution angles of the right and left wheels, theta_Wr and theta_Wl, and a revolution angle of the engine, theta_E, are reset to "0" and a torque of the drive shaft 14, T_D, is set to "0" (step S11). This is because a torque of the drive shaft 14 may be assumed to be "0" since the brake switch 5 changes from OFF to ON when a driver removes his/her foot from the accelerator and steps on the brake pedal, that is, immediately before a drive torque from the engine 10 becomes null and a brake torque is generated.

If the brake switch 5 does not change from OFF to ON, the sub-routine goes to step S3 in which a shift position signal from the shift position switch 17 for detecting a shift lever position of the transmission 11 is input and a change gear ratio, i_T, corresponding to the shift position is received from the prestored change gear ratio map. For instance, the change gear ratio map for a vehicle equipped with a 5-speed manual transmission is shown in FIG. 6.

In step S4, the revolution angles of the right and left wheels, theta_Wr and theta_Wl, and the revolution angle of the engine, theta_E, processed as described above, are input.

In step S5, the input revolution angles of the right and left wheels, theta_Wr and theta_Wl and revolution angle of the engine, theta_E and the received change gear ratio of the transmission 11, i_T are used to calculate a torque of the drive shaft, T_D, using the expression 1. A torsional stiffness of the drive shaft, k_D and a reduction ratio of the differential gear, i_D, are identified in advance and their stored values are used.

In step S6, the calculated torque of the drive shaft, T_D, is provided to the ABS controller 4.

The ABS controller 4 receives the signal from the brake switch 5 and the calculated and detected wheel revolution angles from the wheel revolution sensors 6, in addition to the torque of the drive shaft, and sets the braking force of the wheel brake 2 based on these signals and provides a brake force control signal 34 to the actuator 7. The actuator 7 supplies an ABS control hydraulic pressure which is prepared by controlling a master hydraulic pressure from the master cylinder 8 in accordance with the braking force control signal 34 to each of the wheel brakes 2 of the front wheels 9 and the rear wheels 1 so as to control the braking force (pad pressing force) of each of the wheel brakes 2.

Although the expression 1 in which the torsional stiffness of the propeller shaft 12 is ignored has been described above, when a torsional stiffness of the propeller shaft, k_P, is identified in advance and stored in the torque calculation unit 41, and a torque of the drive shaft 14 is calculated using the expression 27 in which a torsional stiffness of the propeller shaft, k_P, is taken into account, a more accurate torque of the drive shaft 14 can be detected in the same manner as described above.

If the revolution angle speed of the engine is too large, an engine brake torque cannot be ignored. Therefore, a more accurate torque of the drive shaft can be obtained by calculating an engine brake torque from an engine revolution angle speed using the map which stores the relationship between engine revolution angle speed and engine brake torque in step S11 and by adding the calculated engine brake torque to the torque of the drive shaft calculated in step S5.

Embodiment 2

Embodiment 2 of the present invention is described hereinunder. Since this embodiment has the same configuration as the above Embodiment 1, the same elements are given the same reference numerals as those in FIG. 1 and their descriptions are omitted. In Embodiment 1,the torque calculation unit 41 receives a signal indicative of a shift position from the shift position switch 17 and obtains a change gear ratio of the transmission 11, i_T, from the prestored change gear ratio map in accordance with each shift position. Embodiment 2 differs from Embodiment 1 in that the torque calculation unit 41 detects from the state of a vehicle that a torque is "0" and calculates a change gear ratio, i_T, using the followi ng expression when the torque is "0". Therefore, only a method for determining a change gear ratio is described.

[expression 2]

$$i\_T* = 2\ theta\_E/i\_D/(theta\_Wr + theta\_Wl)$$

Figure 7:
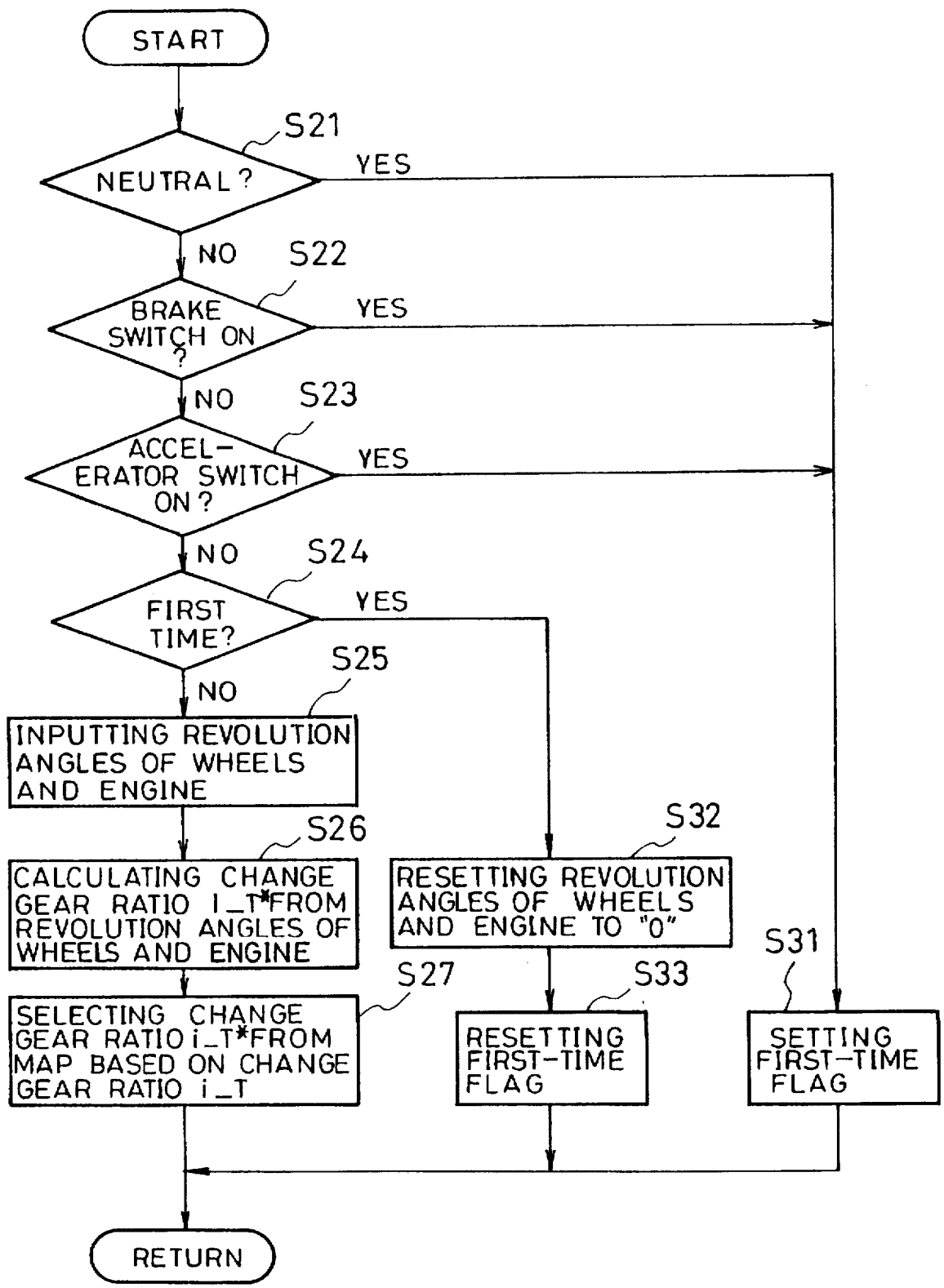
FIG. 7 is a flow chart showing the operation of calculating a change gear ratio in Embodiment 2.

A description is given of a method for calculating a change gear ratio with reference to the flow chart of FIG. 7. In step S21, a signal from the neutral switch 16 shown in FIG. 1 for de tect ing whether or not t he clutch pedal is stepped on is input to determine whether or not the transmission 11 is at neutral. If it is at neutral, torsion cannot be measured and, accordingly, th e sub-routine advances to step S31 in which a first-time flag is set to complete the sub-routine. This first-time flag is for resetting a revolution angle of the engine and revolution angles o f the wheels to "0" when a torque is determined to be "0".

If the transmission 11 is not at neutral, in step S22, a signal from the brake switch 5 is input, and if it is detected that the brake pedal is stepped on, a brake torque is generated, whereby a torque is not "0" any longer. Then the sub-routine goes to step S31 to set the first-time flag and complete the sub-routine.

If the brake pedal is not stepped on, the sub-routine goes to step S23 in which a signal from the accelerator switch 21 shown in FIG. 1 is input. If it is detected that the accelerator is stepped on, an engine torque is generated and a torque is not "0". Then the sub-routine goes to step S31 to set the first-time flag and complete the sub-routine.

Under the above conditions. if a torque is "0". the sub-routine goes to the subsequent step S24. In this case. there is an engine brake torque in fact, but this is considered to be small and ignored. If a revolution angle speed of the engine is large, an engine brake torque cannot be ignored. Therefore. when an engine revolution angle speed is larger than a set value, the sub-routine may be brought to an end.

In step S24. the first-time flag is checked and, if the first-time flag is set, the sub-routine goes to step S32 in which wheel revolution angles and an engine revolution angle are reset to "0" and the first-time flag is reset.

If the first-time flag is not set, the sub-routine goes to step S25 in which revolution angles of the right and left wheels, theta_Wr and theta-wl, and a revolution angle of the engine, theta_E, are input. In step S26, the input revolution angles of the right and left wheels, theta_Wr and theta_Wl and a revolution angle of the engine, theta_E, and a reduction ratio of the differential gear, i_D, are used to calculate an estimated change gear ratio, i_T*, using the expression 2.

In step S27, the closest value to the calculated change gear ratio is selected from change gear ratios set in the change gear ratio map as described in Embodiment 1 above based on the calculated estimated change gear ratio i_T*. For example, when a change gear ratio is 1.5 for 3 speeds and 1.0 for 4 speeds, and the calculated change gear ratio is 1.1, it is determined that the calculated change gear ratio i s for 4 speeds and is changed to 1.0. Thereby, an accurate change gear ratio, i_T*, can be obtained in a short period of time.

The torque calculation unit 41 calculates and detects torques of shafts such as drive shafts coupled to the wheels using the change gear ratio, i_T*, obtained as described above.

In this embodiment, only when the torque is determined to be "0". a change gear ratio is calculated. H owever, when a revolution angle of the engine is large after it is reset to "0", the effect of an error caused by an engine torque and brake torque is small. Therefore, a change gear ratio may be calculated even when the torque is not determined to be "0" (In this case, the transmission 11 should not be changed to neutral during this calculation).

Embodiment 3

Embodiment 3 of the present inven tion is d escribed hereinunder. since this embodiment has the same configuration as the above Embodiment 1, the same elements are given the same reference numerals as those in FIG. 1 and accordingly, their descriptions are omitted. This embodiment differs from Embodiment 1 in that torques of shafts such as drive shafts calculated by the torque calculation unit 41 is subjected to high-pass filtering processing. As shown in FIG. 8, an offset is generated in the torque calculated in Embodiment 1 because the zero point is slightly shifted due to calculation errors and the like in some cases. To avoid this effect, the calculated torque value is subjected to high-pass filtering processing. Since calculation of a torque is performed by a microcomputer, high-pass filtering processing is also performed by a microcomputer.

The high-pas filtering processing can be effected by calculating the following expression when a cut-off frequency is represented by 1/(2PiT_1) and a sampling time by T_S.

[expression 28]

$$T\_D*(k)=(2\ T\_1\ T\_D(k)-2\ T\_1\ T\_D(k-1)-(T\_S-2\ T\_1)$$
$$T\_D*(k-1))/(T\_S+2\ T\_1)$$

wherein k is a k-th torque calculated every control cycle. T_D*(k) is a k-th torque after filtering processing and T_D(k) a k-th toque before filtering processing.

When torques calculated every control cycle, T_D(k), T_D(k−1) and T_D*(k−1), are input to calculate the above expression using a microcomputer, a torque, T_D*(k), which has been subjected to high-pass filtering processing, is obtained and the effect of the offset can be reduced.

Embodiment 4

Embodiment 4 of the present invention is described hereinunder with reference to FIGS. 9A, 9B and 9C and 10A, 10B and 10C. Since this embodiment has the same configuration as the above Embodiment 1, the same elements are given the same reference numerals as those in FIG. 1 and accordingly, their descriptions are omitted. FIGS. 9A, 9B and 9C and 10A, 10B and 10C show timings for the torque calculation unit 41 to calculate torques in synchronism with a control cycle, the pulse output of the engine revolution sensor 6 (engine revolution pulses) and the pulse output of the wheel revolution sensor 6 (wheel revolution pulses). FIGs. 9C and 10A, 10B and 10C, differs from each other in the resolution of the engine revolution sensor 15. In FIGS. 9A, 9B and 9C, the pulse output frequency of the engine revolution sensor 15 is once per an engine revolution angle of 2°0 and the pulse output frequency of the wheel revolution sensor 6 is once per a wheel revolution angle of 4°. In FIGS. 10A, 10B and 10C, the pulse output frequency of the engine revolution sensor 15 is once per 180° and the pulse output frequency of the wheel revolution sensor 6 is the same as that of FIGS. 9A, 9B and 9C. Consequently, when an engine revolution angle and wheel revolution angle are obtained by multiplying (a pulse output count of the revolution sensor) by (a revolution angle per pulse output count of the revolution sensor) at each torque calculation timing to calculate a twist angle, a high twist angle accuracy at 0.25° (2°/i_T/i_D=0.25°) in terms of wheel revolution angle can be obtained for engine revolution angle in FIGS. 9A, 9B and 9C whereas a low twist angle accuracy at 22.5° (18°/i_T/i_D=22.5°) can be obtained in FIGS. 10A, 10B and 10C.

Then, if, instead that an engine revolution angle is calculated by multiplying (a pulse output count of the engine revolution sensor 15) by (a revolution angle per pulse output count of the engine revolution sensor 15) at a torque calculation timing which is synchronous with a fixed control cycle, a twist angle is calculated at a pulse output timing of the engine revolution sensor 15, a high accuracy can be obtained for engine revolution angle as well. In other words, at a calculation timing of a k-th torque, a twist angle calculated at a pulse output timing of the engine revolution sensor 15 indicated by "j" in FIG. 10B is used. At this time, a wheel revolution angle is calculated by multiplying (a pulse output count of the wheel revolution sensor 6) at a timing indicated by "j" by (a revolution angle per pulse output count). Thereby, a high engine revolution angle accuracy can be obtained even when an engine revolution sensor having a low pulse resolution is used.

A description is subsequently given of the operation of this embodiment. The basic operation is the same as in Embodiment 1 and descriptions of the same steps are omitted. This embodiment differs from Embodiment 1 in steps 54 and S10 of FIG. 5, and accordingly, the contents of these steps only are described. The contents of the step S4 are as follows. As described in the foregoing, at a calculation timing of a k-th torque, an engine revolution angle is calculated at a pulse output timing of the engine revolution sensor 15 indicated by "j" in FIG. 10B, and at the same time, a wheel revolution angle is calculated. Thereby, a highly accurate engine revolution angle can be obtained at a pulse output timing of the engine revolution sensor 15 and a highly accurate wheel revolution angle can also be obtained due to a high pulse resolution. As the result, a highly accurate twist angle can be obtained. In step S10 of FIG. 5 of Embodiment 1, counters for revolution angles of the right and left wheels, theta_Wr and theta_Wl, and a revolution angle of the engine, theta_E, are simply reset to "0". If the resolution of the engine revolution angle sensor 15 is lower than that of the wheel revolution angle sensor 6, when a count is simply reset to "0", the maximum error of one pulse resolution (22.5°) is generated in the detected engine revolution angle, thereby making it possible to achieve high accuracy. Then, when resetting to "0" in the calculation of a k-th torque of FIG. 10A, a revolution angle until the next engine revolution pulse input is calculated from (one pulse revolution [degree])−(a revolution angle speed [deg/sec] at the time of an engine revolution pulse input indicated by "j" of FIG. 10B)×(a wheel revolution time t[sec]). Thereby an error caused by resetting to "0" can be reduced. An engine revolution angle speed at a time indicated by "j" can be obtained from (an engine revolution angle from a time, "j−1", to a time, "j", i.e., 180°)/(an engine revolution time from a time "j−1" to a time "j"). A highly accurate twist angle can be obtained by synchronizing engine revolution pulses with pulses having a long cycle (long interval between pulses).

In the above description, only at the time of resetting to "0" for calculation of an engine revolution angle, a wheel revolution angle is obtained from (a wheel revolution speed)×(a wheel revolution time), but (a wheel revolution speed)×(a wheel revolution time) may be used to calculate a twist angle for each torque calculation.

Only an engine revolution angle has been described above, but the above description may be applied to a wheel revolution angle.

As described above, a highly accurate torque can be detected by calculating a torque in synchronism with revolution of an engine and a drive system such as wheels even when the revolution sensor has low pulse resolution.

Embodiment 5

Figure 11:
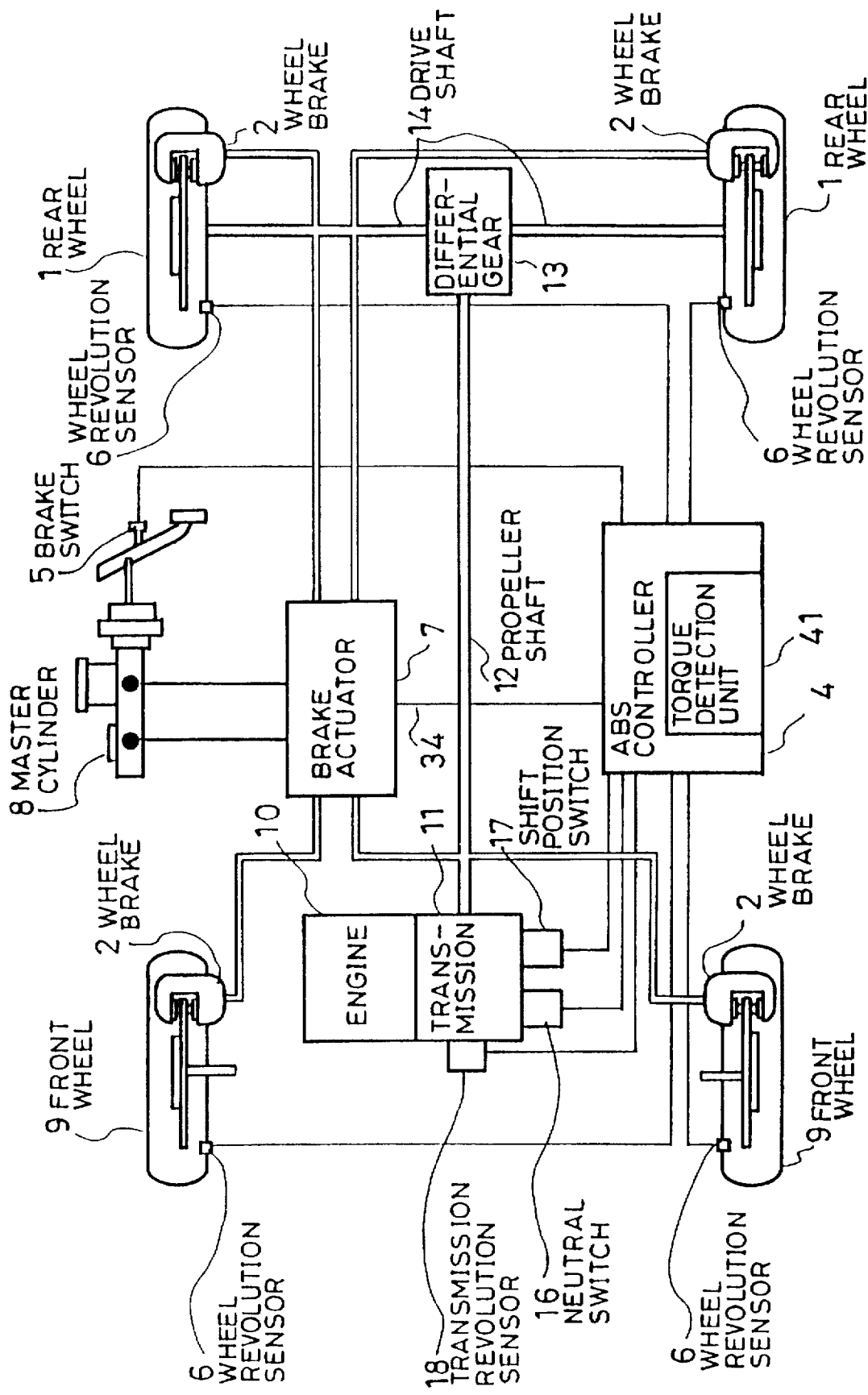
FIG. 11 is a diagram showing the entire configuration of a torque detection apparatus according to Embodiment 5.

Embodiment 5 of the present invention is described hereinunder. FIG. 11 is a block diagram showing the configuration of this Embodiment 5 wherein the same elements are given the same reference numerals as those in FIG. 1 and their descriptions are omitted. This Embodiment 5 differs from Embodiment 1 shown in FIG. 1 in that shaft revolution angle detection means for detecting a revolution angle of any one of shafts disposed between input of the differential gear 13 and the transmission 11 is used in place of the drive source revolution angle detection means for the engine 10. FIG. 11 shows an example in which a transmission revolution sensor 18 is attached to the transmission 11.

The operation of this embodiment is almost the same as in Embodiment 1, but differs in the following points. In Embodiment 1, an engine revolution angle is detected, whereas, in Embodiment 5, a revolution angle of a clutch shaft on the transmission side or a torque converter shaft on the transmission side is detected. In this case, in the flow chart of FIG. 5 showing torque calculation, the step S2 for determination whether the transmission is at neutral can be omitted because the clutch shaft or the torque converter shaft on the transmission side is not affected by clutch disconnection or torque converter slide. If the transmission 11 moves to neutral, the relationship between wheel revolution angle and transmission revolution angel does not vary. Therefore, after a wheel revolution angle and a transmission revolution angle are reset to "0" when a torque of the drive shaft is "0", it is not necessary to reset these angles again.

Figure 5:
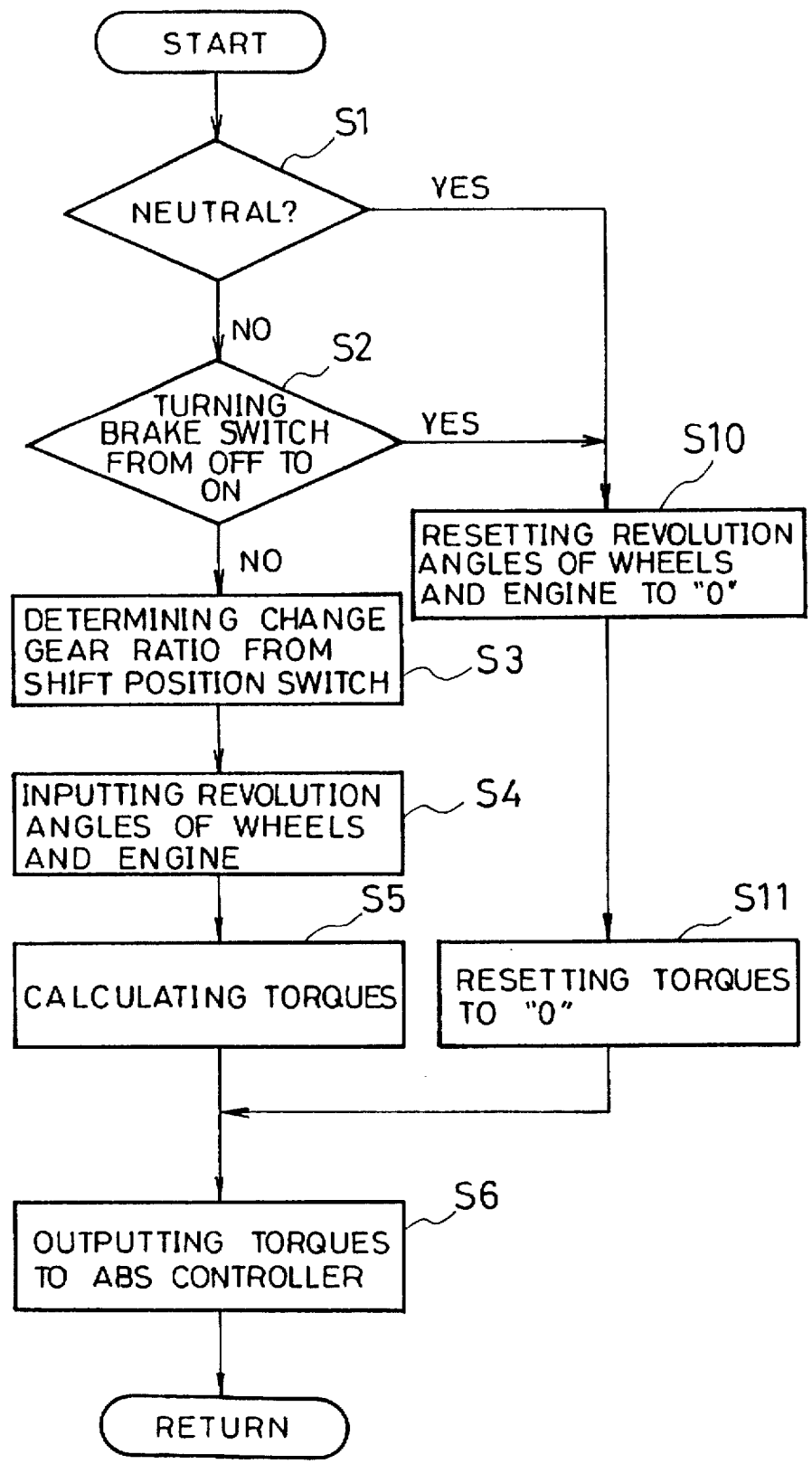
FIG. 5 is a flow chart showing the operation of calculating torques in Embodiment 1.

When a revolution angle of the input shaft of the differential gear or the output shaft of the transmission is detected by the transmission revolution sensor 18 in place of an engine revolution angle, the step S3 of receiving a change gear ratio can be omitted in the flow chart of FIG. 5 showing torque calculation, in addition to the case where a revolution angle of the clutch shaft on the transmission side or a revolution angle of the torque converter shaft on the transmission side is detected. This is because the input shaft of the differential gear or the output shaft of the transmission is not affected by a change gear ratio as well as clutch disconnection and torque converter slide.

Embodiment 6

Figure 12:
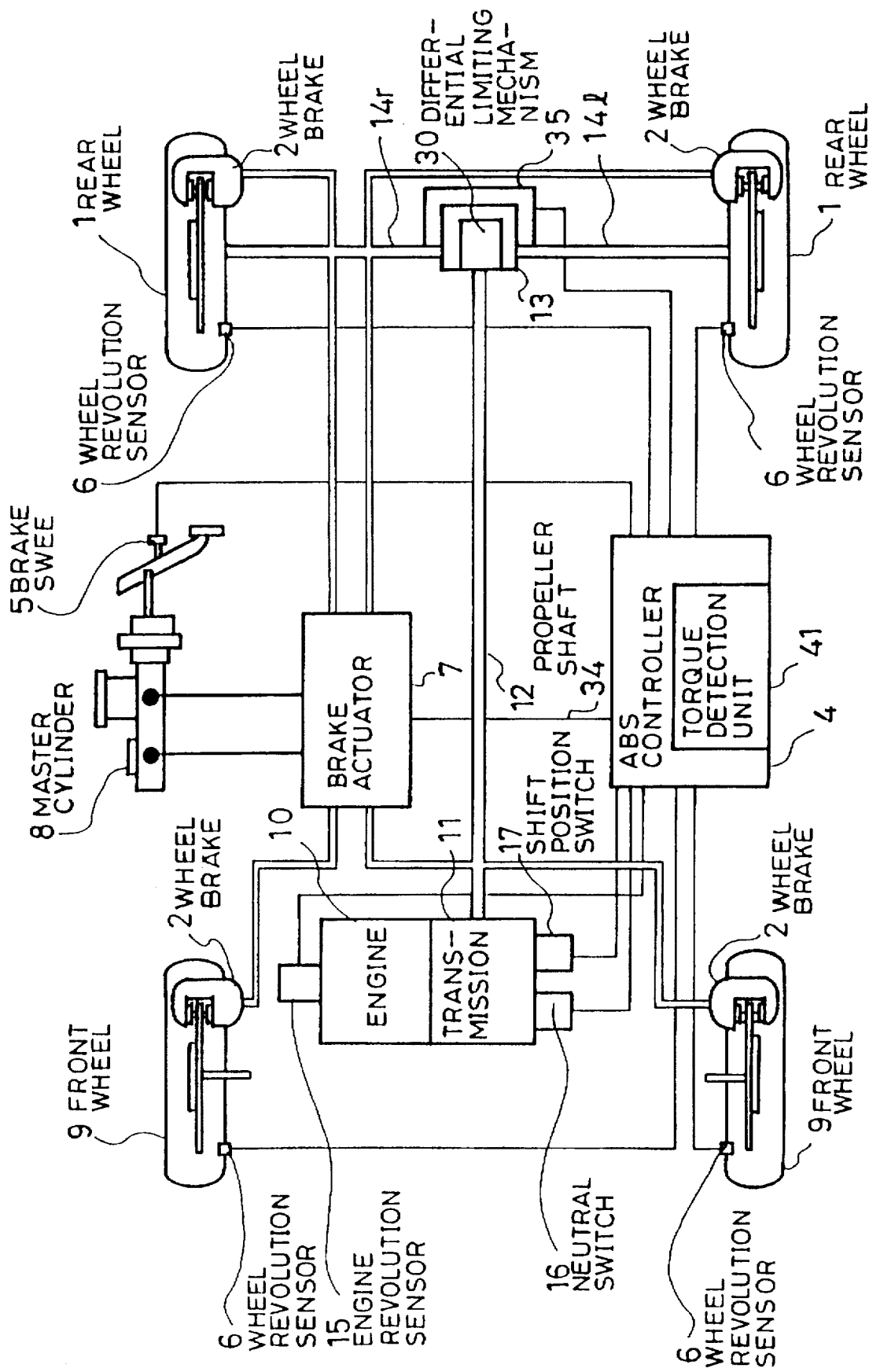
FIG. 12 is a diagram showing the entire configuration of a torque detection apparatus according to Embodiment 6.

Embodiment 6 of the present invention is described hereinunder. FIG. 12 is a block diagram showing the configuration of this embodiment wherein the same elements as those of Embodiment 1 are given the same reference numerals as in FIG. 1 and their descriptions are omitted. This embodiment differs from Embodiment 1 in that the differential gear 13 of a vehicle to be controlled comprises a differential limiting mechanism 30 and differential limiting torque detection means 35.

Figure 13:
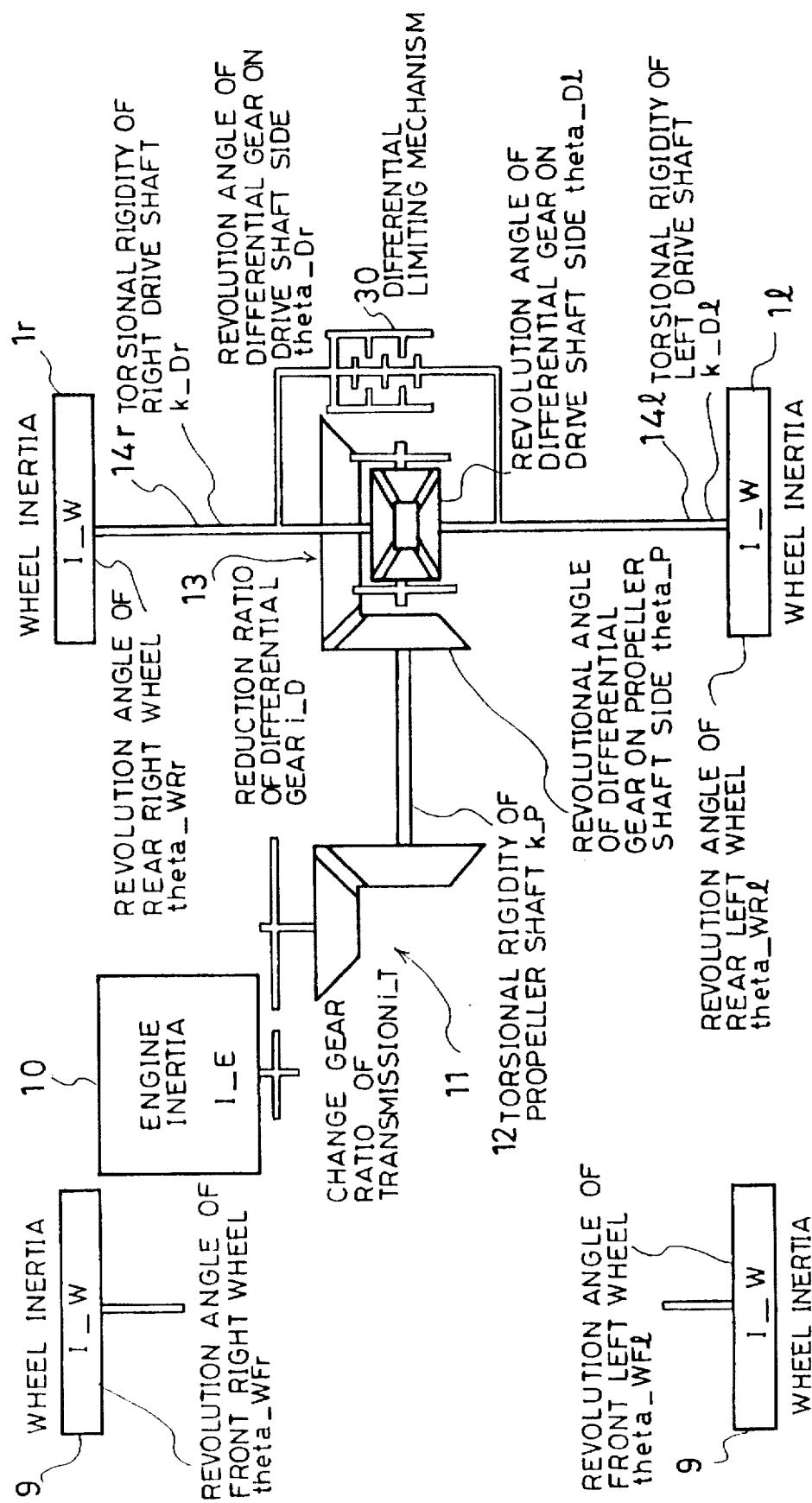
FIG. 13 is a diagram showing a power transmission system model for a 2WD vehicle having a differential limiting mechanism in Embodiment 6.

A description is first given of detection principle. FIG. 13 differs from FIG. 2 of Embodiment 1 in that the differential gear 13 has the differential limiting mechanism 30. The same elements as those of FIG. 2 are given the same reference symbols and their descriptions are omitted. Like Embodiment 1, equations of motion for a revolution system are expressed by the following expressions.

[expression 29]

$$I\_W\ alpha\_Wr = -k\_Dr(theta\_Wr - theta\_Dr) + mu\_r\ W\_rR - T\_Br + T\_V$$

[expression 30]

$$I\_W\ alpha\_Wl = -k\_Dl(theta\_Wl - theta\_Dl) - mu\_l\ W\_lR - T\_Bl - T\_V$$

[expression 31]

$$I\_E\ alpha\_E = -k\_P/i\_T(theta\_P - theta\_E/i\_T) + T\_E$$

[expression 32]

$$theta\_P = i\_D/2(theta\_Dr + theta\_Dl)$$

Since a differential limiting torque is applied to the differential gear 13, the following expressions are established.

[expression 33]

$$K\_Dr(theta\_Wr - theta\_Dr) = \tfrac{1}{2}k\_P\ i\_D(theta\_P - theta\_E/i\_T) + T\_V$$

[expression 34]

$$k\_Dl(theta\_Wl - theta\_Dl) = \tfrac{1}{2}k\_P\ i\_D(theta\_P - theta\_E/i\_T) - T\_V$$

A revolution angle of the differential gear 13 on the propeller shaft side is eliminated from the expressions 32, 33 and 34 and these expressions are rearranged to obtain the following expressions.

[expression 35]
$$T\_Dr = 2\ k\_Dr\ k\_Dl\ k\_P\ ((theta\_Wr + theta\_Wl)\ /\ 2 - theta\_E \\ /\ (i\_T\ i\_D)) - T\_V) - 4\ k\_Dl\ T\_V\ /\ i\_D^2\ /\ (k\_P\ (k\_Dr + \\ k\_Dl) + 4\ K\_Dl\ k\_Dr\ /\ i\_D^2)$$

[expression 36]
$$T\_Dl = 2\ k\_Dr\ k\_Dl\ k\_P\ ((theta\_Wr + theta\_Wl)\ /\ 2 - theta\_E \\ /\ (i\_T\ i\_D)) + T\_V) + 4\ k\_Dr\ T\_V\ /\ i\_D^2\ /\ (k\_P\ (k\_Dr + \\ k\_Dl) + 4\ k\_Dl\ k\_Dr\ /\ i\_D^2)$$

Further, when a torsional stiffness of the propeller shaft 12 can be ignored, the following expressions can be obtained on the condition that the torsional stiffness of the propeller shaft 12 is infinite in the expressions 35 and 36.

[expression 3]
$$T\_Dr=2\ k\_Dr\ k\_Dl\{(theta\_Wr+theta\_Wl)/2-theta\_E/(i\_T \\ i\_D)-T\_V\}/(k\_Dr+k\_Dl)$$

[expression 4]
$$T\_Dl=2\ k\_Dr\ k\_Dl\{(theta\_Wr+theta\_Wl)/2-theta\_E/(i\_T \\ i\_D)+T\_V\}/(k\_Dr+k\_Dl)$$

wherein T_V is a differential limiting torque.

This embodiment provides an apparatus for detecting a torque of the drive shaft, T_D, using the relational expressions 3 and 4.

Figure 14:
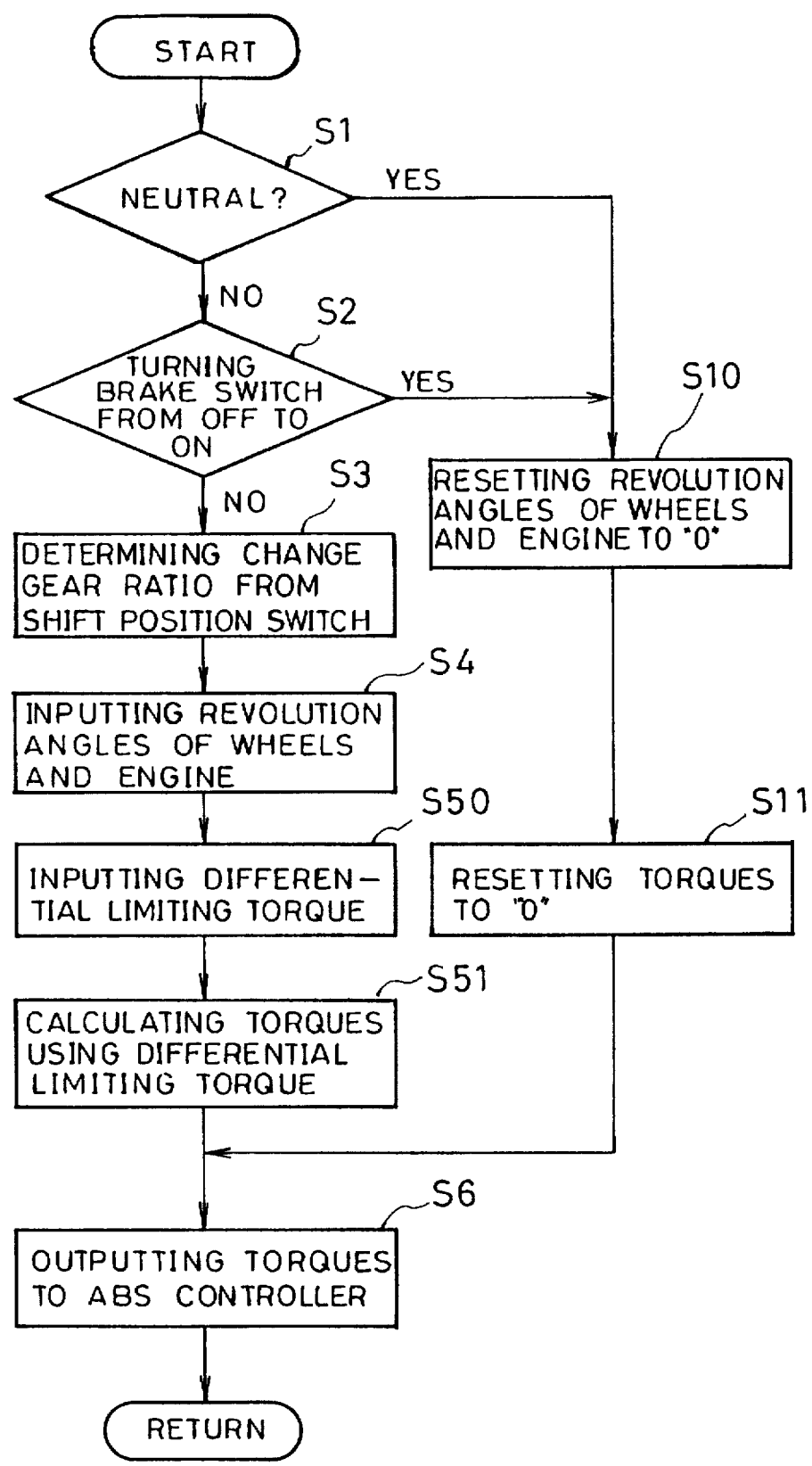
FIG. 14 is a flow chart showing the operation of Embodiment 6.

The operation of this Embodiment 6 is described with reference to the flow chart of FIG. 14. The same steps as those of FIG. 5 are given the same reference symbols and their descriptions are omitted. This Embodiment 6 differs from Embodiment 1 in that steps S50 and S51 are replaced for step S5. only the contents of these steps different from Embodiment 1 are described below.

The expression 1 is used in Embodiment 1 whereas the expressions 3 and 4 are used in Embodiment 6. The expressions 3 and 4 differ from the expression 1 in that a differential limiting torque, T_V, is used. Therefore, the torque calculation unit 41 calculates and detects a differential limiting torque in step S50. In the subsequent step 51, the differential limiting torque is used to calculate the expressions 3 and 4 to obtain torques of shafts such as the drive shafts.

A method for obtaining a differential limiting torque varies according to type of the differential limiting mechanism 30. There are two types of the differential limiting mechanism 30 for generating a differential limiting torque: a viscous type and a hydraulic multiple-disc clutch type. In the case of the viscous type, a transmission torque of the differential limiting mechanism 30 is determined by the difference of revolution angle speed between the right drive shaft 14r and the left drive shaft 14l on both sides of the differential gear 13. Then the revolution angle speeds of the right and left drive shafts 14r and 14l on both sides of the differential gear 13 are detected in the same manner as the wheel revolution angle speed to calculate the difference between these two revolution angle speeds so that a differential limiting torque is obtained from the map showing the relationship between difference of revolution angle speed and differential limiting torque prestored in the microcomputer.

In the case of the hydraulic multiple-disc clutch type, a transmission torque of the differential limiting mechanism 30 is determined by the pressure of oil supplied to the hydraulic clutch. Also, a hydraulic multiple-disc clutch type of differential limiting mechanism mostly controls a differential limiting torque electronically. Therefore, a differential limiting torque can be obtained through data communication between an unshown controller for controlling a hydraulic multiple-disc clutch electronically and the ABS controller 4.

As described above, the differential limiting torque can be obtained and the obtained differential limiting torque is used to calculate the expressions 3 and 4 so that a torque of a shaft such as the drive shaft can be obtained.

Although the expressions 3 and 4 in which a torsional stiffness of the propeller shaft 12 is ignored have been described above, when a torsional stiffness of the propeller shaft, k_P, is identified and prestored in the torque calculation unit 41 and the expressions 35 and 36 in which a torsional stiffness of the propeller shaft, k_P, is taken into account are used to calculate a torque of the drive shaft 14, a more accurate torque of the drive shaft 14 can be detected in the same manner as described above.

Embodiment 7

Embodiment 7 of the present invention is described hereinunder. Since this embodiment comprises the engine revolution sensor 15 as the drive source revolution angle acceleration detection means and is devoid of the wheel revolution sensor 6 shown in FIG. 12 which illustrates the configuration of Embodiment 6 described above, a diagram showing the entire configuration of this embodiment is omitted. The same elements as those of Embodiment 6 above are given the same reference numerals as in FIG. 12 and their descriptions are omitted. A description is first given of detection principle. Since what is controlled is the same as in Embodiment 6, the same expressions 29 to 34 are established. A revolution angle of the differential gear 13 on the propeller shaft side, revolution angles of the right and left wheels, and a revolution angle of the engine are eliminated from the expressions 31 to 34 and the expressions are rearranged to obtain the following expressions.

[expression 5]
$$T\_Dr=k\_Dr(i\_D\ i\_T(I\_E\ alpha\_E)-2\ T\_V)/2$$

[expression 6]
$$T\_Dl=k\_Dl(i\_D\ i\_T(I\_E\ alpha\_E)+2\ T\_V)/2$$

wherein I_E is an inertia moment of a drive source such as an engine, and alpha_E is a revolution angle acceleration of a drive source such as an engine.

This Embodiment provides an apparatus for detecting a torque of the drive shaft, T_D, using the relational expressions 5 and 6.

Figure 15:
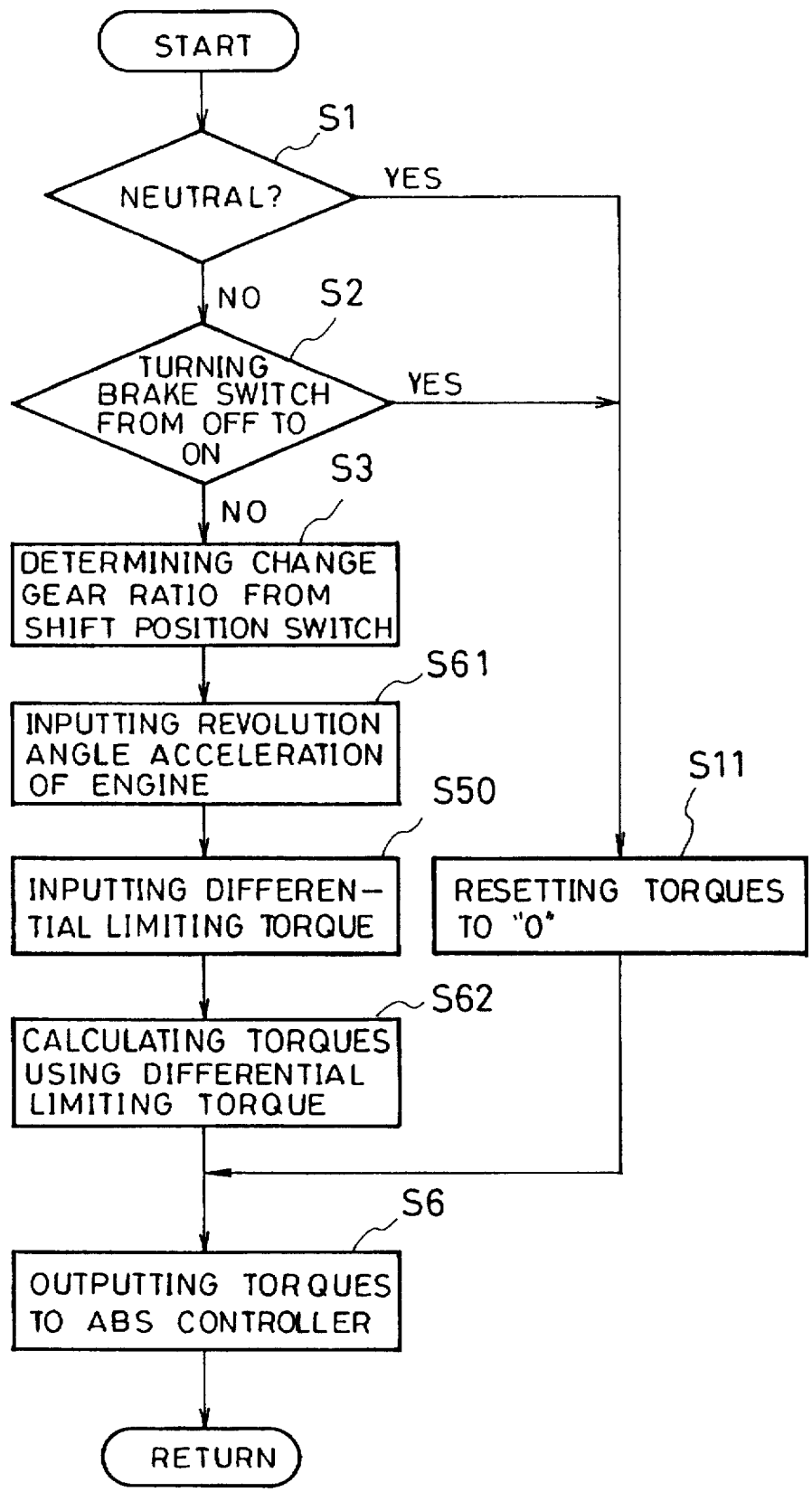
FIG. 15 is a flow chart showing the operation of Embodiment 7.

In this Embodiment 7, a revolution angle acceleration of the engine is obtained by processing the output of the engine revolution sensor 15 as described in Embodiment 1 above. Embodiment 7 differs from Embodiment 6 in operation because the expressions 5 and 6 do not use wheel revolution angles. Then, the operation of this embodiment is described with reference to the flow chart of FIG. 15. The torque calculation unit 41 checks whether the transmission 11 is at neutral or not in step S2. A torque for twisting the shaft is not generated when the transmission 11 is at neutral. If the transmission is at neutral, the sub-routine goes to step S11 where a torque value is reset to "0".

If the transmission is not at neutral, the sub-routine goes to step S2. If the brake switch 5 is on, the sub-routine goes to step S11 to reset a torque value to "0".

If the brake switch 5 is off, the sub-routine goes to step S3 to determine a change gear ratio from a signal from the shift position switch 17. Then the sub-routine goes to step S61 to input a revolution angle acceleration of the engine. Thereafter, the sub-routine goes to step S50 to input a differential limiting torque. In step S62, these input revolution angle acceleration of the engine and differential limiting torque are used to calculate a torque from the expressions 5 and 6. In step S6, the calculated torque is output to the ABS controller 4.

Embodiment 8

Embodiment 8 of the present invention is described hereinunder. Since this embodiment comprises as drive source revolution angle and angle acceleration detection means the engine revolution sensor 15 shown in FIG. 12 which illustrates the configuration of Embodiment 6 above and is devoid of the differential limiting torque detection means 35, a diagram showing the entire configuration of this embodiment is omitted. The same elements as those in Embodiment 6 are given the same reference numerals as in FIG. 12 and their descriptions are omitted. A description is first given of detection principle. Since what is controlled is the same as in Embodiment 6, the same expressions 29 to 34 are established. A revolution angle of the differential gear 13 on the propeller shaft side and a differential limiting torque are eliminated from the expressions 31 to 34, and these expressions are rearranged to obtain the following expressions.

[expression 37]
T_Dr = k_Dr {− i_D i_T (I_E alpha_E − T_E) + 2 k_Dl
  ((theta_Wr + theta_Wl) / 2 − theta_E / (i_D i_T)) − 2
  i_T k_Dl (I_E alpha_E − T_E) / i_D / k_P}/ (k_Dl −
      k_Dr)

[expression 38]
T_Dl = k_Dl {− i_D i_T (I_E alpha_E − T_E) − 2 k_Dr
  ((theta_Wr + theta_Wl) / 2 − theta_E / (i_D i_T)) − 2
  i_T k_Dr (I_E alpha_E − T_E) / i_D / k_P}/ (k_Dl −
      k_Dr)

The expressions 37 and 38 show that torques (equal) of the right and left drive shafts can be obtained by detecting revolution angles of the right and left wheels and a revolution angle of the engine, as well as a revolution angle acceleration of the engine and an engine torque.

Further, if a torsional stiffness of the propeller shaft 12 can be ignored, the following expressions can be obtained based on the condition that the torsional stiffness of the propeller shaft 12 is infinite in the expressions 38 and 39.

[expression 39]
T_Dr = k_Dr {− i_D i_T (I_E alpha_E − T_E) + 2 k_Dl
  ((theta_Wr + theta_Wl) / 2 − theta_E / (i_D i_T))}/
      (k_Dl − k_Dr)

[expression 40]
T_Dl = k_Dl {− i_D i_T ( I_E alpha_E − T_E) + 2 k_Dr
  ((theta_Wr + theta_Wl) / 2 − theta_E / (i_D i_T))}/
      (k_Dl − k_Dr)

Further, the following expressions can be obtained if an engine torque, T_E, is ignored as being too small.
[expression 7]

T_Dr=k_Dr{−i_D i_T(I_E alpha_E)+2 K_Dl((theta_Wr+
  theta_Wl)/2−theta_E/(i_D i_T))}/(k_Dl−k_Dr)

[expression 8]

T_Dl=k_Dl{+i_D i_T(I_E alpha_E)−2 k_Dr((theta_Wr+
  theta_Wl)/2−theta_E/(i_D i_T))}/(k_Dl−k_Dr)

This embodiment provides an apparatus for detecting a torque of the drive shaft using the relational expressions 7 and 8.

The operation of this Embodiment 8 is described with reference to the flow chart of FIG. 16. This flow chart differs from the flow chart of FIG. 14 of Embodiment 6 in that steps S70 and S71 are replaced for steps S50 and S51, respectively. only these steps are described. In step S70, a revolution angle acceleration of the engine is input and calculated. In step S71, revolution angles of the right and left wheels, an engine revolution angle, an engine revolution angle acceleration and the like are used to calculate a torque from the expressions 7 and 8. This Embodiment 8 is advantageous in that it is not necessary to obtain a differential limiting torque from outside.

Further, an engine torque, T_E, may be obtained and the expressions 39 and 40 may be used to calculate torques of shafts such as drive shafts. The engine torque, T_E, can be obtained from an absorbed air flow rate and an engine revolution angle speed detected by an unshown fuel jet controller for the engine 10 using the prestored map. Use of the engine torque, T_E, makes it possible to obtain a more accurate torque. This embodiment has an advantage that it is not necessary to detect a differential limiting torque. However, this embodiment can be applied only when the denominators of the expressions 7 and 8 are not "0". The expressions 7 and 8 in which a torsional stiffness of the propeller shaft 12 is ignored have been described above. When a torsional stiffness of the propeller shaft, k_P, is identified and prestored and the expressions 37 and 38 in which a torsional stiffness of the propeller shaft, k_P, is taken into account are used to calculate a torque of the drive shaft, a more accurate torque of the drive shaft can be detected in the same manner as described above. This embodiment can be applied only when the denominators of the expressions 37 and 38 are not "0".

Embodiment 9

Figure 17:
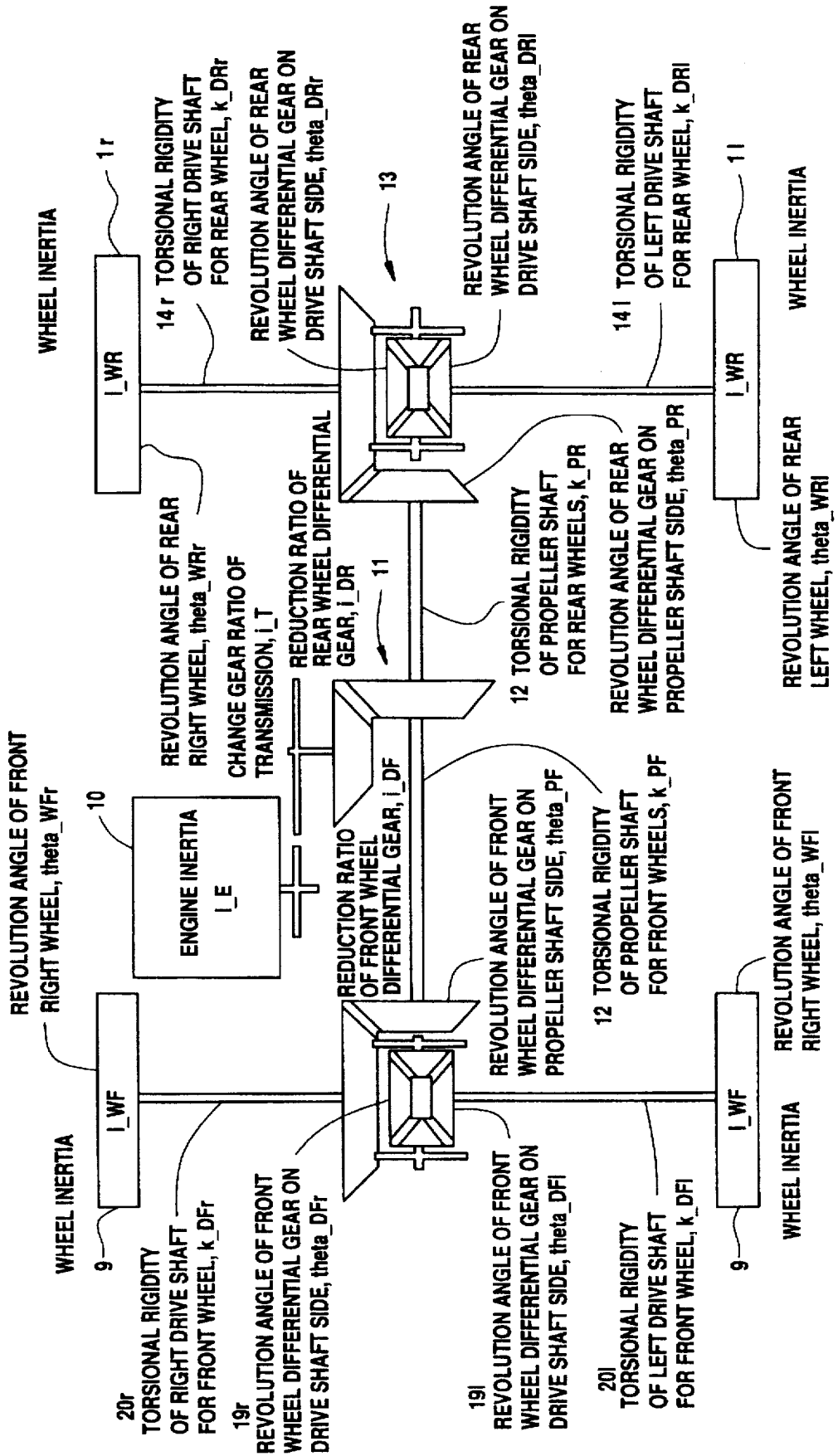
FIG. 17 is a diagram showing a power transmission system model for a direct-coupled 4WD vehicle in Embodiment 9.

Embodiment 9 of the present invention is described hereinunder. This embodiment differs from Embodiment 1 in that what is controlled is a direct-coupled 4WD vehicle. A description is first given of detection principle. Fig. 17 shows a power transmission system model for a direct-coupled 4WD vehicle. The same elements shown in FIG. 17 are given the same reference symbols as in FIG. 2 and their descriptions are omitted. With reference to FIG. 17, equations of motion for this revolution system are expressed by the following expressions like Embodiment 1. F and R are abbreviations of front and rear.

[expression 41]

I_WF alpha_WFr=−k_DFr(theta_WFr−theta_DFr)+mu_Fr
  W_Fr R−T_BFr

[expression 42]

I_WF alpha_WFl=−k_DFl(theta_WFl−theta_DFl)+mu_Fl
  W_Fl R−T_BFl

[expression 43]

I_WR alpha_WRr=−k_DRr(theta_WRr−theta_DRr)+mu_Rr
  W_Rr R−T_BRr

[expression 44]

I_WR alpha_WRl=−k_DRl(theta_WRl−theta_DRl)+mu_Rl
  W_Rl R−T_BRl

[expression 45]

I_E alpha_E=k_PF/i_T(theta_PF−theta_E/i_T)+k_PR/i_
  T(theta_PR−theta_E/i_T)+T_E The following expressions can be derived from the constraint conditions of the differential gear.

[expression 46]

$$\theta\_PF = DF/2(\theta\_DFr + \theta\_DFl)$$

[expression 47]

$$\theta\_PR = i\_DR/2(\theta\_DRr + \theta\_DRl)$$

The following expressions can be derived from torque transmission characteristics of the differential gear.

[expression 48]

$$k\_DFr(\theta\_WFr - \theta\_DFr) = \tfrac{1}{2} k\_PF \; i\_DF(\theta\_PF - \theta\_E/i\_T)$$

[expression 49]

$$k\_DFl(\theta\_WFl - \theta\_DFl) = \tfrac{1}{2} k\_PF \; i\_DF(\theta\_PF - \theta\_E/i\_T)$$

[expression 50]

$$k\_DRr(\theta\_WRr - \theta\_DRr) = \tfrac{1}{2} k\_PR \; i\_DR(\theta\_PR - \theta\_E/i\_T)$$

[expression 51]

$$k\_DRl(\theta\_WRl - \theta\_DRl) = \tfrac{1}{2} k\_PR \; i\_D(\theta\_PR - \theta\_E/i\_T)$$

The following expressions for achieving a torque of the drive shaft 14 can be obtained directly from the expressions 48 to 61.

[expression 52]

$$T\_DEr = T\_DFl = \tfrac{1}{2} k\_PF \; i\_DF(\theta\_PF - \theta\_E/i\_T)$$

[expression 53]

$$T\_DRr = T\_DRl = \tfrac{1}{2} k\_PR \; i\_DR(\theta\_PR - \theta\_E/i_{T})$$

Front and rear revolution angles of the propeller shaft 12, theta_PF and theta_PR, and front and rear revolution angle speeds of the propeller shaft 12, omega_PF and omega_PR, are eliminated from the expressions 46 to 51 and these expressions are rearranged to obtain the following expressions.

[expression 54]
$$T\_DFr = T\_DFl = k\_DFr \; k\_DFl \; k\_PF \; ((\theta\_WFr + \theta\_WFl) - 2\theta\_E / (i\_DF \; i\_T)) / (k\_DFr \; (2 \; k\_DFl / i\_DF^2 + k\_PF) + k\_DFl \; (2 \; k\_DFr / i\_DF^2 + k\_PF))$$

[expression 55]
$$T\_DRr = T\_DRl = k\_DRr \; k\_DRl \; k\_PR \; ((\theta\_WRr + \theta\_WRl) - 2\theta\_E / (i\_DR \; i\_T)) / (k\_DRr \; (2 \; k\_DRl / i\_DR^2 + k\_PR) + k\_DRl \; (2 \; k\_DRr / i\_DR^2 + k\_PR))$$

Further, based on the condition that torsional rigidities of the propeller shaft, k_PF and k_PR, are ignored as infinite, the following expressions are obtained.

[expression 9]

$$T\_DFr = T\_DFl = k\_DFr \; k\_DFl((\theta\_WF + \theta\_WFl) - 2\theta\_E/i\_DF \; i\_T)/(k\_DFl + k\_DFr)$$

[expression 10]

$$T\_DRr = T\_DRl = k\_DRr \; k\_DRl((\theta\_WRr + \theta\_WRl) - 2\theta\_E/i\_DR \; i\_T)/(k\_DRl + k\_DRr)$$

In this embodiment, torques of the drive shafts 14 and 20, T_D, are detected using the relational expressions 9 and 10.

Figure 18:
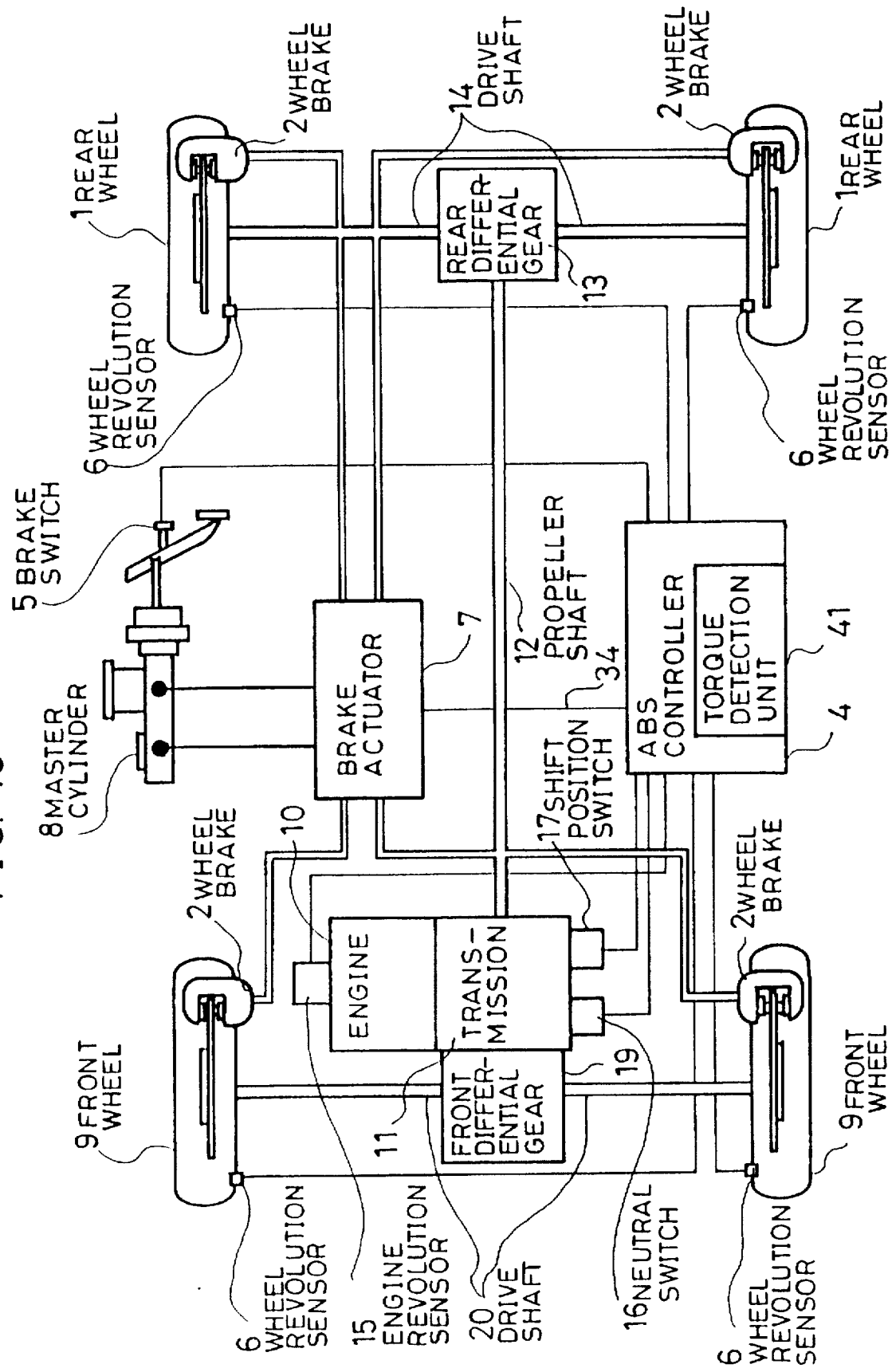
FIG. 18 is a diagram showing the entire configuration of a torque detection apparatus according to Embodiment 9.

FIG. 18 is a diagram showing the configuration of this Embodiment 9 wherein the same elements are given the same reference numerals as those in FIG. 1 and their descriptions are omitted. Reference numeral 19 represents a front differential gear for driving the front wheels 9, and 20 front drive shafts for coupling the differential gear 19 to the front wheels 9. Like Embodiment 1, wheel revolution angles detected by the wheel revolution sensors 6 and an engine revolution angle detected by the engine revolution sensor 15 are used to calculate torques of the drive shafts. However, Embodiment 9 differs from Embodiment 1 only in that revolution angles of the four wheels are detected and used in calculation. Power is distributed to the front and rear wheels from the drive source 10 such as an engine or motor through the propeller shaft 12 and further distributed to the right and left wheels by the differential gears 13 and 19.

The expressions 9 and 10 in which torsional rigidities of the propeller shaft 12 are ignored have been described above. When torsional rigidities of the propeller shaft, k_PF and k_PR, are identified and prestored and the expressions 54 and 55 in which torsional rigidities of the propeller shaft, k_PF and k_PR, are taken into account are used to calculate torques of the drive shafts, more accurate torques of the drive shafts can be detected in the same manner as described above.

Embodiment 10

Embodiment 10 of the present invention is described hereinunder. Like Embodiment 9, this embodiment is directed to a direct-coupled 4WD vehicle. This embodiment has the same configuration as Embodiment 9 and, hence, is described with reference to FIG. 18. This embodiment differs from Embodiment 1 in that what is controlled is a direct-coupled 4WD vehicle. Elements are given the same reference numerals as in FIG. 18 and their descriptions are omitted. Detection principle is the same up to the expression 61 which has been described in Embodiment 9. Front and rear revolution angles of the propeller shaft 12, theta_PF and theta_PR, and revolution angle speeds of the propeller shaft 12, omega_PF and omega-PR, are eliminated from the expressions 45 to 51 which have been described in the above Embodiment 9. When these expressions are rearranged, the following expressions are obtained.

[expression 56]
$$T\_DFr = TDFl = NUMF1 / DEN1 \; (I\_E \; \alpha\_E - T\_E) + NUMF2 / DEN1 \; \{i\_DF \; (\theta\_WFl + \theta\_WFr) - i\_DR \; (\theta\_WRl + \theta\_WRr)\} + NUMF3 / DEN1 \; (I\_E \; \alpha\_E - T\_E)$$

[expression 57]
$$T\_DRr = T\_DRl = NUMR1 / DEN1 \; (I \; E \; \alpha\_E - T\_E) + NUMR2 / DEN1 \; \{i\_DF \; (\theta\_WFl + \theta\_WFr) - i\_DR \; (\theta\_WRl + \theta\_WRr)\} + NUMR3 / DEN1 \; (I\_E \; \alpha\_E - T\_E)$$

wherein

NUMF1=k_DFr k_DFl k_PF k_PR i_DF i_DR^2 i_T(k_DRl+k_DRr),

NUMF2=2 k_DFr k_DFl k_PF k_PR i_DF k_DRl k_DRr,

NUMF3=4 k_DFr k_DFl k_DRr k_DRl k_PF i_DF i_T,

DENp1=2 k_PF k_PR{i_DR^2 k_DFl k_DFr(k_DRl+k_DRr)+i_DF^2 k_DRl k_DRr(k_DRl+k_DRr)}+8 k_DFl k_DFr k_DRl k_DRr(k_PF+k_PR),

NUMR1=k_DRr k_DRl k_PF k_PR i_DF^2 i_DR i_T(k_DFl+k_DFr)

NUMR2=−2 k_DFr k_DFl k_PF k_PR i_DR K_DRl k_DRr, and

NUMR3=4 k_DFr k_DFl k_DRr k_DRl k_PR i_DR i_T.

Further, if torsional rigidities of the propeller shaft 12 can be ignored, the following expressions can be obtained based on the condition that torsional rigidities of the propeller shaft 12 are ignored as being infinite and further an engine torque, T_E, is ignored as being too small in the expressions 56 and 57.

[expression 11]
$$T\_DFr = T\_DFl = NUMF11 / DEN11 (I\_E\ alpha\_E) + NUMF12 / DEN11 \{i\_DF (theta\_WFl + theta\_WFr) - i\_DR (theta\_WRl + theta\_WRr)\}$$

[expression 12]
$$T\_DRr = T\_DRl = NUMR11 / DEN11 (I\_E\ alpha\_E) + NUM12 / DEN11 (i\_DF (theta\_WFl + theta\_WFr) - i\_DR (theta\_WRl + theta\_WRr)\}$$

wherein

NUMF11=i_DF i_DR_2 i_T k_DFl k_DFr(k_DRl+ k_DRr),

NUNF12=2 i_DF k_DFl k_DFr k_DRl k_DRr,

DEN11=2{i_DR^2 k_DFl k_DFr(k_DRl+k_DRr)+i_ DF^2 k_DRl k_DRr(k_DFl+k_DFr)},

NUMR11=i_DR i_DF^2 i_T k_DRl k_DRr(k_DFl+ k_DFr), and NUMR12 =−2 i_DR k_DFl k_DFr k_DRl k_DRr.

Figure 16:
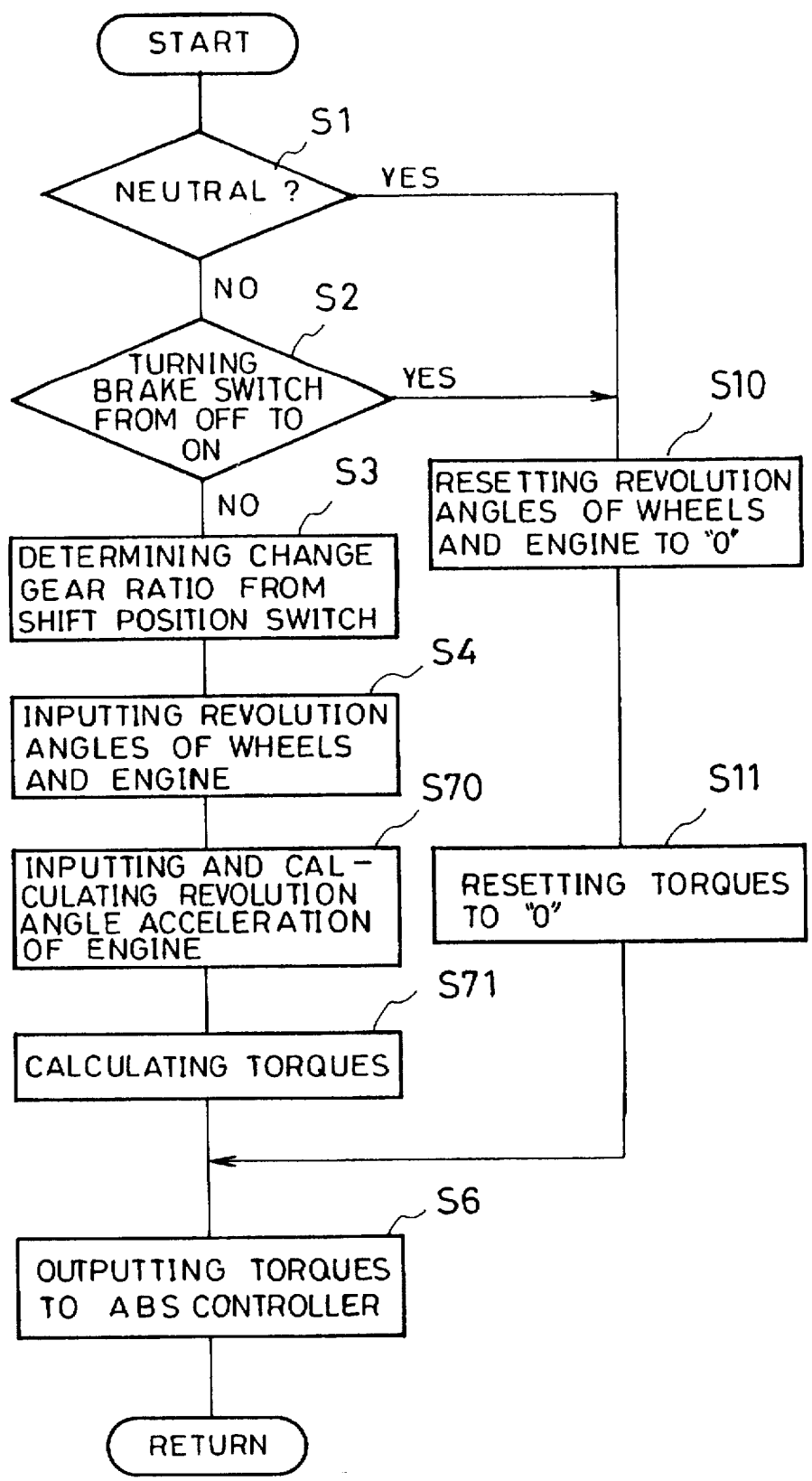
FIG. 16 is a flow chart showing the operation of Embodiment 8.

Based on the thus obtained expressions 11 and 12, an engine revolution angle acceleration is calculated and detected in the same manner as in a 2WD vehicle explained in the above Embodiment 8, and torques of the drive shafts for the four wheels are calculated and detected in this embodiment. operation is carried out based on the flow chart of FIG. 16, like Embodiment 8.

The expressions 9 and 10 in which torsional rigidities of the propeller shaft 12 are ignored were used in the above embodiment. When torsional rigidities of the propeller shaft, k_PF and k_PR, are identified and prestored, and the expressions 54 and 55 in which torsional rigidities of the propeller shaft, k_PF and k_PR, are taken into account are used to calculate torques of the drive shafts, more accurate torques of the drive shafts can be detected in the same manner as described above.

Moreover, when torques of the drive shafts are calculated based on the expressions in which an engine torque is not ignored like Embodiment 8, further accurate torques of the drive shafts can be detected in the same manner as described above.

Embodiment 11

Figure 19:
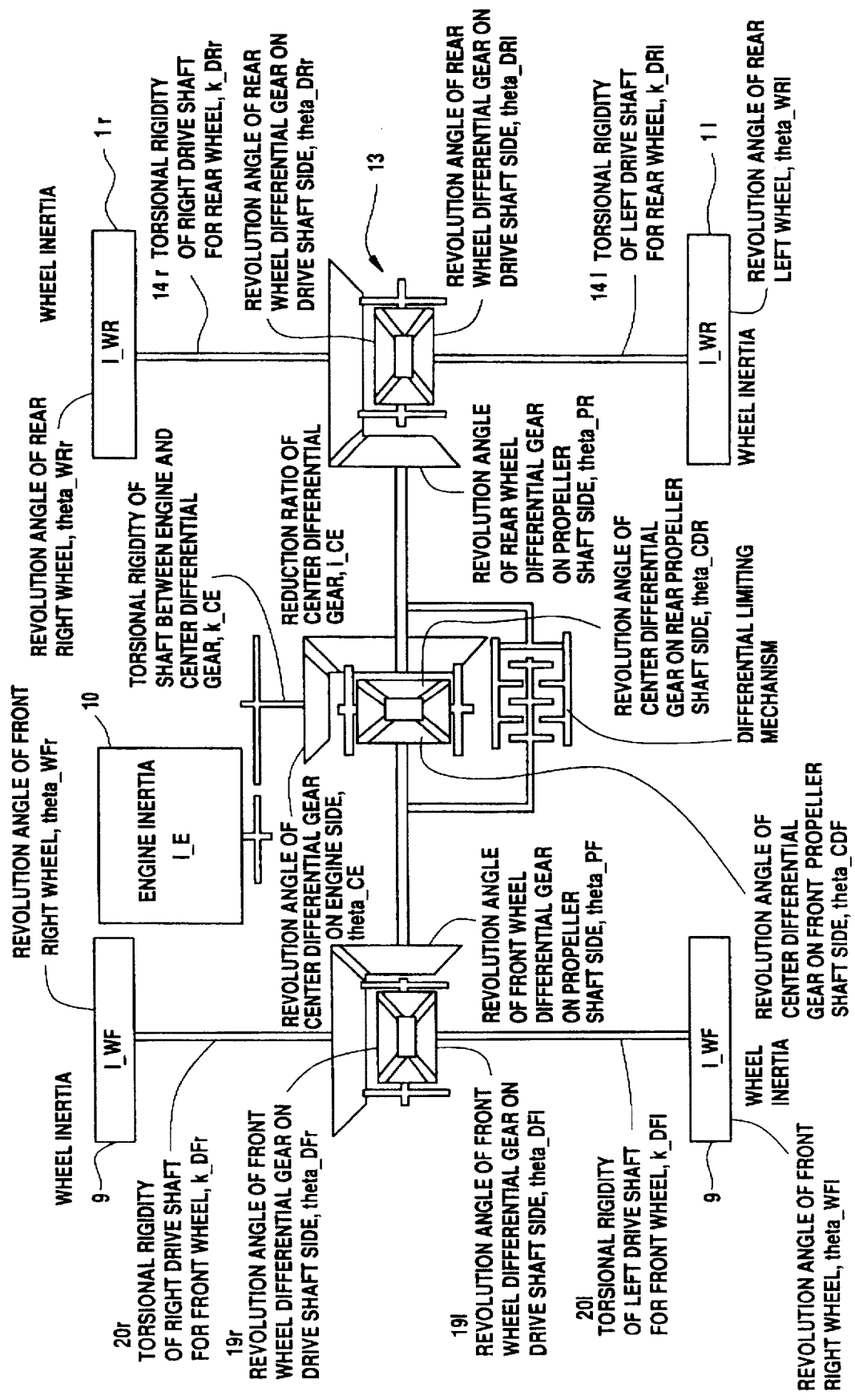
FIG. 19 is a diagram showing a power transmission system model for a 4WD vehicle having a center differential gear with a differential limiting mechanism in Embodiment 11.

Embodiment 11 of the present invention is described hereinunder. This embodiment differs from Embodiment 1 in that what is controlled is a 4WD vehicle having a center differential gear 31 with a differential limiting mechanism. A description is first given of detection principle. FIG. 19 shows a power transmission system model for a 4WD vehicle having the center differential gear 31 with a differential limiting mechanism. with reference to FIG. 19, equations of motion for a revolution system can be expressed by the following expressions like Embodiment 1.

[expression 58]
$$I\_WF\ alpha\_WFr=-k\_DFr(theta\_WFr-theta\_DFr)+mu\_Fr\ W\_Fr\ R-T\_BFr$$

[expression 59]
$$I\_WF\ alpha\_WFl=k\_DFl(theta\_WFl-theta\_DFl)+mu\_Fl\ W\_Fl\ R-T\_BFl$$

[expression 60]

[expression 61]
$$I\_WR\ alpha\_WRr=-k\_DRr(theta\_WRr-theta\_DRr)+mu\_Rr\ W\_Rr\ R-T\_BRr$$

[expression 62]
$$I\_WR\ alpha\_WRl=-k\_DRl(theta\_WRl-theta\_DRl)+mu\_Rl\ W\_Rl\ R-T\_BRl$$

$$I\_E\ alpha\_E=k\_CE/i\_T(theta\_CE-theta\_E/i\_T)+T\_E$$

wherein theta_CE is a revolution angle of the center differential gear on the engine side and k_CE is a torsional stiffness of a shaft between the engine and the center differential gear.

The following expressions can be derived from the constraint conditions of the differential gear.

[expression 63]
$$theta\_PF=i\_DF/2(theta\_DFr+theta\_DFl)$$

[expression 64]
$$theta\_PR=i\_DR/2(theta\_DRr+theta\_DRl)$$

[expression 65]
$$theta\_CE=i\_CE/2(theta\_CDF+theta\_CDR)$$

The following expressions can be derived from torque transmission characteristics of the differential gear.

[expression 66]
$$k\_DFr(theta\_WFr-theta\_DFr)=\tfrac{1}{2}k\_PF\ i\_DF(theta\_PF-theta\_CDF)$$

[expression 67]
$$K\_DFl(theta\_WFl-theta\_DFl)=\tfrac{1}{2}k\_PF\ i\_DF(theta\_PF-theta\_CDF)$$

[expression 68]
$$k\_DRr(theta\_WRr-theta\_DRr)=\tfrac{1}{2}k\_PR\ i\_DR(theta\_PR\ theta\_CDR)$$

[expression 69]
$$k\_DRi(theta\_WRl-theta\_DRl)=\tfrac{1}{2}k\_PR\ i\_DR(theta\_PR\ theta\_CDR)$$

When torque transmission characteristics of the center differential gear and a differential limiting torque are taken into account, the following expressions can be obtained.

[expression 70]
$$k\_PF(theta\_PF-theta\_CDF)=\tfrac{1}{2}k\_CE\ i\_CE(theta\_CE-theta\_E/i\_T)+T\_V$$

[expression 71]
$$k\_PR(theta\_PR-theta\_CDR)=\tfrac{1}{2}k\_CE\ i\_CE(theta\_CE-theta\_E/i\_T)-T\_V$$

wherein theta_CDF is a revolution angle of the center differential gear on the front propeller shaft side, theta_ CDR is a revolution angle of the center differential gear on the rear propeller shaft side, and i_CE is a reduction ratio of the center differential gear.

When front and rear revolution angles of the propeller shaft, theta_PF and theta_PR, are eliminated from the expressions 62 to 71, the expressions are rearranged, and a torsional stiffness of a shaft between the engine and the center differential gear, k_CE, is ignored as being infinite, the following expressions are obtained. Since this embodiment is symmetrical bilaterally, only a right portion is shown in these expressions.

[expression 72]
T_DFr = NUMF21 / DEN21 (i_CE i_DF (theta_WFl + theta_WFr) +
  i_CE i_DR (theta_WFl + theta_WFr) − 4 theta_E / i_T) −
      NUMF22 / DEN21 T_V − NUMF23 / DEN21 T_V

[expression 73]
T_DRr = NUMR21 / DEN21 (i_CE i_DF (theta_WFl + theta_WFr) +
  i_CE i_DR (theta_WFl + theta_WFr) − 4 theta_E / i_T) +
      NUMR22 / DEN21 T_V + NUMR23 / DEN21 T_V wherein NUMF21=i_DF k_DFr k_DFl k_DRr K_DRl k_PF k_PR, NUMF22=i_CE i_DF i_DR^2 k_DFr k_DFl(k_DRl+ k_DRr)k_PF k_PR, NUMF23=4 i_CE i_DF k_DFr k_DFl k_DRr k_DRl k_PF, DEN21=i_CE k_PF k_PR{i_DR^2 k_DFl k_DFr(k_ DRl+k_DRr)+i_DF^2 k_DRl k_DRr (k_DFl+k_ DFr)}+4 i_CE K_DFl k_DFr k_DRl k_DRr(k_ PF+k_PR), NUMR21=i_DR k_DFr k_DFl k_DRr k_DRl k_PF k_PR, NUMR22=i_CE i_DF^2 i_DR k_DRr k_DRl (k_DFl+k_DFr)k_PF k_PR, and NUMR23=4 i_CE i_DR k_DFr k_DFl k_DRr k_DRl k_PF.

Further, when torsional rigidities of the propeller shaft can be ignored, the following expressions can be obtained based on the condition that torsional rigidities of the propeller shaft are infinite in the expressions 69 and 70.

[expression 13]
T_DFr = T_DFl = NUMF31 / DEN31 (i_CE i_DF (theta_WFl +
  theta_WFr) + i_CE i_DR (theta_WFl + theta_WFr) − 4
      theta_E / i_T) − NUMF32 / DEN31 T_V

[expression 14]
T_DRr = T_DRl = NUMR31 / DEN31 (i_CE i_DF (theta_WFl +
  theta_WFr) + i_CE i_DR (theta_WFl + theta_WFr) − 4
      theta_E / i_T) + NUMR32 / DEN31 T_V wherein NUMF31=i_DF k_DFl k_DFr k_DRl k_DRr, NUMF32=i_CE i_DF i_DR^2 k_DFl k_DFr(k_DRl +k_DRr), DEN31=i_CE(i_DR^2 k_DFl k_DFr(k_DRl+k_DRr) +i_DF^2k_DRl k_DRr(k_DFl+k_DFr)), NUMR31=i_DR k_DFl k_DFr k_DRl k_DRr, and NUMR32=i_CE i_DF^2 i_DR k_DRl k_DRr(k_DFl+ kDFr).

In this embodiment, in a 4WD vehicle having a center differential gear, the relational expressions 13 and 14 are used to detect torques of the drive shafts, T_D.

What is controlled in Embodiment 6 is a 2WD vehicle having a differential limiting mechanism whereas what is controlled in this embodiment is a 4WD vehicle having a center differential gear with a differential limiting mechanism. The same elements shown in FIG. 20 of this embodiment as those in FIG. 12 which shows the configuration of Embodiment 6 are given the same reference numerals and their descriptions are omitted. Reference numeral 19 represents a front differential gear for driving the front wheels 9, 13 a rear differential gear for driving the rear wheels 1, 31 a center differential gear for distributing driving force generated by the engine 10 to the front and rear differential gears 19 and 13, 32 a differential limiting mechanism for limiting a differential between driving forces output from the center differential gear 31 to be distributed to the front and rear differential gears 19 and 13, and 35 differential limiting torque detection means for detecting a differential limiting torque. Like Embodiment 6, wheel revolution angles of the four wheels are detected with the wheel revolution sensors 6, an engine revolution angle is detected with the engine revolution sensor 15, and a differential limiting torque of the center differential gear 31, T_V, is detected with the differential limiting torque calculation unit 41 to calculate torques of the drive shafts for the four wheels based on the expressions 13 and 14. Compared with a 2WD vehicle to be controlled in Embodiment 6, a 4WD vehicle having the center differential gear 31 is controlled in this embodiment. Therefore, this embodiment differs from Embodiment 6 only in that torques of the drive shafts for the four wheels are detected and used in calculation. Power is distributed from the drive source 10 such as an engine or motor to the front and rear wheels through the propeller shaft 12 and further distributed to the right and left wheels through the differential gears 13 and 19.

The expressions 13 and 14 in which torsional rigidities of the propeller shaft 12 are ignored have been described above. When torsional rigidities of the propeller shaft, k_PF and k_PR, are identified and prestored and the expressions 72 and 73 in which torsional rigidities of the propeller shaft, k_PF and k_PR, are taken into account are used to calculate torques of the drive shafts, more accurate torques of the drive shafts can be detected in th e same manner as d escribed above.

Embodiment 12

Embodiment 12 of the present invention is described hereinunder. Like the above Embodiment 11, a 4WD vehicle having a center d iff e rential gear with a differential control mechanism is controlled in th is embodiment. Detection principle is such as already described in Embodiment 11. The expressions 62 to 71 are rearranged to obtain the following expressions.

[expression 15]

T_DFr=T_DFl=(i_T i_CE i_DF(I_E alpha_E−T_E)−2 i_DF T_V)/4

[expression 16]

T_DRr=T_DRl=(i_T i_CE i_DR(I_E alpha_E−T_E)+2 i_DR T_V)/4

Torques of the drive shafts are calculated and detected bas ed on th e above expressions 15 and 16.

Figure 20:
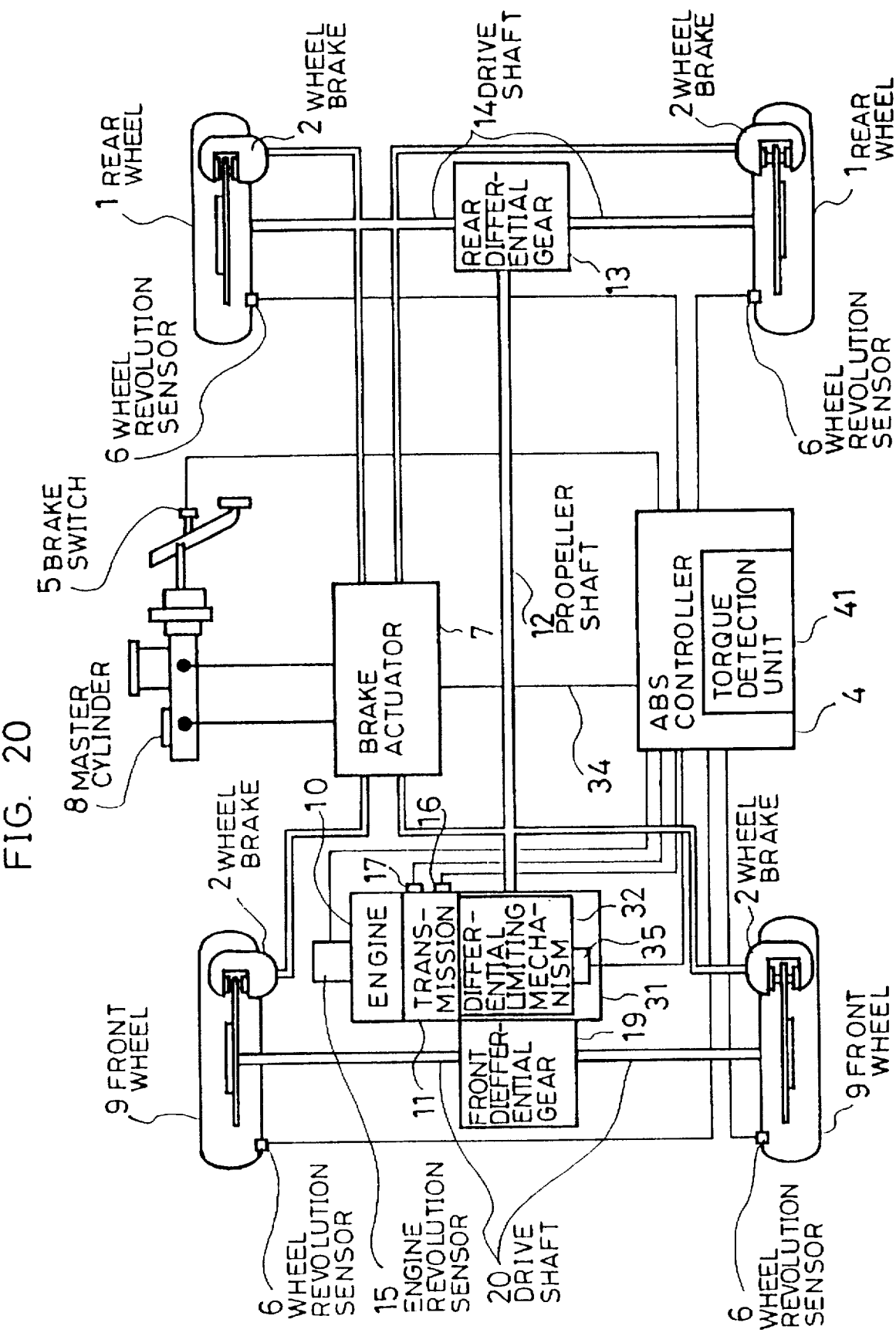
FIG. 20 is a diagram showing the entire configuration of a torque detection apparatus according to Embodiment 11.

Since this embodiment has the same configuration as the above Embodiment 11, FIG. 20 is described. The same elements are given the same reference numerals as those in FIG. 20 and their descriptions are omitted. In the same manner as in the above Embodiment 8, a revolution angle acceleration of the engine is detected with the engine revolution sensor 15 to calculate and detect an engine torque, and in the same manner as in the above Embodiment 11, a differential limiting torque of the center differential gear 31, T_V, is detected with the differential limiting torque calculation unit 41 to calculate and detect torques of the drive shafts for the four wheels based on the expressions 15 and 16.

Embodiment 13

Embodiment 13 of the present invention is described hereinunder. Like Embodiment 11, a 4WD vehicle having a center differential gear is controlled in this embodiment. Detection principle is such as already described in Embodiment 11. Front and rear revolution angles of the propeller shaft, theta_PF and theta_PR, are eliminated from the expressions 62 to 71 and these expressions are rearranged to obtain the following expressions.

[expression 74]
T_DFr = T_DFl = NUM41 / DEN41 ( I_E alpha_E − T_E ) − NUM42 / DEN41 {i_CE i_DF (theta_WFl + theta_WFr) + i_CE i_DR (theta_WFl}+ theta_WFr) − 4 theta_E / i_T}+ NUMF43 / DEN41 (I_E alpha_E − T_E)

[expression 75]
T_DRr = T_DRl = NUMF41 / DEN41 (I_E alpha_E − T_E −
NUMF42 / DEN41 {i_CE i_DF (theta_WRl + theta_WRr) +
i_CE i_DR (theta_WFl + theta_WFr) −
4 theta_E / i_T}+ NUMF43 / DEN41 ( I_E alpha_E − T_E )

wherein

NUMF41=i_T i_CE^2 i_DF i_DR^2k_DFl k_DFr(k_DRl+k_DRr)k_PF k_PR,

NUMF42=2 i_DF K_DFl k_DFr k_DRl k_DRr k_PF k_PR,

NUMF43=4 i_T i_CE^2 i_DF k_DFl k_DFr k_DRl k_DRr k_PF, and _68_

DEN41=2 i_CE k_PF k_PR(i_DR^2k_DFl k_DFr (k_DRl+k_DRr)−i_DF^2k_DRl k_DRr(k_DFl+ k_DFr))+8 i_CE k_DFl k_DFr k_DRl k_DRr(k_PF−k_PR).

Further, when the torsional rigidities of the propeller shaft can be ignored, the following expressions can be obtained based on the condition that the torsional rigidities of the propeller shaft are infinite in the expressions 74 and 75.

[expression 17]
T_DFr = T_DFl = NUMF51 / DEN51 (I_E alpha_E − T_E) −
NUMF52 / DEN51 {i_CE i_DF (theta_WFl + theta_WFr) +
i_CE i_DR (theta_WFl + theta_WFr) − 4 theta_E / i_T)}

[expression 18]
T_DRr = T_DRl = − NUMR51 / DEN51 (I_E alpha_E − T_E) +
NUMR52/ DEN 51 {i_CE i_DF (theta_WRl + theta_WRr) +
i_CE i_DR (theta_WFl − theta_WFr) − 4 theta_E / i_T} wherein

NUNF51=i_T i_CE^2 i_DF i_DR^2k_DFl k_DFr(k_DRl+k_DRr),

NUMF52=2 i_DF k_DFl k_DFr k_DRl k_DRr,

DEN51=2 i_CE(i_DR^2k_DFl k_DFr(k_DRi+k_DRr)−i_DF^2k_DRl k_DRr(k_DFl+k_DFr)),

NUMR51 =i_T i_CE^2 i_DF^2 i_DR k_DRl k_DRr (k_DFl +k_DFr), and

NUMR52=2 i_DR k_DFl k_DFr k_DR1 k_DRr.

Torques of the drive shafts are calculated and detected based on the above expressions 17 and 18.

Since this embodiment has the same configuration as Embodiment 11, the same elements are given the same reference numerals as those in FIG. 20 and their descriptions are omitted. Like the above Embodiment 8, revolution angles of the four wheels are detected with the wheel revolution sensors 6, and a revolution angle and a revolution angle acceleration of the engine are detected with the engine revolution sensor 15 to detect an engine torque so that torques of the drive shafts for the four wheels are calculated and detected with the torque calculation unit 41 based on the expressions 17 and 18. This embodiment has an advantage that it is not necessary to detect a differential limiting torque of the center differential gear 31. However, this embodiment can be applied only when the denominators of the expressions 17 and 18 are not "0".

The expressions 17 and 18 in which torsional rigidities of the propeller shaft 12 are ignored have been described above. When torsional rigidities of the propeller shaft are identified and prestored and the expressions 74 and 75 in which torsional rigidities of the propeller shaft are taken into account are used to calculate torques of the drive shafts, more accurate torques of the drive shafts can be detected in the same manner as described above. However, this embodiment can be applied only when the denominators of the expressions 74 and 75 are not "0".

Embodiment 14

Figure 21:
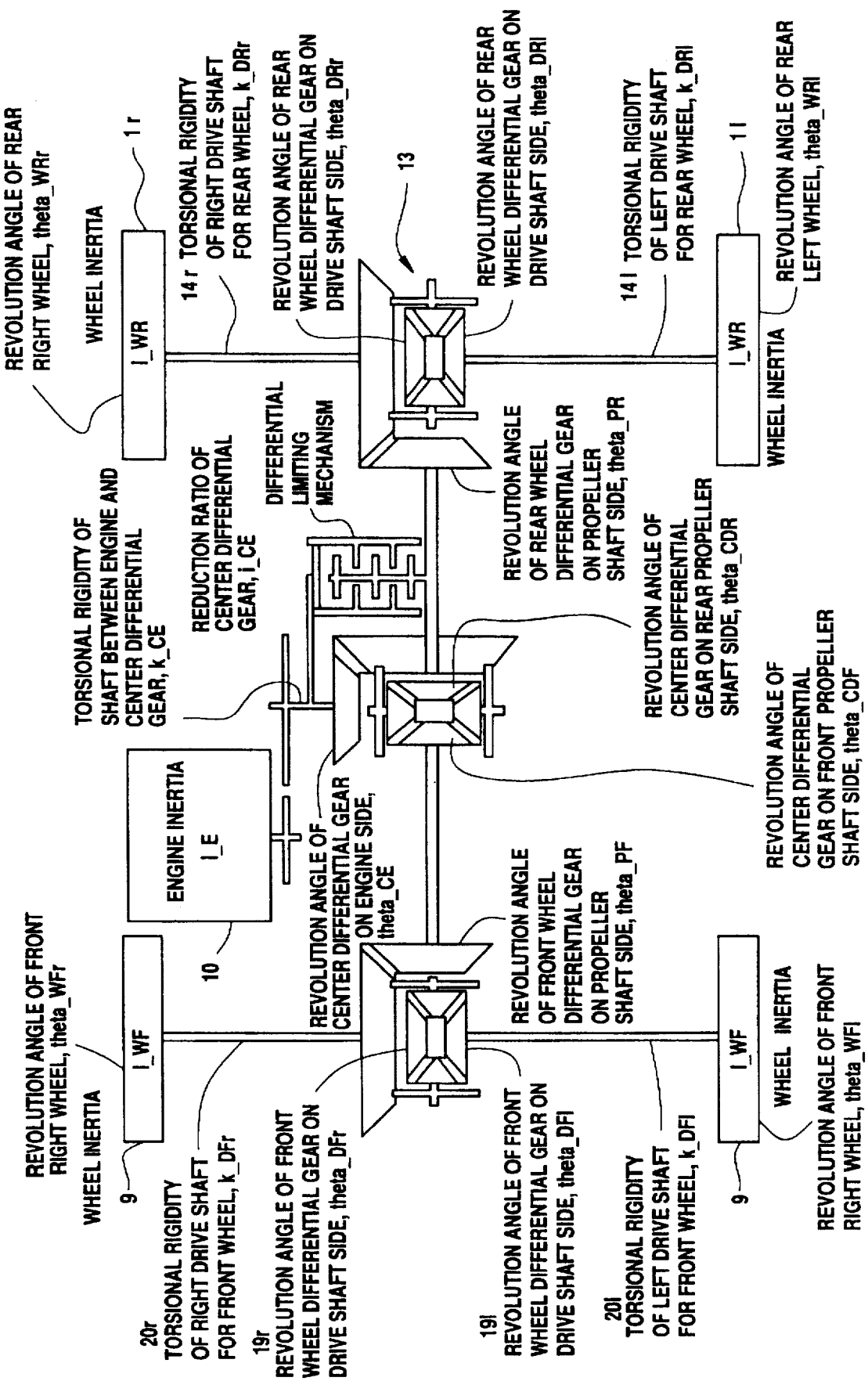
FIG. 21 is a diagram showing a power transmission system model for a 4WD vehicle having a center differential gear with a differential limiting mechanism in Embodiment 14.

Embodiment 14 of the present invention is described hereinunder. In this embodiment, a 4WD vehicle having a center differential gear with a differential limiting mechanism is controlled like the above Embodiment 11. However, unlike Embodiment 11 wherein the differential between power outputs of the center differential gear to the front and rear wheels is limited, the differential between power input from the engine to the center differential gear and power output from the engine to the rear wheels is limited in this embodiment. This embodiment is longitudinally symmetrical to what limits the differential between power input from the engine to the center differential gear and power output from the engine to the front wheels and is identical to what will be described below. A description is first given of detection principle. FIG. 21 shows a power transmission system model for a 4WD vehicle having a center differential gear with a differential limiting mechanism. With reference to FIG. 21, equations of motion for this revolution system can be expressed by the expressions 58 to 62 like Embodiment 11.

The expressions 63 to 65 can be derived from constraint conditions of the differential gear like Embodiment 11.

The expressions 66 to 69 can be derived from torque transmission characteristics of the center differential gear like Embodiment 11.

When torque transmission characteristics of the center differential gear and a differential limiting torque are taken into consideration, the following expressions can be obtained.

[expression 76]

−k_PF(theta_PF−theta_CDF)=k_PR(theta_CE−theta_E/i_T)−T_V

[expression 77]

2k_PF/i_CE(theta_PR−theta_CDR)=k_CE(theta_CE−theta_E/i_T)+T_V wherein theta_CDF is a revolution angle of of the center differential gear on the front propeller shaft side, theta_CDR is a revolution angle of the center differential gear on the rear propeller shaft side, and i_CE is a reduction ratio of the center differential gear.

When front and rear revolution angles of the propeller shaft, theta_PF and theta_PR, are eliminated from the expressions 62 to 69, 76 and 77, these expressions are rearranged, and a torsional stiffness of a shaft between the engine and the center differential gear, k_CE, is ignored as being infinite, the following expressions are obtained. Since this embodiment is symmetrical bilaterally, only a right portion is shown.

[expression 78]

T_DFr = NUMF61 / DEN61 (i_CE i_DF (theta_WFl + theta_WFr) +
  i_CE i_DR (theta_WFl + theta_WFr) − 4 theta_E / i_T) −
    NUMF62 / DEN61 T_V − NUMF63 / DEN61 T_V

[expression 79]

T_DRr = NUMR61 / DEN61 (i_CE i_DF (theta_WFl + theta_WFr) +
  i_CE i_DR (theta_WFl + theta_WFr) − 4 theta_E / i_T) +
    NUMR62 / DEN61 T_V + NUMR63 / DEN61 T_V wherein NUMF61=i_DF k_DFr k_DFl k_DRr k_DRl k_PF k_PR, NUMF62=i_CE i_DF i_DR^2k_DFr k_DFl(k_DRl+ k_DRr)k_PF k_PR, NUMF63=4 i_CE i_DF k_DFr k_DFl k_DRr k_DRl k_PF, DEN61=i_CE k_PF k_PR{i_DR^2 K_DFl k_DFr(k_DRl+k_DRr)+i_DF^2k_DRl k_DRr(k_DFl+k_DFr)}+4 i_CE k_DFl k_DFr k_DRl k_DRr (k_PF+k_PR), NUMR61=i_DR k_DFr k_DFl k_DRr k_DRl k_PF k_PR, NUMR62=i_CE i_DF^2 i_DR k_DRr k_DRl(k_DFl+ k_DFr) k_PF k_PR, and NUMR63=4 i_CE i_DR k_DFr k_DFl k_DRr k_DRl k_PF.

Further, when torsional rigidities of the propeller shaft can be ignored, the following expressions can be obtained based on the condition that torsional rigidities of the propeller shaft are infinite in the expressions 78 and 79.

[expression 80]

T_DFr = T_DFl = NUMF71 / DEN71 (i_CE i_DF (theta_WFl +
  theta_WFr) + i_CE i_DR (theta_WFl + theta_WFr) − 4
    theta_E / i_T) − NUMF72 / DEN71 T_V

[expression 81]

T_DRr = T_DRl = NUMR71 / DEN71 (i_CE i_DF (theta_WFl +
  theta_WFr) + i_CE i_DR (theta_WFl + theta_WFr) − 4
    theta_E / i_T) + NUMR72 / DEN71 T_V wherein NUMF71=i_DF k_DFl k_DFr k_DRl k_DRr, NUMF72=i_CE i_DF i_DR^2k_DFl k_DFr(k_DRl+ k_DRr)/2, DEN71=i_CE(i_DR^2k_DFl k_DFr(k_DRl+k_DRr) +i_DF^2k_DRl k_DRr(k_DFl+k_DFr)), NUMR71=i_DR k_DFl k_DFr k_DRl k_DRr, and NUMR72=i_CE i_DF^2 i_DR k_DRl k_DRr(k_DFl k_DFr)/2.

In this embodiment, in a 4WD vehicle having a center differential gear with a differential limiting mechanism which limits the differential between input from the engine to the center differential gear and output to the front or rear wheels, torques of the drive shafts, T_D, are detected using the relational expressions 80 and 81.

Since this embodiment has the same configuration as Embodiment 11, FIG. 20 is described. The same elements are given the same reference numerals as those in FIG. 20 and their descriptions are omitted. Like Embodiment 11, wheel revolution angles are detected with the wheel revolution sensors 6, an engine revolution angle is detected with the engine revolution sensor 15, and a differential limiting torque of the center differential gear 31, T_V, is detected with the differential limiting torque detection means 35 so as to calculate torques of the drive shafts based on the expressions 80 and 81. The expressions 80 and 81 in which torsional rigidities of the propeller shaft 12 are ignored have been described above. When torsional rigidities of the propeller shaft, k_PF and k_PR, are identified and prestored, and the expressions 78 and 79 in which torsional rigidities of the propeller shaft, k_PF and k_PR, are taken into account are used to calculate torques of the drive shafts, more accurate torques of the drive shafts can be detected in the same manner as described above.

Embodiment 15

Embodiment 15 of the present invention is described hereinunder. This embodiment is the same as the above Embodiment 14 in what is controlled, i.e., a 4WD vehicle having a center differential gear with a differential limiting mechanism which limits the differential between input from the engine to the center differential gear and output from the engine to the front or rear wheels, as shown in FIG. 21. Detection principle has already been described in Embodiment 14. The expressions 62 to 69, 76 and 77 are rearranged to obtain the following expressions.

[expression 82]

T_DFr=T_DFl=(i_T i_CE i_DF (l_E alpha_E−T_E)−2 i_DF T_V)/4

[expression 83]

T_DRr=T_DRl=(i_T i_CE i_DR (l_E alpha_E−T_E)−2 i_DR T_V)/4

In this Embodiment 15, torques of the drive shafts are calculated and detected based on the above expressions 82 and 83.

Since this embodiment has the same configuration as the above Embodiment 11, FIG. 20 is described. The same elements are given the same reference numerals as those in FIG. 20 and their descriptions are omitted. Like the above Embodiment 12, a revolution angle acceleration of the engine is detected with the engine revolution sensor 15, an engine torque and a differential limiting torque of the center differential gear, T_V, are detected with the differential limiting torque detection means 35, and torques of the drive shafts for the four wheels are calculated and detected with the torque calculation unit 41 based on the expressions 82 and 83.

Embodiment 16

Embodiment 16 of the present invention is described hereinunder. This embodiment is the same as Embodiment 14 in what is controlled, i.e., a 4WD vehicle having a center differential gear with a differential limiting mechanism which limits the differential between input from the engine to the center differential gear and output from the engine to the front or rear wheels. Detection principle has already been described in Embodiment 14. When front and rear revolution angles of the propeller shaft, theta_PF and theta_PR, are eliminated from the expressions 62 to 69, 76 and 77 and the expressions are rearranged, the following expressions are obtained.

[expression 84]

T_DFr = T_DFl = − NUM81 / DEN81 (I_E alpha_E − T_E) +
  NUMR82 / DEN81 {i_CE i_DF (theta_WFl − theta_WFr) +
    i_CE i_DR (theta_WFl + theta_WFr) − 4 theta_E / i_T}
      NUMR83 / DEN81 (I_E alpha_E − T_E)

-continued

[expression 85]
$$T\_DRr = T\_DRl = NUMF81 / DEN81 \, (I\_E \, alpha\_E - T\_E) \, NUMF82 / DEN81 \, \{i\_CE \, i\_DF \, (theta\_WRl + theta\_WRr) + i\_CE \, i\_DR \, (theta\_WFl + theta\_WFr) - 4 \, theta\_E / i\_T\} + NUMF83 / DEN81 \, (I\_E \, alpha\_E - T\_E)$$

wherein

NUMF81=i\_T i\_CE^2 i\_DF i\_DR^2 k\_DFl k\_DFr(k\_DRl+k\_DRr) k\_PF k\_PR,

NUMF82=2 i\_DF k\_DFl k\_DFr k\_DRl k\_DRr k\_PF k\_PR,

NUMF83=4 i\_T i\_CE i\_DF k\_DFl k\_DFr k\_DRl k\_DRr k\_PF,

DEN81=2 i\_CE k\_PF k\_PR (i\_DR^2kDFl k\_DFr(k\_DRl+k\_DRr)-i\_DF^2k\_DRl k\_DRr (k\_DFl+k\_DFr))+8 i\_CE k\_DFl k\_DFr k\_DRl k\_DRr (k\_PF-k\_PR),

NUMR81=i\_T i\_CE^2 i\_DF^2 i\_DR k\_DRl k\_DRr (k\_DFl+k\_DFr) k\_PF k\_PR,

NUMR82=2 i\_DR k\_DFl k\_DFr k\_DRl k\_DRr k\_PF k\_PR, and

NUMR83=2 (2-i\_CE) i\_T i\_CE^2 i\_DR k\_DFl k\_DFr k\_DRl k\_DRr k\_PR.

Further, when torsional rigidities of the propeller shaft can be ignored, the following expressions can be obtained based on the condition that torsional rigidities of the propeller shaft are infinite in the expressions 84 and 85.

[expression 86]
$$T\_DFr = T\_DFl = NUMF91 / DEN91 \, (I\_E \, alpha\_E - T\_E) - NUMF92 / DEN91 \, \{i\_CE \, i\_DF \, (theta\_WFl + theta\_WFr) + i\_CE \, i\_DR \, (theta\_WFl + theta\_WFr) - 4 \, theta\_E / i\_T\}$$

[expression 87]
$$T\_DRr = T\_DRl = - NUMR91 / DEN91 \, (I\_E \, alpha\_E - T\_E) + NUMR92 / DEN91 \, \{i\_CE \, i\_DF \, (theta\_WRl + theta\_WRr) + i\_CE \, i\_DR \, (theta\_WFl + theta\_WFr) - 4 \, theta\_E / i\_T\}$$

wherein

NUMF91=i\_T i\_CE^2 i\_DF i\_DR^2 K\_DFl k\_DFr (k\_DRl+k\_DRr),

NUMF92=2 i\_DF k\_DFl k\_DFr k\_DRl k\_DRr,

DEN91=2 i\_CE (i\_DR^2k\_DFl k\_DFr(k\_DRl+k\_DRr)-i\_DF^2 k\_DRl k\_DRr (k\_DFl+k\_DFr)),

NUMR91=i\_T i\_CE^i\_DF^2 i\_DR k\_DRl k\_DRr (k\_DFl+kDFr), and

NUMR92=2 (2-i\_CE) i\_DR k\_DFl k\_DFr k\_DRl k\_DRr.

In this embodiment, torques of the drive shafts are calculated and detected based on the above expressions 86 and 87.

Since this embodiment has the same configuration as Embodiment 11, FIG. 20 is described. The same elements are given the same reference numerals as those in FIG. 20 and their descriptions are omitted. Like Embodiment 13, revolution angles of the four wheels are detected with the wheel revolution sensors 6, a revolution angle and a revolution angle acceleration of the engine are detected with the engine revolution sensor 15, an engine torque is detected, and torques of the drive shafts for the four wheels are calculated and detected with the torque calculation unit 41 based on the expressions 17 and 18. This embodiment has an advantage that it is not necessary to detect a differential limiting torque of the center differential gear. However, this embodiment can be applied only when the denominators of the expressions 86 and 87 are not "0".

The expressions 86 and 87 in which torsional rigidities of the propeller shaft are ignored have been described above. When torsional rigidities of the propeller shaft, k\_P, are identified and prestored and the expressions 84 and 85 in which torsional rigidities of the propeller shaft, k\_P, are taken into account are used to calculate torques of the drive shafts, more accurate torques of the drive shafts can be detected in the same manner as described above. However, this embodiment can be applied only when the denominators of the expressions 84 and 85 are not "0".

Embodiment 17

Figure 22:
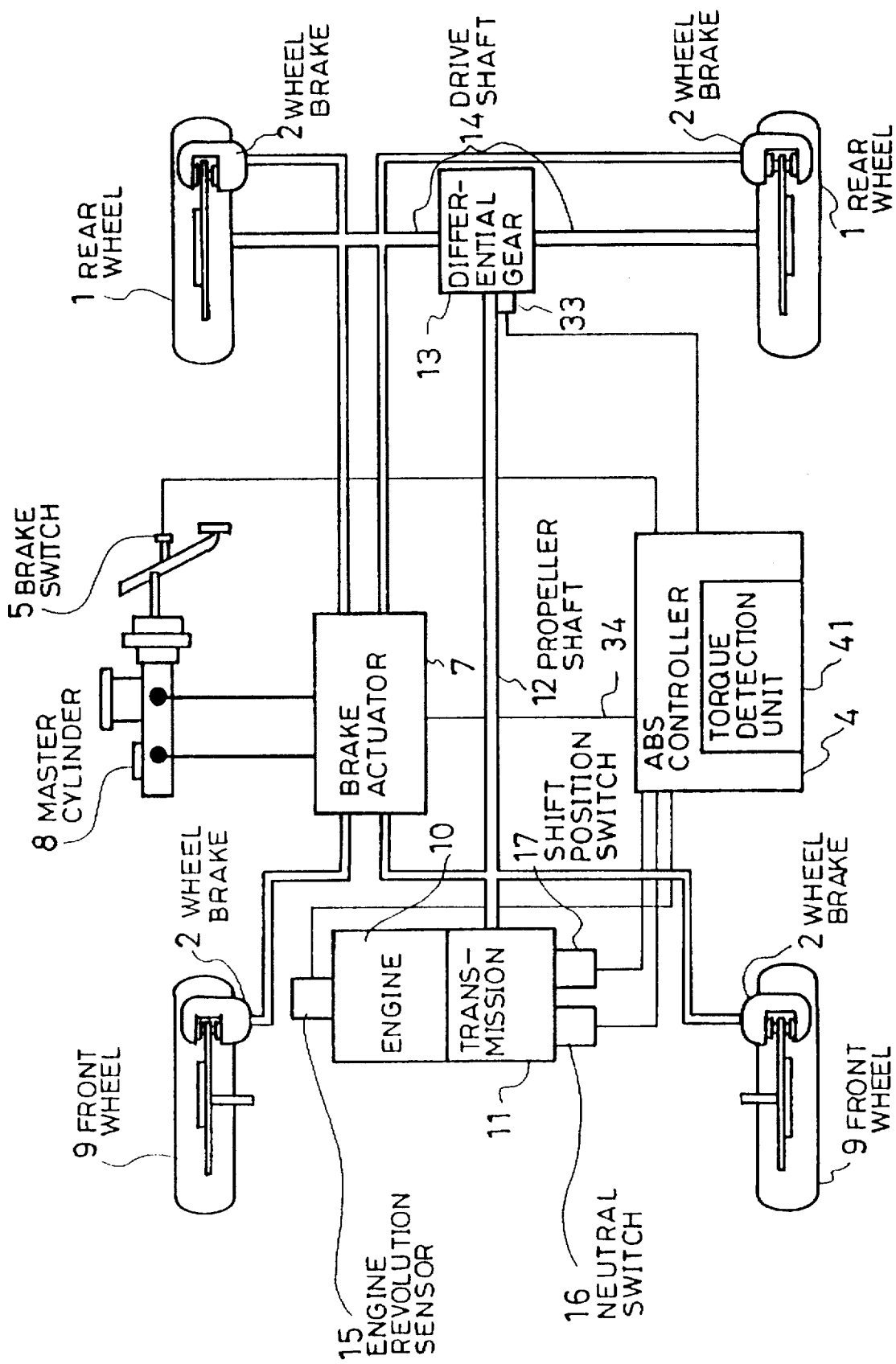
FIG. 22 is a diagram showing the entire configuration of a torque detection apparatus according to Embodiment 17.

Embodiment 17 of the present invention is described hereinunder. FIG. 22 shows the entire configuration of this Embodiment 17. This embodiment comprises means for detecting a revolution angle of the differential gear 13 on the propeller shaft side in addition to the elements of Embodiment 1 shown in FIG. 1 excluding the wheel revolution sensors 6. The same elements are given the same reference numerals as those in FIG. 1 and their descriptions are omitted. Reference numeral 33 represents means for detecting a revolution angle of the differential gear on the propeller shaft side which comprises a revolution sensor described in Embodiment 1, for example. Detection principle has already been described in Embodiment 1 and the following expression 26 is established.

[expression 26]
$$T\_Dr = T\_Dl = \tfrac{1}{2} k\_P \, i\_D \, (theta\_P - theta\_E/i\_T)$$

This embodiment provides an apparatus for detecting torques of the drive shafts, T\_D, using the relational expression 26.

Figure 23:
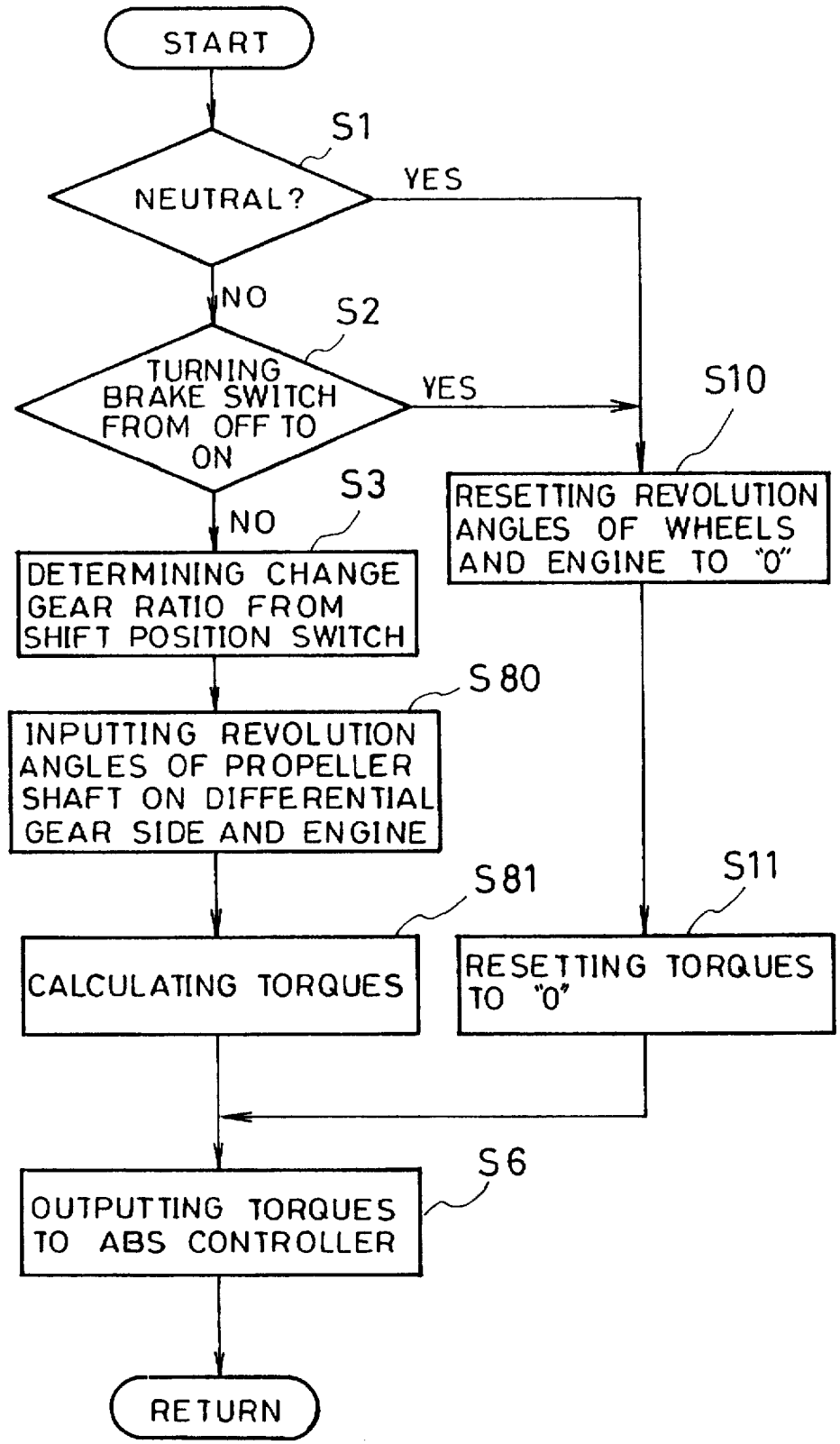
FIG. 23 is a flow chart showing the operation of Embodiment 17.
Figure 24:
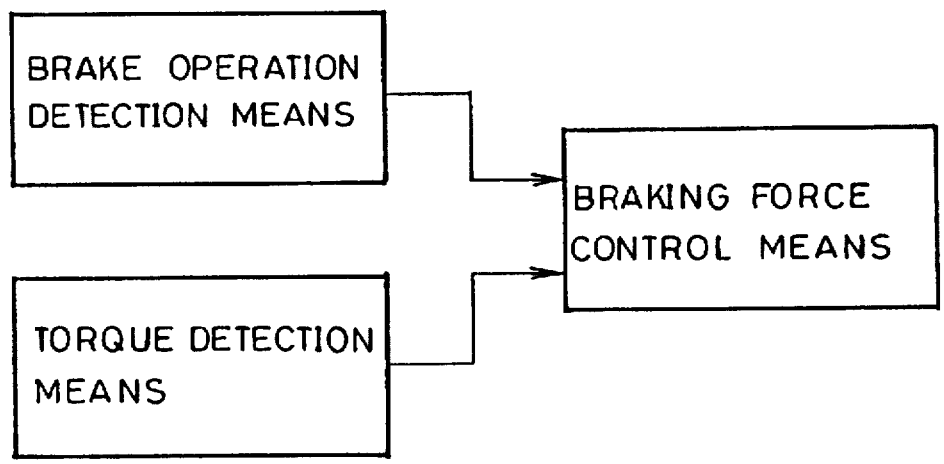
FIG. 24 is a diagram showing the configuration of a conventional ABS.
Figure 25:
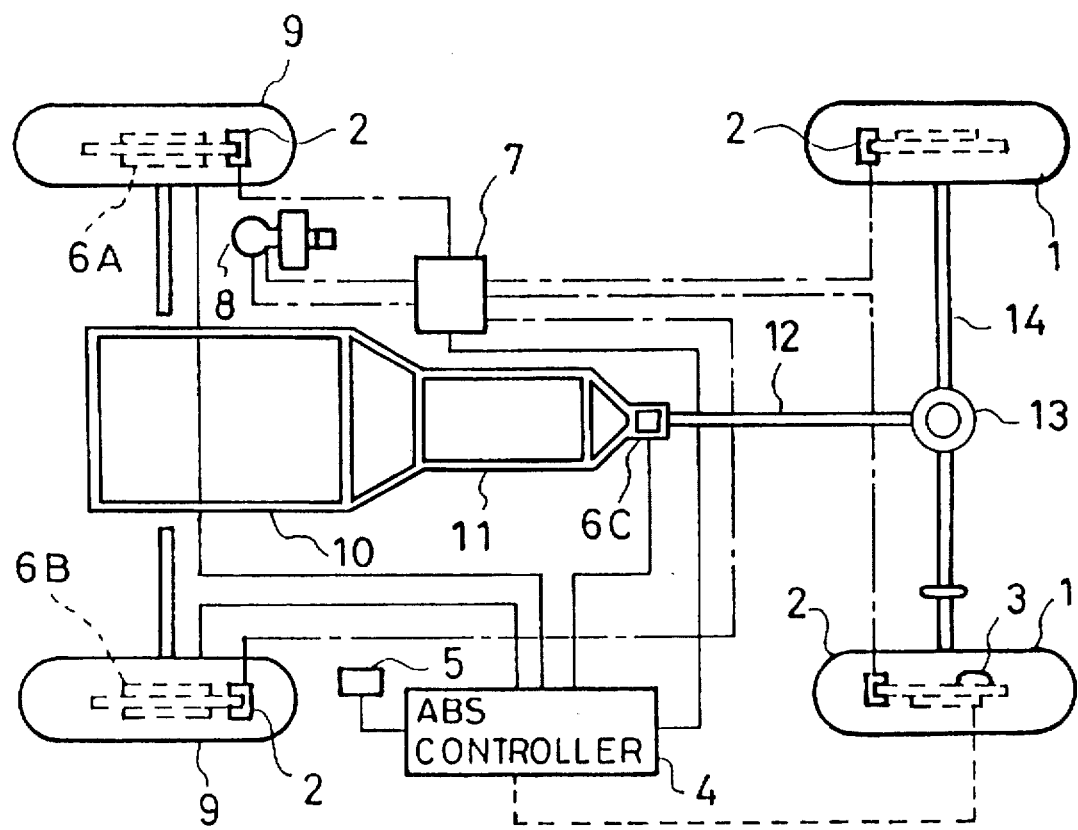
FIG. 25 is a diagram showing the entire configuration of the conventional ABS.
Figure 26:
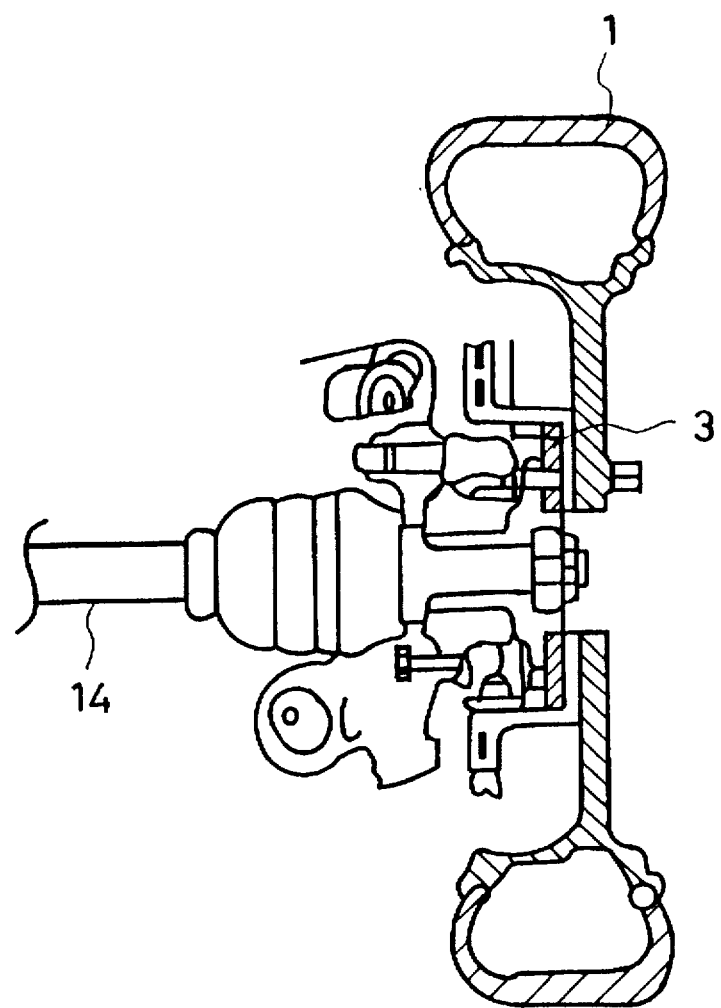
FIG. 26 is a sectional view of a torque detection apparatus of the conventional ABS; and FIC.27 is a diagram showing the circuit configuration of a torque sensor and a torque detection signal of the conventional ABS.
Figure 27:
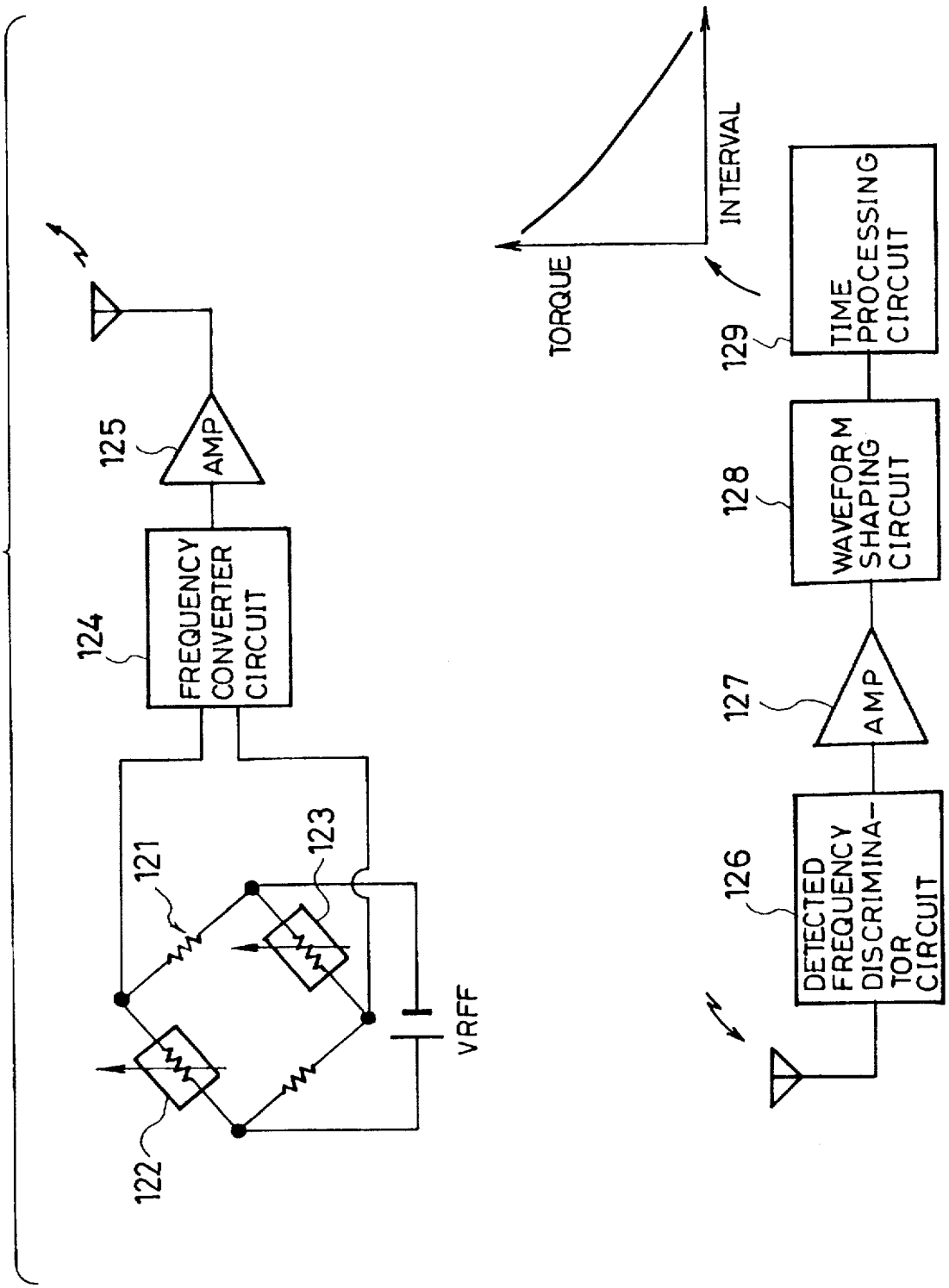

A description is given of the operation of this embodiment with reference to the flow chart of FIG. 23. Since this flow chart is very similar to FIG. 5 of Embodiment 1, only differences between them are described. Step 4 in FIG. 5 is replaced by step 80 wherein a revolution angle of the differential gear 13 on the propeller shaft side detected by the propeller shaft side revolution angle detection means 33 and a revolution angle of the engine 10 detected by the engine revolution sensor 15 are input in place of revolution angles of the wheels 1 and the engine 10. In addition, step 5 in FIG. 5 is replaced by step 81 wherein the expression 26 is calculated by the torque calculation unit 41 to detect torques of the drive shafts.

In the above embodiment, a torque detection apparatus for a 2WD vehicle has been described. In a 2WD vehicle having a differential gear with a differential limiting mechanism, torques of the drive shafts can be calculated and detected using a revolution angle of the differential gear 13 on the propeller shaft side in place of wheel revolution angles and further a differential limiting torque based on the expressions 33 and 34 shown in Embodiment 6. In a direct-coupled 4WD vehicle, torques of the drive shafts can be calculated and detected using a revolution angle of the differential gear on the propeller shaft side in place of wheel revolution angles based on the expressions 52 and 53 shown in Embodiment 9.

According to the invention claimed in claim 1, in a vehicle having a drive source such as an engine or a motor for driving wheels which is coupled to the right and left wheels by respective shafts having torsional stiffness for transmitting a drive torque through a differential gear, it is possible to obtain a low-cost torque detection apparatus using wheel revolution sensors, an engine revolution sensor and the like because the torque detection apparatus comprises either one or a plurality of detection means consisting of drive source revolution angle detection means for detecting a revolution angle of the drive source, drive source revolution angle acceleration detection means for detecting a revolution angle acceleration of the drive source, and wheel revolution angle detection means for detecting revolution angles of the wheels, and calculates torques of shafts such as drive shafts by means of torque calculation means for detecting torques of shafts such as drive shafts for coupling the differential gear to the wheels.

According to the invention claimed in claim 2, in a vehicle having a drive source such as an engine or a motor for driving wheels which is coupled to a transmission and the right and left wheels by respective shafts having torsional stiffness for transmitting a drive torque through a differential gear, it is possible to obtain a low-cost torque detection apparatus using wheel revolution sensors, an engine revolution sensor and the like because the torque detection apparatus comprises drive source revolution angle detection means for detecting a revolution angle of the drive source, and wheel revolution angle detection means for detecting revolution angles of the wheels, and calculates torque of shafts such as drive shafts by means of torque calculation means for detecting torques, T__D, of shafts such as drive shafts for coupling the differential gear to the wheels using the following expression.

[expression 1]

T__Dr=T__Dl=k__Dr k__Dl/(k__Dr+k__Dl) (theta__Wr+theta__Wl-2 theta__E/(i__D i__T)).

According to the invention claimed in claim 3, it is possible to detect highly accurate torques because revolution angles of the wheels and a revolution angle of a drive source such as an engine are reset to "0" when it is determined from the state of a vehicle that torques of shafts such as drive shafts are "0".

According to the invention claimed in claim 4, it is possible to detect accurate torques irrespective of the state of a transmission because the torque detection apparatus comprises change gear ratio detection means and torques of shafts such as drive shafts coupled to the wheels are calculated by means of torque calculation means using the detected change gear ratio, i__T.

According to the invention claimed in claim 5, it is possible to detect accurate torques irrespective of the state of a transmission because twisting torques of shafts coupled to the wheels are calculated by means of torque calculation means using an estimated change gear ratio, i__T*, calculated using the following expression.

[expression 2]

i__T*=2 theta__E/i__D/(theta__Wr+theta__Wl).

According to the invention claimed in claim 6, it is possible to reduce the effect of an offset of detected values and detect accurate torques because calculated twisting torque values of shafts coupled to the wheels are subjected to high-pass filtering processing by means of torque calculation means.

According to the invention claimed in claim 7, it is possible to detect accurate torques even when the pulse resolution of revolution sensors is low because torques of shafts such as drive shafts are calculated in synchronism with the revolution of a drive source such as an engine or a motor and a drive system such as wheels.

According to the invention claimed in claim 8, it is possible to detect accurate torques irrespective of the state of a transmission because the torque detection apparatus comprises revolution angle detection means for any one of shafts disposed between input of the differential gear and the transmission, and twisting torques of shafts such as drive shafts coupled to the wheels are calculated by means of torque calculation means using a revolution angle of any one of the shafts disposed between input of the differential gear and the transmission in place of a revolution angle of a drive source such as an engine or a motor.

According to the invention claimed in claim 9, in a vehicle having a drive source such as an engine or a motor for driving wheels which is coupled to a transmission and the right and left wheels by respective shafts having torsional stiffness for transmitting a drive torque through a differential gear and having a differential limiting mechanism for the differential gear, it is possible to detect accurate torques even in a vehicle having a differential limiting mechanism because the torque detection apparatus comprises differential limiting torque detection means for detecting a differential limiting torque, drive source revolution angle detection means for detecting a revolution angle of the. drive source, and wheel revolution angle detection means for detecting revolution angles of the right and left wheels, and calculates torques of shafts such as drive shafts by means of torque calculation means for detecting torques, T__D, of shafts such as drive shafts for coupling the differential gear to the wheels using the following expressions.

[expression 3]

T__Dr=2k__Dr k__Dl{(theta__Wr+theta__Wl)/2-theta__E/(i__T i__D)-T__V}/(k__DR+k__Dl)

[expression 4]

T__Dl=2k__Dr k__Dl{(theta__Wr+theta__Wl)/2-theta__E/(i__T i__D)+T__V}/(k__DR+k__Dl)

According to the invention claimed in claim 10, in a vehicle having a drive source such as an engine or a motor for driving wheels which is coupled to a transmission and the right and left wheels by respective shafts having torsional stiffness for transmitting a drive torque through a differential gear and having a differential limiting mechanism for the differential gear, it is possible to detect accurate torques even in a vehicle having a differential limiting mechanism because the torque detection apparatus comprises revolution angle acceleration detection means for detecting a revolution angle acceleration of the drive source, and differential limiting torque detection means for detecting a differential limiting torque, and calculates torques of shafts such as drive shafts by means of torque calculation means for detecting torques, T__D, of shafts such as drive shafts for coupling the differential gear to the wheels using the following expressions.

[expression 5]

T__Dr=k__Dr(I__E alpha__E)-2T__V)/2

[expression 6]

T__Dl=k__Dl(i__D i__T(I__E alpha__E)+2T__V)/2

According to the invention claimed in claim 11, in a vehicle having a drive source such as an engine or a motor for driving wheels which is coupled to a transmission and the right and left wheels by respective shafts having torsional stiffness for transmitting a drive torque through a differential gear and having a differential limiting mechanism for the differential gear, it is possible to detect accurate torques without detecting a differential limiting torque in a vehicle having a differential limiting mechanism because the torque detection apparatus comprises revolution angle detection means and revolution angle acceleration detection means for the drive source, and wheel revolution angle detection means for detecting revolution angles of the right and left wheels, and calculates torques of shafts such as drive shafts by means of torque calculation means for detecting torques, T_D, of shafts such as drive shafts for coupling the differential gear to the wheels using the following expressions.

[expression 7]

$$T\_Dr = k\_Dr\{-i\_D\ i\_T(I\_E\ alpha\_E) + 2k\_Dl((theta\_Wr + theta\_Wl)/2 - theta\_E/(i\_D\ i\_T))\}/(k\_Dl - k\_Dr)$$

[expression 8]

$$T\_Dl = k\_Dl\{i\_D\ i\_T(I\_E\ alpha\_E) - 2k\_Dr((theta\_Wr + theta\_Wl)/2 - theta\_E/(i\_D\ i\_T))\}/(k\_Dl - k\_Dr)$$

According to the invention claimed in claim 12, in a so-called direct-coupled 4WD vehicle having a drive source such as an engine or a motor for driving wheels which is coupled to the wheels by respective shafts having torsional stiffness for transmitting a drive torque in such a manner that power is distributed from the drive source to the front and rear wheels through a transmission and a propeller shaft and further distributed to the right and left wheels through the differential gears, it is possible to detect accurate torques even in a direct-coupled 4WD vehicle because the torque detection apparatus comprises revolution angle detection means for detecting a revolution angle of the drive source and wheel revolution angle detection means for detecting revolution angles of the four wheels, and calculates torques of shafts such as drive shafts by means of torque calculation means for detecting torques, T_D, of shafts such as drive shafts for coupling the front and rear differential gears to the wheels using the following expressions.

[expression 9]

$$T\_DFr = T\_DFl = k\_DFr\ k\_DFl((theta\_WFr + theta\_WFl) - 2theta\_E/i\_DF\ i\_T)/(k\_LDFl + k\_DFr)$$

[expression 10]

$$T\_DRr = T\_DRl = k\_DRr\ k\_DRl((theta\_WRr + theta\_WRl) - 2theta\_E/i\_DR\ i\_T)/(k\_DRl + k\_DRr)$$

According to the invention claimed in claim 13, in a so-called direct-coupled 4WD vehicle having a drive source such as an engine or a motor for driving wheels which is coupled to the wheels by respective shafts having torsional stiffness for transmitting a drive torque in such a manner that power is distributed from the drive source to the front and rear wheels through a transmission and a propeller shaft and further distributed to the right and left wheels through the differential gears, it is possible to detect accurate torques even in a direct-coupled 4WD vehicle because the torque detection apparatus comprises revolution angle acceleration detection means for the drive source and wheel revolution angle detection means for detecting revolution angles of the four wheels, and calculates torques of shafts such as drive shafts by means of torque calculation means for detecting torques, T_D, of shafts such as drive shafts for coupling the front and rear differential gears to the wheels using the following expressions.

[expression 11]

$$T\_DFr = T\_DFl = NUMF11 / DEN11\ (I\_E\ alpha\_E) + NUMF12 / DEN11\ \{i\_DF\ (theta\_WFl + theta\_WFr) - i\_DR\ (theta\_WRl + theta\_WRr)\}$$

[expression 12]

$$T\_DRr = T\_DRl = NUMR11 / DEN11\ (I\_E\ alpha\_E) + NUM12 / DEN11\ \{i\_DF\ (theta\_WFl + theta\_WFr) - i\_DR\ (theta\_WRl + theta\_WRr)\}$$

wherein

NUMF11 = i_DF i_DR^2 i_T k_DFl k_DFr (k_DRl + k_DRr),

NUMF12 = 2 i_DF k_DFl k_DFr k_DRl k_DRr,

DEN11 = 2 {i_DR^2 k_DFl k_DFr(k_DRl + k_DRr) + i_DF^2 k_DRl k_DRr (k_DFl + k_DFr)},

NUMR11 = i_DR i_DF^2 i_T K_DRl k_DRr (k_DFl + k_DFr), and

NUMR12 = −2 i_DR k_DFl k_DFr k_DRl k_DRr.

According to the invention claimed in claim 14, in a 4WD vehicle having a drive source such as an engine or a motor for driving wheels which is coupled to the wheels by respective shafts having torsional stiffness for transmitting a drive torque in such a manner that power is distributed from the drive source to the front and rear wheels through a transmission and a center differential gear with a differential limiting mechanism and further distributed to the right and left wheels through the differential gears, it is possible to detect accurate torques even in a 4WD vehicle having the center differential gear with a differential limiting mechanism because the torque detection apparatus comprises revolution angle detection means for detecting a revolution angle of the drive source, wheel revolution angle detection means for detecting revolution angles of the four wheels, and differential limiting torque detection means for detecting a differential limiting torque of the center differential gear, and calculates torques of shafts such as drive shafts by means of torque calculation means for detecting torques, T_D, of shafts such as drive shafts for coupling the front and rear differential gears to the wheels using the revolution angle of the drive source, the revolution angles of the four wheels, and the differential limiting torque detected by the above detection means.

According to the invention claimed in claim 15, in a 4WD vehicle having a drive source such as an engine or a motor for driving wheels which is coupled to the wheels by respective shafts having torsional stiffness for transmitting a drive torque in such a manner that power is distributed from the drive source to the front and rear wheels through a center differential gear with a differential limiting mechanism and further distributed to the right and left wheels through the differential gears, it is possible to detect accurate torques even in a 4WD vehicle having the center differential gear with a differential limiting mechanism because the torque detection apparatus comprises revolution angle acceleration detection means for detecting a revolution angle acceleration of the drive source, and differential limiting torque detection means for detecting a differential limiting torque of the center differential gear, and calculates torques of shafts such as drive shafts by means of torque calculation means for detecting torques, T_D, of shafts such as drive shafts for coupling the front and rear differential gears to the wheels using the revolution angle acceleration of the drive source and the differential limiting torque detected by the above detection means.

According to the invention claimed in claim 16, in a 4WD vehicle having a drive source such as an engine or a motor for driving wheels which is coupled to the wheels by respective shafts having torsional stiffness for transmitting a drive torque in such a manner that power is distributed from the drive source to the front and rear wheels through a center differential gear with a differential limiting mechanism and further distributed to the right and left wheels through the differential gears, it is possible to detect accurate torques even in a 4WD vehicle having the center differential gear with a differential limiting mechanism because the torque detection apparatus comprises revolution angle detection means and revolution angle acceleration detection means for the drive source, and wheel revolution angle detection means for detecting revolution angles of the four wheels, and calculates torques of shafts such as drive shafts by means of torque calculation means for detecting torques, T__D, of shafts such as drive shafts for coupling the differential gears to the wheels using the revolution angle and revolution angle acceleration of the drive source, and the revolution angles of the four wheels detected by the above detection means.

According to the invention claimed in claim 17, in a vehicle having a drive source such as an engine or a motor for driving wheels which is coupled to the right and left wheels by respective shafts having torsional stiffness for transmitting a drive torque through a differential gear, it is possible to detect accurate torques because the torque detection apparatus comprises revolution angle detection means for detecting a revolution angle of the drive source and revolution angle detection means for detecting a revolution angle of the differential gear on the propeller shaft side, and calculates torques of shafts such as drive shafts by means of torque calculation means for detecting torques, T__D, of shafts such as drive shafts for coupling the differential gear to the wheels using the revolution angle of the drive source and the revolution angle of the differential gear on the propeller shaft side detected by the above detection means.

What is claimed is:

1. In a vehicle having a drive source for driving wheels which is coupled to a transmission and right and left wheels by respective shafts having torsional stiffness for transmitting a drive torque through a differential gear, a torque detection apparatus for controlling the vehicle, comprising:

drive source revolution angle detection means for detecting a revolution angle of the drive source;

wheel revolution angle detection means for detecting revolution angles of the wheels; and torque calculation means for detecting torques, T__D, of shafts for coupling the differential gear to the wheels using the following expression:

$$T\_Dr = T\_Dl = k\_Dr\,k\_Dl/(k\_Dr+k\_Dl)\,(theta\_Wr+theta\_Wl - 2\,theta\_E/(i\_D\,i\_T))$$

wherein k__D is a torsional stiffness of shafts for coupling the differential gear to the wheels, theta__W is a revolution angle of each wheel, theta__E is a revolution angle of the drive source , i__D is a reduction ratio of the differential gear, i__T is a change gear ratio of the transmission, and r and l are right and left wheels, respectively.

2. In a vehicle having a drive source for driving wheels which is coupled to a transmission and right and left wheels by respective shafts having torsional stiffness for transmitting a drive torque through a differential gear and having a differential limiting mechanism for the differential gear, a torque detection apparatus for controlling the vehicle, comprising:

differential limiting torque detection means for detecting a differential limiting torque;

drive source revolution angle detection means for detecting a revolution angle of the drive source;

wheel revolution angle detection means for detecting revolution angles of the right and left wheels; and torque calculation means for detecting torques, T__D, of shafts for coupling the differential gear to the wheels using the following expressions:

$$T\_Dr = 2k\_Dr\,k\_Dl\{(theta\_Wr+theta\_Wl)/2 - theta\_E/(i\_T\,i\_D)\} - T\_V\}/(k\_Dr+k\_Dl),$$

and $$T\_Dl = 2k\_Dr\,k\_Dl\{(theta\_Wr+theta\_Wl)/2 - theta\_E/(i\_T\,i\_D) + T\_V\}/(k\_Dr+k\_Dl)$$

wherein T__V is a differential limiting torque, k__D is a torsional stiffness of shafts for coupling the differential gear to the wheels, theta__W is a revolution angle of each wheel, theta__E is a revolution angle of the drive source, i__D is a reduction ratio of the differential gear, i__T is a change gear ratio of the transmission, and r and l are right and left wheels, respectively.

3. In a vehicle having a drive source for driving wheels which is coupled to a transmission and right and left wheels by respective shafts having torsional stiffness for transmitting a drive torque through a differential gear and having a differential limiting mechanism for the differential gear, a torque detection apparatus for controlling the vehicle, comprising:

revolution angle acceleration detection means for detecting a revolution angle acceleration of the drive source;

differential limiting torque detection means for detecting a differential limiting torque; and torque calculation means for detecting torques, T__D, of shafts for coupling the differential gear to the wheels using the following expressions:

$$T\_Dr = k\_Dr(i\_D\,i\_T(I\_E\,alpha\_E) - 2T\_V)/2,$$

and $$T\_Dl = k\_Dl(i\_D\,i\_T(I\_E\,alpha\_E) + 2T\_V)/2$$

wherein I__E is an inertia moment of the drive source, alpha__E is a revolution angle acceleration of the drive source, T__V is a differential limiting torque, k__D is a torsional stiffness of shafts for coupling the differential gear to the wheels, i__D is a reduction ratio of the differential gear, i__T is a change gear ratio of the transmission, and r and l are right and left wheels, respectively.

4. In a vehicle having a drive source for driving wheels which is coupled to a transmission and right and left wheels by respective shafts having torsional stiffness for transmitting a drive torque through a differential gear and having a differential limiting mechanism for the differential gear, a torque detection apparatus for controlling the vehicle, comprising:

revolution angle detection means for detecting a revolution angle of the drive source;

revolution angle acceleration detection means for detecting a revolution angle acceleration of the drive source;

wheel revolution angle detection means for detecting revolution angles of the right and left wheels; and torque calculation means for detecting torques, T__D, of shafts for coupling the differential gear to the wheels using the following expressions:

$$T\_Dr=k\_Dr\{-i\_D\ i\_T(l\_E\ alpha\_E)+2k\_Dl((theta\_Wr+theta\_Wl)/2-theta\_E/(i\_D\ i\_T))\}/(k\_Dl-k\_Dr),$$

and $$T\_Dl=k\_Dl\{i\_D\ i\_T\{l\_E\ alpha\_E)-2k\_Dr((theta\_Wr+theta\_Wl)/2-theta\_E/(i\_D\ i\_T))\}/(k\_Dl-k\_Dr)$$

wherein l_E is an inertia moment of the drive source, alpha_E is a revolution angle acceleration of the drive source, k_D is a torsional stiffness of shafts for coupling the differential gear to the wheels, theta_W is a revolution angle of each wheel, theta_E is a revolution angle of the drive source, i_D is a reduction ratio of the differential gear, i_T is a change gear ratio of the transmission, and r and l are right and left wheels, respectively.

5. In a direct-coupled 4WD vehicle having a drive source for driving wheels which is coupled to the wheels by respective shafts having torsional stiffness for transmitting a drive torque in such a manner that power is distributed from the drive source to the front and rear wheels through a transmission and a propeller shaft and further to right and left wheels through differential gears, a torque detection apparatus for controlling the vehicle comprising:

revolution angle detection means for detecting a revolution angle of the drive source;

wheel revolution angle detection means for detecting revolution angles of the four wheels; and torque calculation means for detecting torques, T_D, of shafts for coupling the front and rear differential gears to the wheels using the following expressions:

$$T\_DFr=T\_DFl=k\_DFr\ k\_DFl((theta\_WFr+theta\_WFl)-2theta\_E/i\_DF\ i\_T)/(k\_DFl+k\_DFr),$$

and $$T\_DRr=T\_DRl=k\_DRr\ k\_DRl((theta\_WRr+theta\_WRl)-2theta\_E/i\_DR\ i\_T)/(k\_DRl+k\_DRr)$$

wherein k_D is a torsional stiffness of shafts for coupling the differential gear to the wheels, theta_W is a revolution angle of each wheel, theta_E is a revolution angle of the drive source, i_D is a reduction ratio of the differential gear, i_T is a chance gear ratio of the transmission, r and l are right and left wheels, respectively, and F and R are front and rear wheels, respectively.

6. In a direct-coupled 4WD vehicle having a drive source such as an engine or a motor for driving wheels which is coupled to the wheels by respective shafts having torsional stiffness for transmitting a drive torque in such a manner that power is distributed from the drive source to the front and rear wheels through a transmission and a propeller shaft and further to right and left wheels through differential gears, a torque detection apparatus for controlling the vehicle, comprising:

revolution angle acceleration detection means for detecting a revolution angle acceleration of the drive source;

wheel revolution angle detection means for detecting revolution angles of the four wheels; and torque calculation means for detecting torques, T_D, of shafts for coupling the front and rear differential gears to following expressions:

$$T\_DFr=T\_DFl=NUMF11/DEN11(l\_E\ alpha\_E)+NUMF12/DEN11\{i\_DF(theta\_WFl+theta\_WFr)-i\_DR(theta\_WRl+theta\_WRr)\},$$

and $$T\_DRr=T\_DRl=NUMR11/DEN11(l\_E\ alpha\_E)+NUMR12/DEN11\{i\_DF(theta\_WFl+theta\_WFr)-i\_DR(theta\_WRl+theta\_WRr)\}$$

wherein:

NUMF11=i_DF i_DRA^2i_T k_DFl k_DFr(k_DRl+k_DRr),

NUMF12=2i_DF k_DFl k_DFr k_DRl k_DRr,

DEN11=2{i_DR^2k_DFl k_DFr(k_DRl+k_DRr)+i_DF^2k_DRl k_DRr(k_DFl+k_DFr)},

NUMR11=i_DR i_DF^2i_T k_DRl k_DRr(k_DFl+k_DFr), and

NUMR12=-2i_DR k_DFl k_DFr k_DRl k_DRr, wherein l_E is an inertia moment of the drive source, k_D is a torsional stiffness of shafts for coupling the differential gear to the wheels, alpha_E is a revolution angle acceleration of the drive source, theta_W is a revolution angle of each wheel, i_D is a reduction ratio of the differential gear, i_T is a change gear ratio of the transmission, r and l are right and left wheels, respectively, and F and R are front and rear wheels, respectively.

7. In a 4WD vehicle having a drive source for driving wheels which is coupled to the wheels by respective shafts having torsional stiffness for transmitting a drive torque in such a manner that power is distributed from the drive source to the front and rear wheels through a transmission and a center differential gear with a differential limiting gears, a torque detection apparatus for controlling the vehicle, comprising: revolution angle detection means for detecting a revolution angle of the drive source;

wheel revolution angle detection means for detecting revoution angles of the four wheels;

differential limitinng torque detetion means for detecting a differential limiting torque of the center differential gear; and torque calculation means for detecting torques, $T_{13}D$, of shafts for coupling the front and rear differential gears to the wheels using the followig expressions:

$$T\_DFr = T\_DFl = NUMF31\ /\ DEN31\ (i\_CE\ i\_DF\ (theta\_WFl + theta\_WFr) + i\_CE\ i\_DR\ (theta\_WFl + theta\_WFr) - 4\ theta\_E\ /\ i\_T) - NUMF32\ /\ DEN31\ T\_V,$$

and $$T\_DRr = T\_DRl = NUMR31\ /\ DEN31\ (i\_CE\ i\_DF\ (theta\_WFl + theta\_WFr) + i\_CE\ i\_DR\ (theta\_WFl + theta\_WFr) - 4\ theta\_E\ /\ i\_T) + NUMR32\ /\ DEN31\ T\_V,$$

wherein:

NUMF31=$I_{13}$DF k_DFl k_DFr k_DRl k_DRr,

NUMF32=i_CE i_DF i_{DR}2k_DFl k_{DFr} (k_DRl+k_DRr),

DEN31=i_DE (i_{DR}2 K_DFl k_DFr (k_DRl+k_DRr)+i_DF^2 k_DRl k_DRr (k_DFl+k_DFr)),

NUM31=i_DR k_DFl k_DFr k_DRl k_DRr,

NUMR32=i_CE i_DF^2 i_DR k_DRl k_DRr (k_DFl+k_DFr), wherein, i_CE is a reduction ratio of the center differential gear, i_D is a reduction ration of the differential gears, thet_W is a revolution angle of each wheel, theta_E is a revolution angle of the drive source, i_T is a change gear ratio, T_V is a differential limiting torque, k_D is a torsional stiffness of shafts for coupling the center differential gear to the wheels, r and l are right and left wheels, respectively, and F and R are front and rear wheels, respectivedly.

8. In a 4WD vehicle having a drive source for driving wheels which is coupled to the wheels by respective shafts hving torsional stiffness for transmitting a drive torque in such a manner that power is distributed from the drive source to the fronnt and rear wheels through a center differential gear with a differential limiting mechanism and further to right and left wheels through differential gears, a torque detection apparatus for controlling the vehicle, comprising:

revolution angle acceleration detection means for detecting a revolution angle acceleration of the drive source;

differential limitig torque detection means for detecting a differential limiting torque of the center differential gear; and torque calculation means for detecting torques, T_D, of shafts for coupling the front and rear differential gears to the wheels using the the following expressions:

$$T\_DRr = T\_DFl = (i\_T \, i\_CE \, i\_DF \, (I\_E \, alpha\_E - T\_E) - 2 \, i\_DF \, T\_V)/4,$$

$$T\_DRr = T\_DRl = (i\_T \, i\_CE \, i\_DR \, (I\_E \, alpha\_E - T\_E) + 2 \, i\_Dr \, T\_V)/4,$$

wherein, i_T is a change gear ratio, i_CE is a reduction ratio of the center differential gear, i_D is a reduction ratio of the differential gears, i_E is an inertia moment of the drive source, alpha_E is a revolution angle of acceleration of the drive source, T_E is a torque of the drive source, T_V is a differential limiting torque, r and l are right and left wheels, respectively, and F and R are front and rear wheels, respectively.

9. In a 4WD vehicle having a drive source for driving wheels which is coupled to the wheels by respective shafts having torsional stiffness for transmitting a drive torque in such a manner that power is distributed from the drive source to the front and rear wheels through a center differential gear with a differential limiting mechanism and further to right and left wheels through differential gears, a torque detection apparatus for controlling the vehicle, comprising:

revolution angle detection means for detecting a revolution angle of the drive source;

revolution angle acceleration detection means for detecting a revolution angle acceleration of the drive source, and;

wheel revolution angle detection means for detecting revolution angles of the four wheels; and torque calculation means for detecting torques, T_D, of shafts for coupling the front and rear differential gears to the wheels using the the following expressions:

$$T\_DFr = T\_DFl = NUMF51 \, / \, DEN51 \, (I\_E \, alpha \, E - T\_E) -$$
$$NUMF52 \, / \, DEN51 \, \{i\_CE \, i\_DF \, (theta\_WFl + theta\_WFr) +$$
$$i\_CE \, i\_DR \, (theta\_WFl + theta\_WFr) - 4 \, theta\_E \, / \, i\_T)\},$$

$$T\_DRr = T\_DRl = -\, UMR51 \, / \, DEN51 \, (I\_E \, alpha\_E - T\_E) +$$
$$NUMR52/ \, DEN51 \, \{i\_CE \, i\_DF \, (theta\_WRl + theta\_WRr) +$$
$$i\_CE \, i\_DR \, (theta\_WFl - theta\_WFr) - 4 \, theta\_E \, / \, i\_T\},$$

wherein:

NUM51=i_T i_CE^2 I_DF i_DR^2 k_DFl i_DFr (k_DRl+k_DRr),

NUMF52=2 i_DF k_DFl k_DFr k_DRl k_DRr,

DE51=2 i_CE (i_Dr^2 K_DFl k_$_{DFr}$ $_{(k\_}$DRl+k_$_{DRr)}$-$_{i\_DF}$-2 k_DRl k_DRr (k_DFl+k_DFr)),

NUMR51=i_T i_CE^2 I_DF^2 i_DR k_DRl i_DRr (k_DFl+k_DFr), and

NUMR52=2 i_DR k_DFl k_DFr k_DRl k_DRr, and wherein, i_E is an inertia moment of the drive source, alpha_E is a revolution angle of acceleration of the drive source, T_E is a torque of the drive source, i_CE is a reduction ratio of the center differential gear, i_D is a reduction ratio of the differential gears, theta_W is a revolution angle of each wheel, theta_E is a revolution angle of the drive source, i_T is a change gear ratio, k_D is a torsional stiffness of shafts for coupling the center differential gear to the wheels, r and l are right and left wheels, respectively, and F and R are front and rear wheels, respectively.

10. In a vehicle having a drive source for driving wheels which is coupled to right and left wheels by respective shafts having torsional stiffness for transmitting a drive torque through a differential gear, a torque detection apparatus for controlling the vehicle, comprising:

revolution angle detection means for detecting a revolution angle of the drive source;

differential gear revolution angle detection means for detecting a revolution angle of the differential gear on a propeller shaft side of said differential gear; and torque calculation means for detecting torques, T_D, of shafts for coupling the differential gear to the wheels using the the following expression:

$$t\_Dr = T\_Dl = \tfrac{1}{2} \, k\_P \, i\_D \, (theta\_P - theta\_E \, / \, i\_T)$$

wherein, k_P is the torsional rigidity of the propeller shaft, i_D is a reduction ratio of the differential gear, theta_P is a revolution angle of the propeller shaft, theta_E is a revolution angle of the drive source, i_T is a change gear ratio and r and l are right and left wheels, respectively.

11. A torque detection apparatus for controlling a vehicle according to any one of claims 1–10, wherein said torque calculation means resets wheel revolution angles and a revolution angle of the drive source to "0" when it is determined from a state of the vehicle that torques of the shafts are "0".

12. A torque detection apparatus for controlling a vehicle according to any one of claims 1–10, which further comprises change gear ratio detection means and said torque calculation means for calculating torques of shafts coupled to the wheels using a detected change gear ratio, i_T.

13. A torque detection apparatus for controlling a vehicle according to any one of claims 1–10, wherein said torque calculation means calculates twisting torques T_D of shafts coupled to the wheels using an estimated change gear ratio, I_T*, calculated using the following expression, in place of the change gear ratio I_T:

$$I\_T* = 2theta\_E/i\_D/(theta\_Wr + theta\_Wl)$$

where theta_W is a revolution angle of each wheel, theta_E is a revolution angle of the drive source, i_D is a reduction ratio of the differential gear, and r and l are right and left wheels, respectively.

14. A torque detection apparatus for controlling a vehicle according to any one of claims 1–10, wherein said torque calculation means performs high-pass filtering of calculated twisting torque values of shafts coupled to the wheels.

15. A torque detection apparatus for controlling a vehicle according to any one of claims 1–10, wherein said torque calculation means calculates torques of shafts in synchronism with the revolution of the drive source and a revolution system.

16. A torque detection apparatus for controlling a vehicle according to any one of claims 1–10, wherein said drive source is coupled to a transmission, the apparatus further comprising shaft revolution angle detection means for detecting a revolution angle of any one of shafts disposed between input of the differential gear and the transmission, said torque calculation means calculating twisting torques of shafts coupled to the wheels using the revolution angle of any one of the shafts disposed between input of the differential gear and the transmission.

* * * * *